United States Patent
Yamada

(10) Patent No.: US 7,221,806 B2
(45) Date of Patent: May 22, 2007

(54) METHOD OF AND SYSTEM FOR IMAGE PROCESSING AND RECORDING MEDIUM FOR CARRYING OUT THE METHOD

(75) Inventor: Masahiko Yamada, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 473 days.

(21) Appl. No.: 10/653,294

(22) Filed: Sep. 3, 2003

(65) Prior Publication Data

US 2004/0042679 A1    Mar. 4, 2004

Related U.S. Application Data

(62) Division of application No. 09/482,896, filed on Jan. 14, 2000.

(30) Foreign Application Priority Data

| Jan. 14, 1999 | (JP) | .................... 10-7293 |
| Jan. 25, 1999 | (JP) | .................... 10-15904 |
| Jan. 26, 1999 | (JP) | .................... 10-17250 |
| Feb. 3, 1999 | (JP) | .................... 10-26323 |

(51) Int. Cl.
G06K 9/40 (2006.01)

(52) U.S. Cl. .................... 382/260

(58) Field of Classification Search ............ 382/128, 382/130–132, 240, 260–261, 263–265, 270–274; 378/62

See application file for complete search history.

(56) References Cited

U.S. PATENT DOCUMENTS

| 4,315,318 A | 2/1982 | Kato et al. |
| 4,317,179 A | 2/1982 | Kato et al. |
| 4,794,531 A | 12/1988 | Morishita et al. |
| 5,454,044 A | 9/1995 | Nakajima |
| 5,608,813 A | 3/1997 | Nakajima |
| 5,949,915 A | 9/1999 | Yamada |
| 5,991,457 A | 11/1999 | Ito et al. |
| 6,035,071 A | 3/2000 | Yamada |
| 6,072,913 A | 6/2000 | Yamada |

FOREIGN PATENT DOCUMENTS

| EP | 0 756 247 A1 | 1/1997 |
| EP | 0 766 202 A2 | 4/1997 |
| JP | 10-63838 A | 3/1998 |
| JP | 10-171983 A | 6/1998 |

*Primary Examiner*—Vikkram Bali
(74) *Attorney, Agent, or Firm*—Sughrue Mion, PLLC

(57) ABSTRACT

In an image processing method for obtaining a processed image signal from an original image signal representing an original image having a certain picture element density, a plurality of intermediate image signals which are different in frequency band are made on the basis of the original image signal. A plurality of transformed image signals are obtained by carrying out a transformation processing on the respective intermediate image signals on the basis of respective transformation functions, and a processed image signal is obtained from the transformed image signals. The transformation functions are defined by determining transformation function defining parameters for the transformation functions on the basis of the picture element density of the original image.

11 Claims, 61 Drawing Sheets

| 0.00 | 0.05 | 0.25 | 0.4 | 0.25 | 0.05 | 0.00 |

| 0.04 | 0.12 | 0.21 | 0.26 | 0.21 | 0.12 | 0.04 |

| 0.1 | 0.5 | 0.8 | 0.5 | 0.1 |

F I G . 31
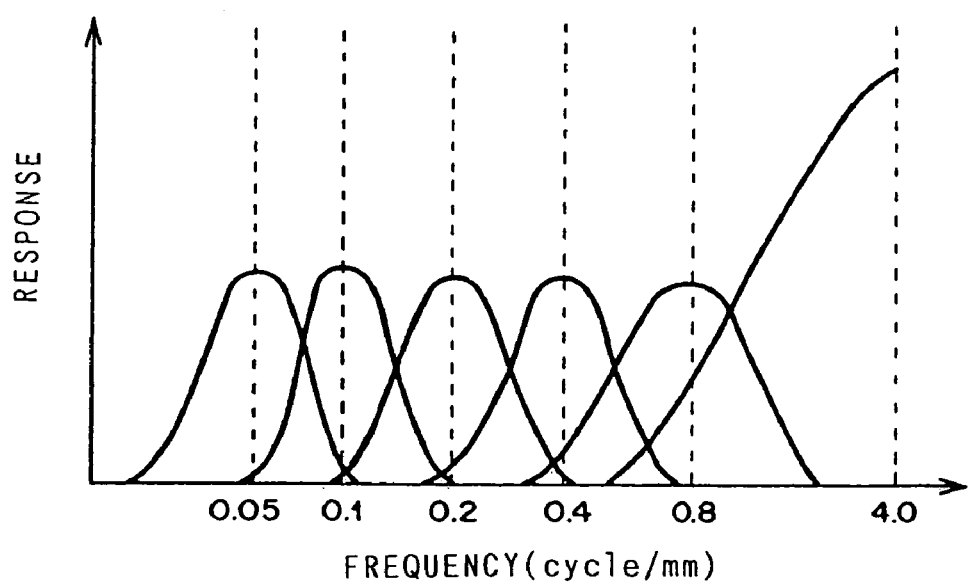
F I G . 32
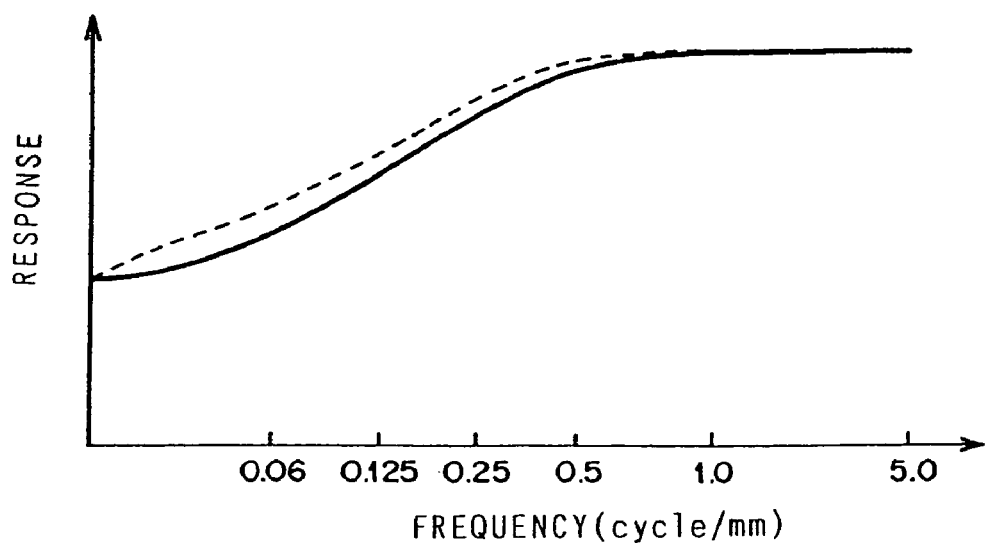

F I G. 39A
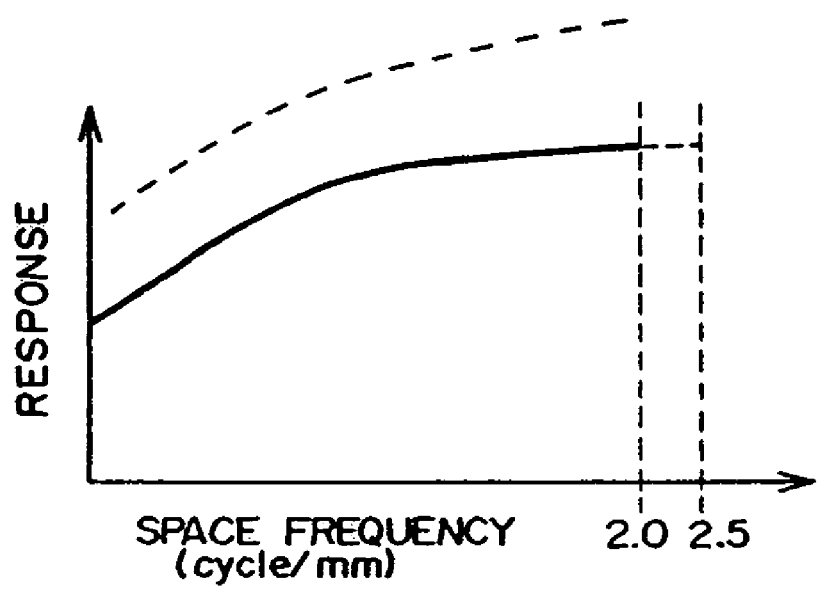
F I G. 39B
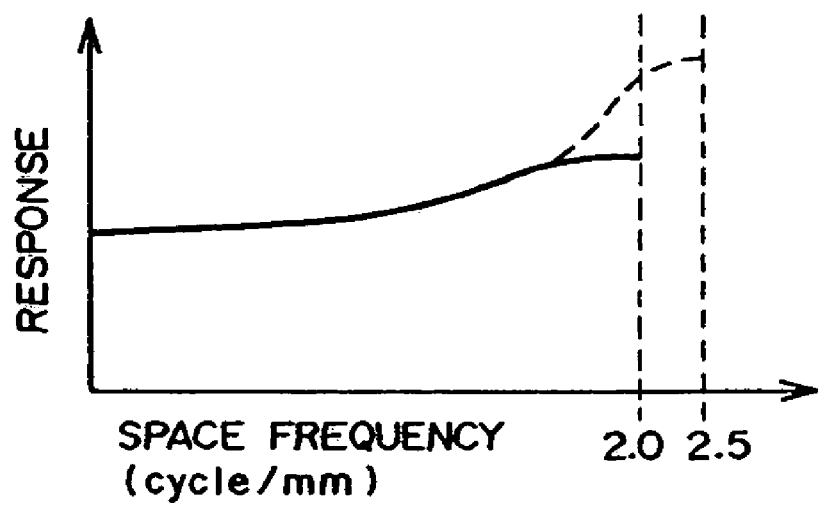

| LL1 | HL0 |
|-----|-----|
| LH0 | HH0 |

| LL2 | HL1 |
|-----|-----|
| LH1 | HH1 |

| LL2 |
|-----|
| HH1, HL1, LH1 |
| HH0, HL0, LH0 |

FIG.41A  FIG.41B  FIG.41C

| 0.05 | 0.25 | 0.4 | 0.25 | 0.05 |

| 0.1 | 0.5 | 0.8 | 0.5 | 0.1 |

FIG.53

| REFERENCE ORIGINAL IMAGE | $S_{org}$ | $S_{us}1$ | $S_{us}2$ | $S_{us}3$ | $S_{us}4$ | $S_{us}5$ | $S_{us}6$ |
|---|---|---|---|---|---|---|---|
| 1/2 | | $S_{org1/2}$ | $S_{us}1_{1/2}$ | $S_{us}2_{1/2}$ | $S_{us}3_{1/2}$ | $S_{us}4_{1/2}$ | $S_{us}5_{1/2}$ |
| 1/4 | | | $S_{org1/4}$ | $S_{us}1_{1/4}$ | $S_{us}2_{1/4}$ | $S_{us}3_{1/4}$ | $S_{us}4_{1/4}$ |
| 1/8 | | | | $S_{org1/8}$ | $S_{us}1_{1/8}$ | $S_{us}2_{1/8}$ | $S_{us}3_{1/8}$ |
| 1/16 | | | | | $S_{org1/16}$ | $S_{us}1_{1/16}$ | $S_{us}2_{1/16}$ |

FIG.54

| REFERENCE ORIGINAL IMAGE | $S_{org}$-$S_{us}1$ | $S_{us}1$-$S_{us}2$ | $S_{us}2$-$S_{us}3$ | $S_{us}3$-$S_{us}4$ | $S_{us}4$-$S_{us}5$ | $S_{us}5$-$S_{us}6$ |
|---|---|---|---|---|---|---|
| 1/2 | | $S_{org}1/2$-$S_{us}1\,1/2$ | $S_{us}1\,1/2$-$S_{us}2\,1/2$ | $S_{us}2\,1/2$-$S_{us}3\,1/2$ | $S_{us}3\,1/2$-$S_{us}4\,1/2$ | $S_{us}4\,1/2$-$S_{us}5\,1/2$ |
| 1/4 | | | $S_{org}1/4$-$S_{us}1\,1/4$ | $S_{us}1\,1/4$-$S_{us}2\,1/4$ | $S_{us}2\,1/4$-$S_{us}3\,1/4$ | $S_{us}3\,1/4$-$S_{us}4\,1/4$ |
| 1/8 | | | | $S_{org}1/8$-$S_{us}1\,1/8$ | $S_{us}1\,1/8$-$S_{us}2\,1/8$ | $S_{us}2\,1/8$-$S_{us}3\,1/8$ |
| 1/16 | | | | | $S_{org}1/16$-$S_{us}1\,1/16$ | $S_{us}1\,1/16$-$S_{us}2\,1/16$ |

| REFERENCE ORIGINAL IMAGE | f 1 | f 2 | f 3 | f 4 | f 5 | f 6 |
|---|---|---|---|---|---|---|
| 1/2 | | f 2 | f 3 | f 4 | f 5 | f 6 |
| 1/4 | | | f 3 | f 4 | f 5 | f 6 |
| 1/8 | | | | f 4 | f 5 | f 6 |
| 1/16 | | | | | f 5 | f 6 |

FIG.57

| | | | | | | | |
|---|---|---|---|---|---|---|---|
| 4/1 | $S_{org4}$-$S_{us41}$ | $S_{us41}$-$S_{us42}$ | $S_{us42}$-$S_{us43}$ | $S_{us43}$-$S_{us44}$ | $S_{us44}$-$S_{us45}$ | $S_{us45}$-$S_{us46}$ | $S_{us46}$-$S_{us47}$ |
| 2/1 | | $S_{org2}$-$S_{us21}$ | $S_{us21}$-$S_{us22}$ | $S_{us22}$-$S_{us23}$ | $S_{us23}$-$S_{us24}$ | $S_{us24}$-$S_{us25}$ | $S_{us25}$-$S_{us26}$ |
| original image signal | | | $S_{org}$-$S_{us1}$ | $S_{us1}$-$S_{us2}$ | $S_{us2}$-$S_{us3}$ | $S_{us3}$-$S_{us4}$ | $S_{us4}$-$S_{us5}$ |

FIG.58

| | | | | | | | |
|---|---|---|---|---|---|---|---|
| 4/1 | | f1 | f1 | f1 | f2 | f3 | f4 | f5 |
| 2/1 | | f1 | f1 | f2 | f3 | f4 | f5 | |
| original image signal | | f1 | f2 | f3 | f4 | f5 | | |

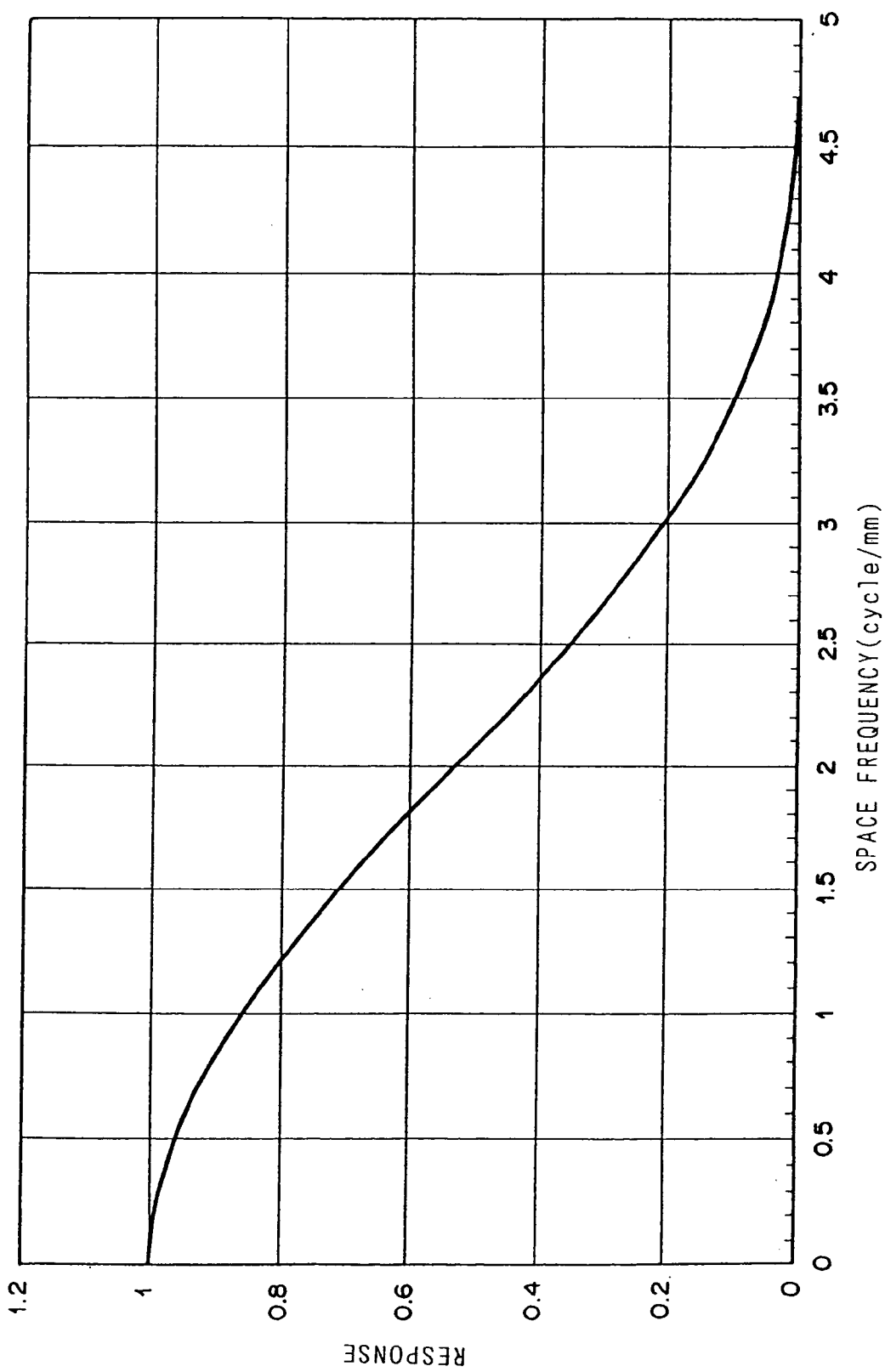
F I G. 61

FIG.65
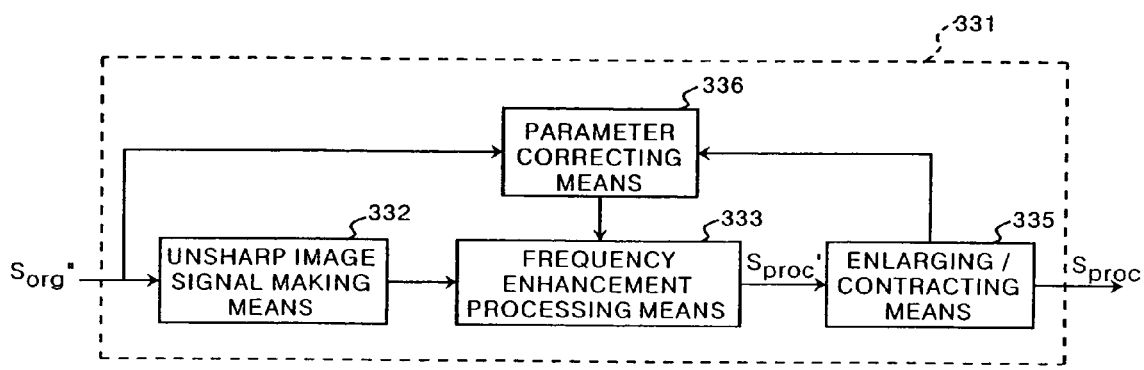
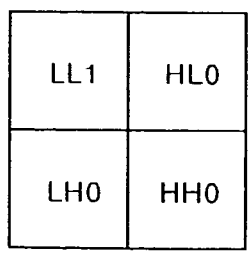 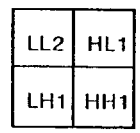 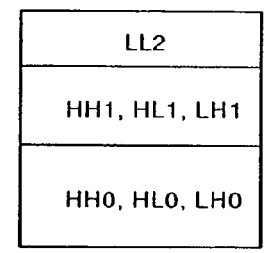
FIG.66A  FIG.66B  FIG.66C

FIG.69

| SPACE FREQUENCY | RESPONSE |
|---|---|
| 0.00 | 1.00 |
| 0.01 | 1.00 |
| ... | ... |
| 0.05 | 0.99 |
| ... | ... |
| ... | ... |
| 2.55 | 0.54 |
| ... | ... |
| ... | ... |

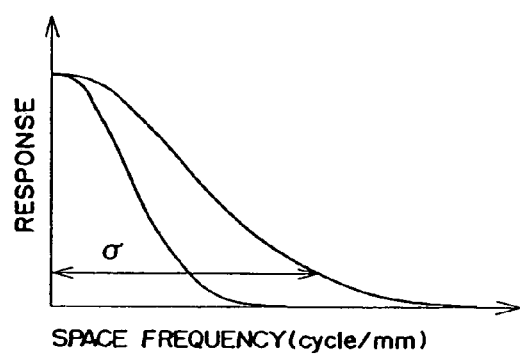 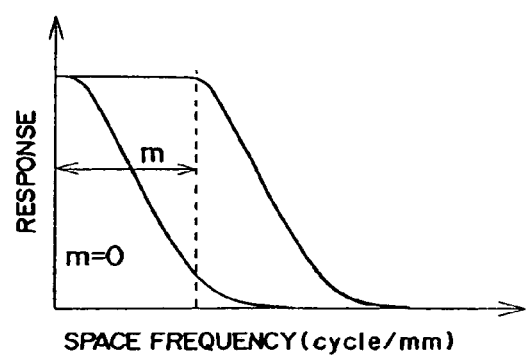
F I G. 70A   F I G. 70B

METHOD OF AND SYSTEM FOR IMAGE PROCESSING AND RECORDING MEDIUM FOR CARRYING OUT THE METHOD

This is a divisional of application Ser. No. 09/482,896 filed Jan. 14, 2000; the disclosure of which is incorporated herein by reference.

BACKGROUND OF THE INVENTION

1. Field of the Invention

This invention relates to a method of and system for carrying out an image processing such as a processing for enhancing a predetermined frequency component of an image signal. This invention further relates to a computer-readable recording medium loaded with program for causing a computer to perform the image processing in accordance with the method.

2. Description of the Related Art

We have proposed various image processing methods and systems for improving diagnostic performance of a radiation image by carrying out on a radiation image signal representing the radiation image, for instance, a frequency enhancement processing or a dynamic range compression processing by use of an unsharp mask image signal (will be referred to as "unsharp image signal", hereinbelow). See, for instance, Japanese Unexamined Patent Publication Nos. 55(1980)-163472, 55(1980)-87953, 3(1991)-222577, 10(1998)-75395, and 10(1998)-171983. For example, in the frequency enhancement processing, a predetermined spatial frequency component of an original image signal is enhanced by subtracting an unsharp image signal $S_{us}$ from the original image signal $S_{orig}$, and adding the remainder multiplied by a coefficient of enhancement β to the original image signal $S_{orig}$. This is represented by the following formula (1).

$$S_{proc} = S_{org} + \beta \times (S_{orig} - S_{us}) \quad (1)$$

wherein $S_{proc}$ is a frequency-enhanced image signal, $S_{org}$ is an original image signal, $S_{us}$ is an unsharp image signal and β is a coefficient of enhancement.

Further, in Japanese Unexamined Patent Publication No. 10(1998)-75395, there is disclosed a method of preventing generation of an artifact in the frequency-enhanced image signal by adjusting the frequency response characteristic of the add signal to be added to the original image signal. In this method, a plurality of unsharp image signals, which are different from each other in frequency response characteristic, that is, in sharpness, are prepared, differences between two of the original image signal and the unsharp image signals are taken, thereby making a plurality of band-limited signals respectively representing frequency components in limited frequency bands of the original image signal, the band-limited signals thus obtained are transformed into signals of desired values by use of different transformation functions, and the add signal is made by adding up the suppressed band-limited signals. This is represented, for instance, by the following formulae (2).

$$S_{proc} = S_{org} + \beta(S_{org}) \times F_{usm}(S_{org}, S_{us}1, S_{us}2, \ldots S_{us}N)$$

$$F_{usm}(S_{org}, S_{us}1, S_{us}2, \ldots S_{us}N) = f_1(S_{org} - S_{us}1) + f_2(S_{us}1 - S_{us}2) + \ldots + f_k(S_{us}k-1 - S_{us}k) + \ldots + f_N(S_{us}N-1 - S_{us}N) \quad (2)$$

wherein $S_{proc}$ is a processed image signal, $S_{org}$ is an original image signal, $S_{us}k$ (k=1 to N) is an unsharp image signal, $f_k$(k=1 to N) is a transformation function, and β($S_{org}$) is a coefficient of enhancement determined on the basis of the original image signal.

Further, in Japanese Unexamined Patent Publication No. 10(1998)-171983, there is disclosed a method of preventing generation of an artifact in the processed signal when both the frequency enhancement processing and the dynamic range compression processing are to be carried out. In this method, a plurality of band-limited signals are made in the manner described above, a high frequency component signal representing high frequency components of the original image signal and a low frequency component signal representing low frequency components of the original image signal are obtained on the basis of the band-limited signals, and the frequency enhancement processing and the dynamic range compression processing are carried out by adding the high frequency component signal and the low frequency component signal to the original image signal. This is represented, for instance, by the following formulae (3).

$$S_{proc} = S_{org} + \beta(S_{org}) \times F_{usm}(S_{org}, S_{us}1, S_{us}2, \ldots S^{us}N) + D\{S_{org} - F_{drc}(S_{org}, S_{us}1, S_{us}2, \ldots S_{us}N)\}$$

$$F_{usm}(S_{org}, S_{us}1, S_{us}2, \ldots S_{us}N) = f_{u1}(S_{org} - S_{us}1) + f_{u2}(S_{us}1 - S_{us}2) + \ldots + f_{uk}(S_{us}k-1 - S_{us}k) + \ldots f_{uN}(S_{us}N-1 - S_{us}N)$$

$$F_{drc}(S_{org}, S_{us}1, S_{us}2, \ldots S_{us}N) = f_{d1}(S_{org} - S_{us}1) + f_{d2}(S_{us}1 - S_{us}2) + \ldots + f_{dk}(S_{us}k-1 - S_{us}k) + \ldots + f_{dN}(S_{us}N-1 - S_{us}N) \quad (3)$$

wherein $S_{proc}$ is a processed image signal, $S_{org}$ is an original image signal, $S_{us}k$ (k=1 to N) are unsharp image signals, $f_{uk}$(k=1 to N) are transformation functions for obtaining the high frequency component signal, $f_{dk}$(k=1 to N) is a transformation function for obtaining the low frequency component signal, β($S_{org}$) is a coefficient of enhancement determined on the basis of the original image signal, and D$\{S_{org} - F_{drc}(S_{org}, S_{us}1, S_{us}2, \ldots S_{us}N)\}$ is a coefficient of dynamic range compression determined on the basis of the low frequency component signal, D being a function for transforming D$\{S_{org} - F_{drc}(S_{org}, S_{us}1, S_{us}2, \ldots S_{us}N)\}$.

In the frequency enhancement processing and the dynamic range compression processing (will be representatively referred to "as the transformation processing", hereinbelow), the frequency response characteristic of the add signal to be added to the original image signal can be adjusted by changing the definition of the transformation functions and the like for transforming the band-limited signals. Accordingly, a processed image signal having a desired frequency response characteristic, e.g., suitable for preventing generation of an artifact, can be obtained by properly defining the transformation functions. However, it is not easy to know how to define the transformation functions in order to obtain a desired result. Therefore, there has been proposed, in Japanese Unexamined Patent Publication No. 10(1998)-63838, a method in which a processed image signal having a desired frequency response characteristic is easily obtained by designating a desired frequency response characteristic for a processed image signal and determining parameters for defining the transformation functions (this parameter will be referred to as "transformation function defining parameter", hereinbelow) on the basis of the designated frequency response characteristic.

The unsharp image signals used in the aforesaid transformation processing are made by thinning picture elements by filtering picture elements of the original image signal at predetermined intervals and interpolating like number of picture elements. As the filtering processing, a processing for removing high frequency components from the original image signal by use of a low-pass filter, more specifically a processing for calculating an average or a weighted average of the values of picture elements in the filter, has been carried out. In the filtering processing carried out in order to obtain a plurality of unsharp image signals in Japanese Unexamined Patent Publication No. 10(1998)-75395 or the like, the unsharp image signals are obtained by filtering the original image signal to obtain an image signal with less picture elements, further filtering the image signal with less picture elements, and interpolating picture elements into the image signal with less picture elements obtained at each filtering stage so that the number of the picture elements in the image signal becomes equal to that in the original image signal.

Each unsharp image signal is thus made on the basis of the original image signal, which is obtained by reading an original image at a predetermined read density by use of an image reader and digitizing the image signal thus obtained into a digital image signal which can reproduce an image at a predetermined picture element density. It has been known that frequency components lower than a certain frequency determined according to the picture element density (a Nyquist rate) can be correctly reproduced when a digitized image signal is to be reproduced as a printed output. That is, since being determined taking into account the level of image quality required upon reproduction, the read density, i.e., the picture element density is not constant.

For example, in a radiation image read-out and reproducing system, where a radiation image of a human body recorded on a stimulable phosphor sheet is read out as a digital image by scanning the stimulable phosphor sheet with a laser beam, the read density or the picture element density varies depending on the size of the stimulable phosphor sheet and can be freely set by an user.

When image signals different in picture element density or Nyquist frequency are subjected to the same filtering processing using the same low-pass filters and then to the same interpolation, the frequency characteristics of the obtained band-limited signals (more specifically the frequency bands of the obtained band-limited signals) differ depending on the picture element density. This means that, for instance, when a pair of image signals having different picture element densities are obtained by reading an original image at different read densities, and a frequency enhancement processing or a dynamic range compression processing is carried out on the image signals by use of band-limited signals obtained on the basis of the same unsharp image signals, the enhanced frequency band or the compressed frequency band differ between the two original image signals.

In order to overcome this problem, there has been proposed, in Japanese Unexamined Patent Publication No. 10(1998)-63837, a method in which unsharp image signal are obtained by selecting coefficients of filter from a list of coefficients of filter according to information on the picture element density of the original image signal and filtering the original image signal by use of filters of the selected coefficients of filter. That is, when original image signals, for instance, respectively read at read densities of 5 lines/mm and 6.7 lines/mm are filtered by use of the same low-pass filter, the obtained two band-limited signals differ from each other in frequency band. However in the method proposed by the above identified Japanese Unexamined Patent Publication, the two original image signals are filtered by different low-pass filters and accordingly the obtained two band-limited signals can be substantially the same in frequency band. Accordingly, unsharp image signals of the same frequency bands can be obtained irrespective of the picture element density of the original image signals, whereby band-limited signals of the same frequency characteristics can be made and a desired transformation processing, e.g., the aforesaid frequency enhancement processing, can be constantly carried out in the same manner.

However, since energy of a band-limited image represented by a band-limited signal, that is, the peak value of response of a band-limited signal, varies depending on the picture element density, the method disclosed in Japanese Unexamined Patent Publication No. 10(1998)-63837 cannot make constant the response of the band-limited signals in the same frequency band irrespective of the picture element density though can make the frequency bands of the band-limited signals equal to each other. Accordingly, even if a processing is carried out to enhance a band-limited signal in a particular frequency band, the response characteristic of the enhanced band-limited signal delicately varies depending on the picture element density.

In the image processing system described above, there is sometimes input an object original image signal (an original image signal to be processed) representing an image which differs in resolution from images which are normally processed by the image processing system. (The resolution of the images which are normally processed by the image processing system will be referred to as "the reference resolution", hereinbelow) In such a case, when the transformation processing such as the frequency enhancement processing is carried out on the object original image signal by use of the transformation functions which have been determined for original image signals representing images at the reference resolution, there is a fear that the frequency response characteristic of the image reproduced on the basis of the processed image signal obtained from the object original image signal becomes different from that of the image reproduced on the basis of the original image signal representing an image at the reference resolution. This problem may be overcome, for instance, by preparing a plurality of groups of transformation functions and using one group of the transformation functions according to the resolution of the image represented by the object original image signal. However, this approach is disadvantageous in that the number of the transformation functions becomes too large and management of the transformation functions becomes too troublesome.

Further, though there have been known, as formats for compressing an original image signal, various formats such as JPEG, GIF, TIFF and the like, there is recently proposed a format in which an original image signal is hierarchically decomposed by resolution into hierarchical data, and the hierarchical data in each hierarchy is encoded and compressed. In this compression format, specifically, an original image signal is decomposed by wavelet transformation or the like into a plurality of hierarchical image signals, each having a resolution of $½^n$ times that of the original image signal, and the hierarchical image signals are encoded in the hierarchical sequence and compressed into a single file.

The compression format has the following features.

(1) Since the image signal is not processed block by block unlike the DCT format employed in the conventional JPEG, artifact like block distortion is not generated.

(2) Since the image signals are hierarchically encoded, information on necessary resolutions has only to be transferred upon transfer of the image signals, which results in efficient image transfer.

(3) Since the image signal is decomposed into multiple resolutions, various image processing such as frequency enhancement processing can be relatively easily carried out.

(4) Since space decomposition and frequency decomposition can be simultaneously carried out by multiple resolution analysis, an orthogonal transformation can be carried out over a wide range on a low frequency region, which largely affects the encoding efficiency, whereas over a narrow region on a high frequency region. Accordingly, even if quantization noise is generated around an edge of the image, spatial spread of the noise can be suppressed so that the noise becomes less apt to be recognized.

Further, there have been proposed various file formats such as a FlashPix file proposed by Eastman Kodak in which data of different kinds can be stored in a single file. The aforesaid hierarchical image signals can be also stored in such a FlashPix standard file.

By decomposing an original image signal into multiple resolutions, it is possible to construct the original image signal by a plurality of hierarchical image signals, each having a resolution of $\frac{1}{2}^n$ times that of the original image signal. This makes it feasible to reconstruct an image on the basis of a part of the hierarchical image signals which is selected according to the image quality required by the output system. That is, when a high quality image is to be reproduced as in a printer, an image signal which can reproduce a high quality image equivalent to the original image in resolution can be obtained by reconstructing the image signal on the basis of hierarchical image signals up to that of the highest resolution. To the contrast, in the case of, for instance, a CRT which cannot reproduce an image in a quality so high as a printer, an image signal which can reproduce an image suitable for the CRT though not so high as the original image in resolution can be obtained by reconstructing the image signal on the basis of hierarchical image signals not including the highest resolution hierarchical image signal and enlarging or contracting the image signal, if necessary.

However since the hierarchical image signals each representing an image lower in resolution (such hierarchical image signals will be referred to as "lower hierarchical image signals" hereinbelow) than that represented by the original image signal differ from the original image signal in frequency response characteristic, if the transformation functions for the original image signal are employed as they are in frequency enhancement processing of the lower hierarchical image signals, there is a fear that an image signal which is different in frequency response characteristic from an image signal obtained by carrying out the frequency enhancement processing on the original image signal can be obtained. This may be overcome by preparing a number of transformation functions conforming to various resolutions and employing transformation functions according to the resolution of the image signal to be processed. However this approach is disadvantageous in that the number of transformation functions to be managed becomes too large and management of transformation functions becomes too troublesome. This problem occurs not only when carrying out frequency enhancement processing on image signals obtained by decomposing an original image signal into multiple resolutions but also when carrying out frequency enhancement processing on an image signal in order to reproduce an image lower than an original image signal.

Further, for example, a radiation image reproduced at pitches of 10 lines/mm by doubling and interpolating an original image signal read out from a stimulable phosphor sheet at a read density of 5 lines/mm is inferior in sharpness to a radiation image reproduced at pitches of 10 lines/mm on the basis of an original image signal read out from a stimulable phosphor sheet at a read density of 10 lines/mm though the sizes of images are the same. This is because high frequency components of the original image signal are weakened depending on the characteristic of the filter employed for changing the picture element density of the original image signal, that is, for contracting and interpolating the original image signal and the characteristic of the filter for doubling the contracted original image signal and because the former image is different from the latter image in frequency response characteristic.

Further when a low resolution image is reproduced on the basis of a hierarchical image signal obtained by decomposing an original image signal representing an original image into multiple resolutions, the obtained image becomes inferior to the original image in sharpness depending on the wavelet transformation functions employed in wavelet transformation. Further when a low resolution image is enlarged to the same size as the original image, high frequency components of the original image signal are weakened depending on the characteristic of the filter for enlargement and interpolation and the obtained image becomes inferior to the original image in sharpness. The same problem occurs also when the original image is to be enlarged or contracted to a desired size. Accordingly when the aforesaid frequency enhancement processing is carried out on an image signal representing an image less sharp than the original image, the obtained image becomes different in impression from an image obtained by carrying out the same frequency enhancement processing on the original image signal.

SUMMARY OF THE INVENTION

In view of the foregoing observations and description, the primary object of the present invention is to provide a method of and a system for image processing which can constantly carry out a desired transformation processing, e.g., a processing for enhancing a particular frequency component, so as to result in the same result irrespective of the picture element density of the original image signal.

Another object of the present invention is to provide a method of and a system for image processing which can constantly carry out frequency enhancement processing so as to result in the same result irrespective of the resolution of the image to be processed and without necessity of storing a large number of transformation functions.

Another object of the present invention is to provide a method of and a system for image processing which can constantly carry out frequency enhancement processing so as to result in the same result irrespective of the resolution of the image to be reproduced and without necessity of storing a large number of transformation functions.

Another object of the present invention is to provide a method of and system for image processing which can carry out frequency enhancement processing on an image which is different from an original image in picture element density and/or scale so that the frequency response characteristic of the obtained image becomes equivalent to that of the original image.

Still another object of the present invention is to provide a computer-readable recording medium loaded with program for causing a computer to perform the image processing in accordance with the method of the present invention.

In accordance with a first aspect of the present invention, there is provided an image processing method for obtaining a processed image signal from an original image signal representing an original image having a certain picture element density in which a plurality of intermediate image signals which are different in frequency band are made on the basis of the original image signal, a plurality of transformed image signals are obtained by carrying out a transformation processing on the respective intermediate image signals on the basis of respective transformation functions, and a processed image signal is obtained from the transformed image signals, wherein the improvement comprises the step of defining said transformation functions by determining transformation function defining parameters for the transformation functions on the basis of the picture element density of the original image.

The "transformation processing" includes, for instance, a frequency enhancement processing represented by formulae (2) for enhancing a particular frequency component and a dynamic range compression processing represented by formulae (3) for reducing the contrast of the high density range and/or the low density range, thereby narrowing the dynamic range which is the difference between the maximum density and the minimum density of the original image.

The "picture element density of the original image" may be either input by the operator or may be automatically obtained when the original image signal is processed. In the latter case, information on the picture element density is attached to the original image signal in advance. The "picture element density" may be, for instance, a value of resolution (e.g., in dpi) which represents the relation between the size of the original image and the sampling intervals for obtaining the original image signal as well as the read density at which a radiation image recorded on a stimulable phosphor sheet is read.

Further, the expression "transformation function defining parameters for the transformation functions are determined on the basis of the picture element density of the original image signal" means, for instance, to obtain the parameters by resolving relational expressions of the aforesaid plurality of intermediate image signals, a desired frequency response characteristic and the transformation function defining parameters as simultaneous equations taking the plurality of intermediate image signals and the desired frequency response characteristic as known values and the transformation function defining parameters as variables, or to determine the transformation function defining parameters by gradually changing the parameters while watching the image reproduced on the basis of the processed image signal. As the transformation functions, various functions such as linear functions, non-linear functions, constants and the like can be used.

It is preferred that said plurality of intermediate image signals which are different in frequency band be made by carrying out on the original image signal a filtering processing by use of filters whose coefficients of filter are determined on the basis of the picture element density of the original image, thereby making a plurality of unsharp image signals which are different in frequency response characteristic, making a plurality of band-limited signals representing the signals in the respective frequency bands of the original image signal on the basis of the unsharp image signals and the original image signal, and taking the band-limited signals as the intermediates image signals.

The "unsharp image signals" are image signals which are equivalent to the original image signal in the number of picture elements but represent images which are lower in sharpness than that represented by the original image signal. The unsharp image signals are made by thinning picture elements by filtering picture elements of the original image signal at predetermined intervals, further thinning picture elements by filtering picture elements of the thinned image signal, repeating these procedures, and interpolating picture elements into the image signal with less picture elements obtained at each filtering stage so that the number of the picture elements in the image signal becomes equal to that in the original image signal. The filtering processing is carried out by use of filters having coefficients of filter determined on the basis of the picture element densities, and is described in detail in the above identified Japanese patent publication, Japanese Unexamined Patent Publication No. 10(1998)-63837.

The "plurality of band-limited signals representing the signals in the respective frequency bands of the original image signal" may be made, for instance, by taking differences between unsharp image signals in adjacent frequency bands, differences between the original image signal and the respective unsharp image signals, or differences between any other combinations of the unsharp image signals.

In accordance with a second aspect of the present invention, there is provided an image processing system for obtaining a processed image signal from an original image signal representing an original image having a certain picture element density comprising an intermediate image signal making means which makes a plurality of intermediate image signals which are different in frequency band on the basis of the original image signal, and a transformation means which obtains a plurality of transformed image signals by carrying out a transformation processing on the respective intermediate image signals on the basis of respective transformation functions, and obtains a processed image signal from the transformed image signals, wherein the improvement comprises that a transformation function defining means which determines transformation function defining parameters for the transformation functions on the basis of the picture element density of the original image and defines the transformation functions.

It is preferred that the intermediate image signal making means comprises an unsharp image signal making means which makes a plurality of unsharp image signals which are different in frequency response characteristic by carrying out on the original image signal a filtering processing by use of filters whose coefficients of filter are determined on the basis of the picture element density of the original image, and a band-limited signal making means which makes, as the intermediates image signals, a plurality of band-limited signals representing the signals in the respective frequency bands of the original image signal on the basis of the unsharp image signals and the original image signal.

In accordance with a third aspect of the present invention, there is provided a computer-readable recording medium loaded with program for causing a computer to perform the image processing method in accordance with the first aspect of the present invention.

In accordance with the method and the system of the first and second aspects of the present invention, since the transformation function defining parameters are obtained on the basis of the picture element density of the original image and the transformation processing is carried out according to the transformation functions defined by the transformation function defining parameters, the parameters can be set so that the intermediate image signals different in frequency band are transformed into transformed image signals which are the same in frequency response characteristic irrespective of the picture element density of the original image, whereby the transformation processing can be carried out so that a processed image signal can reproduce an image having a constant frequency response characteristic without affected by the picture element density of the original image.

In accordance with a fourth aspect of the present invention, there is provided an image processing method for obtaining a processed image signal from an original image signal representing an original image at a certain resolution, in which a plurality of intermediate image signals which are different in frequency band are made on the basis of the original image signal, a plurality of transformed image signals are obtained by carrying out a transformation processing on the respective intermediate image signals on the basis of respective transformation functions, and a processed image signal is obtained from the transformed image signals, wherein the improvement comprises that the transformation functions for processing the intermediate image signals obtained from an object original image signal to be processed are determined by correcting, according to the resolution of the object original image signal, reference transformation functions for transforming the intermediate image signals obtained from a reference original image signal representing an image having a reference resolution, the reference transformation functions having been determined and stored in advance.

The "transformation processing" includes, for instance, a frequency enhancement processing represented by formulae (2) for enhancing a particular frequency component and a dynamic range compression processing represented by formula (3) for reducing the contrast of the high density range and/or the low density range, thereby narrowing the dynamic range which is the difference between the maximum density and the minimum density of the original image.

The "resolution of the object original image signal" may be either input by the operator or automatically obtained when the original image signal is processed. In the latter case, information on the resolution is attached to the original image signal in advance. The "resolution" may be, for instance, a value of resolution (e.g., in dpi) which represents the relation between the size of the original image and the sampling intervals for obtaining the original image signal as well as the read density at which a radiation image recorded on a stimulable phosphor sheet is read.

It is preferred that said plurality of intermediate image signals which are different in frequency band be made by carrying out on the original image signal a filtering processing by use of filters having predetermined coefficients of filter, thereby making a plurality of unsharp image signals which are different in frequency response characteristic, making a plurality of band-limited signals representing the signals in the respective frequency bands of the original image signal on the basis of the unsharp image signals and the original image signal, and taking the band-limited signals as the intermediates image signals.

The "unsharp image signals" are image signals which are equivalent to the original image signal in the number of picture elements but represent images which are lower in sharpness than that represented by the original image signal. The unsharp image signals are made by thinning picture elements by filtering picture elements of the original image signal at predetermined intervals, further thinning picture elements by filtering picture elements of the thinned image signal, repeating these procedures, and interpolating picture elements into the image signal with less picture elements obtained at each filtering stage so that the number of the picture elements in the image signal becomes equal to that in the original image signal. The filtering processing is carried out by use of filters having coefficients of filter determined on the basis of the picture element densities, and is described in detail in the above identified Japanese patent publication, Japanese Unexamined Patent Publication No. 10(1998)-63837.

The "plurality of band-limited signals representing the signals in the respective frequency bands of the original image signal" may be made, for instance, by taking differences between unsharp image signals in adjacent frequency bands, differences between the original image signal and the respective unsharp image signals, or differences between any other combinations of the unsharp image signals.

In accordance with a fifth aspect of the present invention, there is provided an image processing system comprising an intermediate image signal making means which makes a plurality of intermediate image signals which are different in frequency band on the basis of an original image signal representing an original image having a predetermined resolution, and a transformation means which obtains a plurality of transformed image signals by carrying out a transformation processing on the respective intermediate image signals on the basis of respective transformation functions, and obtains a processed image signal from the transformed image signals, wherein the improvement comprises that a transformation function calculating means which calculates the transformation functions for processing the intermediate image signals obtained from an object original image signal to be processed by correcting, according to the resolution of the object original image signal, reference transformation functions for transforming the intermediate image signals obtained from a reference original image signal having a reference resolution, the reference transformation functions having been determined and stored in advance.

It is preferred that the intermediate image signal making means comprises an unsharp image signal making means which makes a plurality of unsharp image signals which are different in frequency response characteristic by carrying out on the original image signal a filtering processing by use of filters whose coefficients of filter are determined on the basis of the resolution of the original image signal, and a band-limited signal making means which makes, as the intermediates image signals, a plurality of band-limited signals representing the signals in the respective frequency bands of the original image signal on the basis of the unsharp image signals and the original image signal.

In accordance with a sixth aspect of the present invention, there is provided a computer-readable recording medium loaded with program for causing a computer to perform the image processing method in accordance with the fourth aspect of the present invention.

In accordance with the method and the system of the fourth and fifth aspects of the present invention, since the transformation functions for transforming the intermediate image signals obtained from an object original image signal representing an image whose resolution is different from the reference resolution are obtained by correcting the reference transformation functions according to the resolution of the object original image signal, the transformation functions can be set so that the intermediate image signals are transformed into transformed image signals which are the same in frequency response characteristics irrespective of the picture element density of the original image signal, whereby the transformation processing can be carried out so that a processed image signal can reproduce an image having a constant frequency response characteristic without affected by the resolution of the original image signal.

Further, since the transformation functions for original image signals having resolutions different from the reference resolution are obtained by correcting the reference transformation functions, it is not necessary to prepare a plurality of transformation functions for various resolutions, whereby trouble to manage a plurality of transformation functions can be saved.

In accordance with a seventh aspect of the present invention, there is provided an image processing method for obtaining a processed image signal from an original image signal representing an original image having a certain resolution, in which a plurality of intermediate image signals which are different in frequency band are made on the basis of the original image signal, a plurality of transformed image signals are obtained by carrying out a transformation processing on the respective intermediate image signals on the basis of transformation functions which are set according to the frequency bands of the respective intermediate image signals, and a processed image signal is obtained from the transformed image signals, wherein the improvement comprises the steps of preparing reference transformation functions for transforming the intermediate image signals obtained from a reference original image signal representing a reference original image having a reference resolution which are set according to the frequency bands of the respective intermediate image signals, and, when an object original image signal to be processed represents an original image having a resolution lower than the reference resolution, setting the transformation functions for transforming the intermediate image signals obtained from the object original image signal to be equal to the respective reference transformation functions for the intermediate image signals in the frequency bands not higher than the frequency band corresponding to the resolution of the original image represented by the object original image signal.

The "transformation functions which are set according to the frequency bands of the respective intermediate image signals" are six in number when the intermediate image signals are in six frequency bands. The transformation functions may be constants. The expression "the respective reference transformation functions for the intermediate image signals in the frequency bands not higher than the frequency band corresponding to the resolution of the original image represented by the object original image signal" means, for instance, when the resolution of the original image represented by the object original image signal is $1/2^k$ times that of the reference resolution, the reference transformation functions for the k-th intermediate image signal as numbered from the high frequency side and those in the frequency bands lower than the k-th intermediate image signals. For example, when six intermediate image signals are obtained from the reference original image signal and six transformation functions ($f_1$ to $f_6$, $f_1$ being in the highest frequency band) are set for the respective image intermediate signals with the resolution of the original image represented by the object original image signal being $1/2$ of that of the reference original image, "the respective reference transformation functions for the intermediate image signals in the frequency bands not higher than the frequency band corresponding to the resolution of the original image represented by the object original image signal" are the transformation functions $f_2$ to $f_6$.

In the image processing method in accordance with the seventh aspect of the present invention, it is preferred that said plurality of intermediate image signals be band-limited signals which are made by making, on the basis of the original image signal (the reference original image signal or the object original image signal), a plurality of unsharp image signals which are different in frequency response characteristic, and making a plurality of band-limited signals representing the signals in the respective frequency bands of the original image signal on the basis of the unsharp image signals and the original image signal.

The "unsharp image signals" are image signals which are equivalent to the original image signal in the number of picture elements but represent images which are lower in sharpness than that represented by the original image signal. The unsharp image signals are made by thinning picture elements by filtering picture elements of the original image signal at predetermined intervals, further thinning picture elements by filtering picture elements of the thinned image signal, repeating these procedures to obtain a plurality of low resolution image signals respectively representing images whose resolutions are $1/2^n$ of that of the image represented by the reference original image signal, and interpolating picture elements into the low resolution image signal with less picture elements obtained at each filtering stage so that the number of the picture elements in the image signal becomes equal to that in the original image signal.

The "plurality of band-limited signals representing the signals in the respective frequency bands of the original image signal" may be made, for instance, by taking differences between unsharp image signals in adjacent frequency bands, differences between the original image signal and the respective unsharp image signals, or differences between any other combinations of the unsharp image signals.

Further, it is preferred that information on the resolution of the original image represented by the object original image signal be obtained and the step of setting the transformation functions for transforming the intermediate image signals obtained from the object original image signal be executed on the basis of the information.

The resolution information may be input as a value by the operator through a keyboard or by the operator selecting a value from a plurality of resolutions displayed on a control screen. Further, the resolution information may be attached to the object original image signal and may be detected by the image processing system. The resolution information may be input in any way so long as the system can recognize the resolution of the original image represented by the object original image signal.

In the image processing method in accordance with the seventh aspect of the present invention, when the original image represented by the object original image signal to be processed has a resolution lower than the reference resolution, the transformation functions for transforming the intermediate image signals obtained from the object original image signal are set to be equal to the respective reference transformation functions for the intermediate image signals in the frequency bands not higher than the frequency band corresponding to the resolution of the original image represented by the object original image signal. When the resolution of the original image represented by the object original image signal is $1/2^n$ of the resolution of the reference original image represented by the reference original image signal, the peak frequencies of the intermediate image signals obtained from the object original image signal are the same as those of a part of the reference intermediate image signals (obtained from the reference original image signal) which are in frequency bands not higher than the frequency band corresponding to the resolution of the original image represented by the object original image signal. Accordingly, when the intermediate image signals obtained from the object original image signal are transformed on the basis of the reference transformation functions for the part of the reference intermediate image signals which are in frequency bands not higher than the frequency band corresponding to the resolution of the original image represented by the object original image signal, the obtained transformed image signals are substantially the same as the reference transformed image signals in frequency response characteristics. The processed image signal can reproduce an image which is substantially the same in frequency response characteristic as an image reproduced on the basis of the processed image signal obtained from the reference original image signal. Thus in accordance with the image processing method of the seventh aspect of the present invention, a processed image signal which can reproduce an image which is substantially constant in frequency response characteristic can be obtained irrespective of the resolution of the object original image signal.

Further, since the transformation functions for obtaining the processed image signal from the reference original image signal are employed to obtain the processed image signal from the object original image signal, it is not necessary to prepare a plurality of transformation functions for various resolutions, whereby the system can be simplified in structure and trouble to manage a plurality of transformation functions can be saved.

In accordance with an eighth aspect of the present invention, there is provided an image processing system for carrying out the image processing method in accordance with the seventh aspect of the present invention.

In accordance with a ninth aspect of the present invention, there is provided a computer-readable recording medium loaded with program for causing a computer to perform the image processing method in accordance with the seventh aspect of the present invention.

In accordance with a tenth aspect of the present invention, there is provided an image processing method for making a contraction-processed image signal representing an image having a desired resolution lower than that of an image represented by a reference processed image signal which is obtained by making first to n-th reference low resolution image signals from a reference original image signal representing a reference original image, the reference low resolution image signals being different from each other in frequency band and respectively representing images whose resolutions are $1/2^k$ (k=1 to n) of the resolution of the reference original image signal; making reference low-resolution band-limited signals on the basis of the reference low resolution image signals; obtaining a plurality of reference transformed image signals by carrying out a predetermined transformation processing on the reference low resolution band-limited signals on the basis of a plurality of reference transformation functions which are set according to the respective frequency bands of the reference low resolution band-limited signals; and carrying out a predetermined processing on the reference transformed image signals, the image processing method characterized by the steps of taking as an original image signal one of said first to n-th reference low resolution image signals representing an image whose resolution is the closest to said desired resolution in the images represented by the reference low resolution image signals; making first to m-th low resolution image signals from the original image signal, the low resolution image signals being different from each other in frequency band and respectively representing images whose resolutions are $1/2^{k'}$ (k'=1 to m) of the resolution of the original image signal; making a low-resolution band-limited signals on the basis of the low resolution image signals; obtaining a plurality of transformed image signals by carrying out said predetermined transformation processing on the low resolution band-limited signals on the basis of a part of said reference transformation functions which are set for the respective frequency bands of the reference low resolution band-limited signals not higher than the frequency band corresponding to the resolution closest to said desired resolution; carrying out said predetermined processing on the transformed image signals, thereby obtaining an intermediate processed image signal; enlarging or contracting the intermediate processed image so that the resolution of the image represented by the intermediate processed image signal becomes equal to the desired resolution; and taking the enlarged or contracted intermediate processed image signal as the contraction-processed image signal.

In the image processing method in accordance with the tenth aspect of the present invention, out of the reference low resolution image signals obtained from the reference original image signal, a reference low resolution image signal representing an image whose resolution is closest to the desired resolution is taken as an object original image signal for obtaining a contraction-processed image signal, and a plurality of low resolution image signals are obtained from the object original image signal. Accordingly, the peak frequencies of the low resolution band-limited signals obtained from the object original image signal are the same as those of a part of the reference low resolution band-limited signals which are in frequency bands not higher than the frequency band corresponding to the resolution closest to the desired resolution. Accordingly, when the low resolution band-limited signals obtained from the object original image signal are transformed on the basis of the reference transformation functions for the part of the reference low resolution band-limited signals which are in frequency bands not higher than the frequency band corresponding to the resolution closest to the desired resolution, the obtained transformed image signals are substantially the same as the reference transformed image signals in frequency response characteristics. The contraction-processed image signal obtained by enlarging or contracting the intermediate processed image signal obtained from the transformed image signals so that the resolution of the image represented by the intermediate processed image signal becomes equal to the desired resolution can reproduce an image which is substantially the same in frequency response characteristic as an image reproduced on the basis of the reference processed image signal. Thus in accordance with the image processing method of the tenth aspect of the present invention, a contraction-processed image signal which can reproduce an image which is substantially constant in frequency response characteristic can be obtained irrespective of the resolution of the image to be reproduced.

Further, since the transformation functions for obtaining the reference processed image signal are employed to obtain the contraction-processed image signal, it is not necessary to prepare a plurality of transformation functions for various resolutions, whereby the system can be simplified in structure and trouble to manage a plurality of transformation functions can be saved.

In accordance with an eleventh aspect of the present invention, there is provided an image processing system for carrying out the image processing method in accordance with the tenth aspect of the present invention.

In accordance with a twelfth aspect of the present invention, there is provided a computer-readable recording medium loaded with program for causing a computer to perform the image processing method in accordance with the tenth aspect of the present invention.

In accordance with a thirteenth aspect of the present invention, there is provided an image processing method for obtaining a processed image signal from an original image signal representing an original image having a certain picture element density, in which a plurality of intermediate image signals which are different in frequency band are made on the basis of the original image signal, a plurality of transformed image signals are obtained by carrying out a transformation processing on the respective intermediate image signals on the basis of respective transformation functions, and a processed image signal in which a predetermined frequency component is enhanced is obtained from the transformed image signals, wherein the improvement comprises that when an object original image signal to be processed is a contracted image signal obtained by carrying out a picture element density transformation processing on a reference original image signal representing an image having a reference picture element density, the transformation functions for processing the intermediate image signals obtained from the object original image signal are determined by correcting, according to the characteristic of the picture element density transformation processing, reference transformation functions for transforming the intermediate image signals obtained from the reference original image so that the frequency response characteristic of a desired frequency component of the processed image signal obtained from the object original image signal becomes equivalent to that of the processed image signal obtained from the reference original image signal, the reference transformation functions having been determined and stored in advance.

It is preferred that when the processed image signal obtained from the contracted image signal is enlarged at a magnification, the transformation functions for processing the intermediate image signals obtained from the object original image signal be determined by correcting the reference transformation functions according to the characteristic of the picture element density transformation processing and the characteristic of the enlargement.

In accordance with a fourteenth aspect of the present invention, there is provided an image processing method for obtaining a processed image signal from an original image signal representing an original image, in which a plurality of intermediate image signals which are different in frequency band are made on the basis of the original image signal, a plurality of transformed image signals are obtained by carrying out a transformation processing on the respective intermediate image signals on the basis of respective transformation functions, and a processed image signal in which a predetermined frequency component is enhanced is obtained from the transformed image signals, wherein the improvement comprises that when an enlarged processed image signal is to be obtained by enlarging the processed image signal at a desired magnification by carrying out an enlargement transformation on the processed image signal, the transformation functions for transforming the respective intermediate image signals are corrected according to the characteristic of the enlargement transformation so that the frequency response characteristic of a desired frequency component of the enlarged processed image signal becomes a predetermined frequency response characteristic.

In the image processing methods in accordance with the thirteenth and fourteenth aspects of the present invention, it is preferred that said plurality of intermediate image signals be band-limited signals which are made by making, on the basis of the original image signal, a plurality of unsharp image signals which are different in frequency response characteristic, and making a plurality of band-limited signals representing the signals in the respective frequency bands of the original image signal on the basis of the unsharp image signals and the original image signal.

In accordance with fifteenth and sixteenth aspects of the present invention, there are provided image processing systems for carrying out the image processing methods in accordance with the thirteenth and fourteenth aspects of the present invention.

In accordance with seventeenth and eighteenth aspects of the present invention, there is provided a computer-readable recording medium loaded with program for causing a computer to perform the image processing methods in accordance with the thirteenth and fourteenth aspects of the present invention.

BRIEF DESCRIPTION OF THE DRAWINGS

FIG. 31 is a view showing the frequency response characteristics of the band-limited signals obtained from an original image signal at 200 dpi, FIG. 32 shows the frequency response characteristics of the processed image signal $S_{proc}$ obtained by processing the original image signal $S_{org}$ at 200 dpi by use of the reference transformation functions (broken line) and the processed image signal $S_{proc}0$ obtained by processing the reference original image signal $S_{org}0$ at the reference picture element density by use of the reference transformation functions (solid line), FIG. 39A is a view showing the frequency response characteristic of the reference processed image signal obtained by transforming the band-limited signals from the reference image signal (having a picture element density of 5 lines/mm) by use of reference transformation functions which are set so that relatively low frequency components are enhanced and the frequency response characteristic of the processed image signal obtained by transforming the band-limited signals from the original image signal to be processed by use of the transformation functions which are obtained by correcting the reference transformation functions according to the picture element density (4 lines/mm) of the original image signal to be processed so that the frequency response characteristic of the processed image signal conforms to that of the reference processed image signal in frequency bands not lower than ½ of the Nyquist frequency of the original image signal to be processed, FIG. 39B is a view showing the frequency response characteristic of the reference processed image signal obtained by transforming the band-limited signals from the reference image signal. (having a picture element density of 5 lines/mm) by use of reference transformation functions which are set so that relatively high frequency components are enhanced and the frequency response characteristic of the processed image signal obtained by transforming the band-limited signals from the original image signal to be processed by use of the transformation functions which are obtained by correcting the reference transformation functions according to the picture element density (4 lines/mm) of the original image signal to be processed so that the frequency response characteristic of the processed image signal conforms to that of the reference processed image signal in frequency bands not lower than ½ of the Nyquist frequency of the original image signal to be processed, FIGS. 41A to 41C are views for illustrating encoding the hierarchical image signals, FIG. 53 is a view showing correspondence between the unsharp image signals obtained from the reference original image signal $S_{org}$ and those obtained from an object low resolution image signal, FIG. 54 is a view showing correspondence between the band-limited signals obtained from the reference original image signal $S_{org}$ and those obtained from an object low resolution image signal, FIG. 57 is a view showing correspondence between the band-limited signals obtained from the reference original image signal $S_{org}$ and those obtained from object original image signals, FIG. 58 is a view showing correspondence between the transformation functions for the band-limited signals obtained from the reference original image signal $S_{org}$ and those for the band-limited signals obtained from object original image signals, FIG. 61 is a view showing the frequency response characteristic of the interpolation filter, FIG. 65 is a schematic block diagram showing the arrangement of an image processing system in accordance with an eighth embodiment of the present invention, FIGS. 66A to 66C are views for illustrating encoding the hierarchical image signals, FIG. 69 is a view showing an example of table data storing therein a space frequency characteristic representing the characteristic of enlargement or the characteristic of contraction, and FIGS. 70A and 70B are views showing the parameters employed in a Gaussian function representing the space frequency characteristic which in turn represents the characteristic of enlargement or the characteristic of contraction.

DESCRIPTION OF THE PREFERRED EMBODIMENTS

An image processing system in accordance with a first embodiment of the present invention will be described, hereinbelow. The image processing system is for carrying out a frequency enhancement processing by use of unsharp image signals on an original image signal obtained by reading out a radiation image of a human body recorded on a stimulable phosphor sheet so that an image suitable for diagnosis can be obtained. An image reproduced on the basis of the processed image signal is mainly recorded on photographic film and used in diagnosis.

Figure 1:
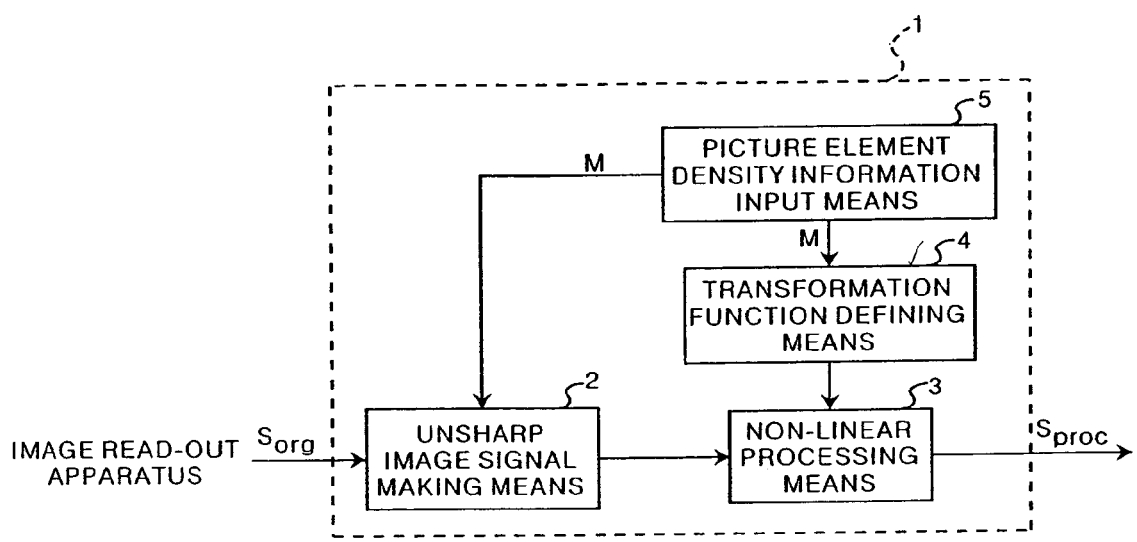
FIG. 1 is a schematic block diagram showing the arrangement of an image processing system in accordance with a first embodiment of the present invention.

In FIG. 1, an image processing system 1 in accordance with a first embodiment of the present invention comprises an unsharp image signal making means 2 which makes a plurality of unsharp image signals from an original image signal $S_{org}$ which is input from an image read-out apparatus or the like and has a predetermined picture element density, and a non-linear processing means 3 which carries out a frequency enhancement processing for enhancing a particular frequency and obtains a processed image signal $S_{proc}$. The image processing system 1 further comprises a transformation function defining means 4 and a picture element density information input means 5. The transformation function defining means 4 is a means which defines transformation functions which the non-linear processing means 3 uses in the transformation processing, for instance, by determining parameters such as inclinations of the functions and degrees of non-linearity on the basis of picture element density information M input from the picture element density information input means 5 and defining the functions on the basis of the parameters. The picture element density information input means 5 is a means for obtaining picture element density information M on the original image signal $S_{org}$. The picture element density information M may be input as a value by the operator by a keyboard or by the operator selecting a value from a plurality of picture element densities displayed on a control screen. Further, the picture element density information M may be attached to the original image signal $S_{org}$ in the read-out apparatus and may be detected by the image processing system 1. The picture element density information M may be input in any way so long as the transformation function defining means 4 can recognize the picture element density of the original image signal $S_{org}$.

Figure 2:
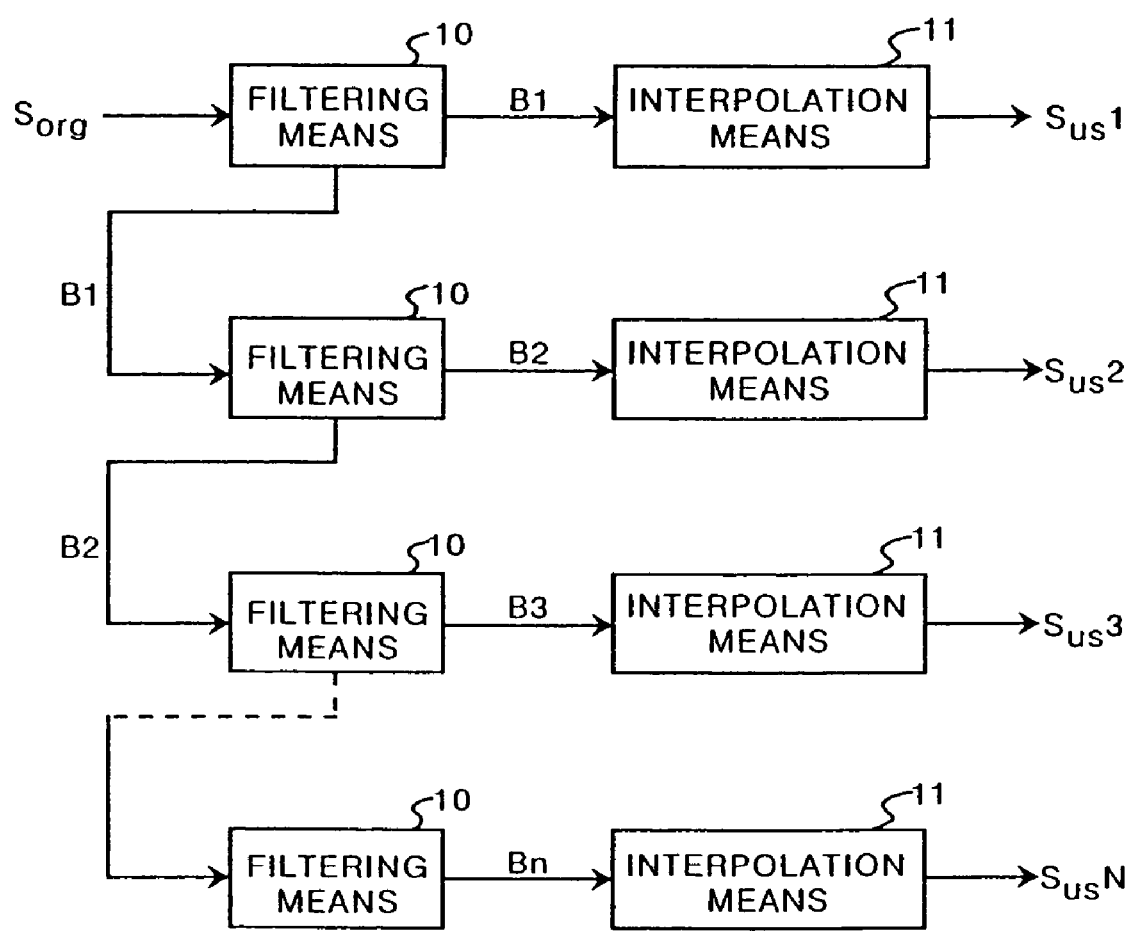
FIG. 2 is a schematic block diagram showing the arrangement of the unsharp image signal making means employed in the image processing system shown in FIG. 1, FIGS. 3A and 3B are views showing examples of the filter to be used in the filtering processing.

Making the unsharp image signals will be first described, hereinbelow. As shown in FIG. 2, the unsharp image signal making means 2 comprises first to n-th filtering means 10. The first filtering means 10 carries out a filtering processing on the original image signal $S_{org}$ in x- and y-directions and makes a low resolution image signal B1 which is lower than the original image signal $S_{org}$ in resolution. The second filtering means 10 carries out a similar filtering processing on the low resolution image signal B1 thus obtained and makes a low resolution image signal B2 which is lower than the low resolution image signal B1 in resolution, and the third filtering means 10 carries out a similar filtering processing on the low resolution image signal B2 thus obtained and makes a low resolution image signal B3 which is lower than the low resolution image signal B3 in resolution. In this manner, the n-th filtering means 10 carries out a similar filtering processing on the low resolution image signal Bn−1 and makes a low resolution image signal Bn which is lower than the low resolution image signal Bn−1 in resolution. The unsharp image signal making means 2 further comprises first to n-th interpolation means 11. The interpolation means 11 carry out an interpolation/enlargement processing on the low resolution image signals B1 to Bn obtained at the respective stages of filtering, and makes a plurality of unsharp image signals $S_{us}1$ to $S_{us}N$ which are different in sharpness.

In this particular embodiment, filters which substantially conform to one-dimensional Gaussian distribution are used in the filtering processing. That is, coefficients of the filters are determined according the following formula (4) which relates to a Gaussian signal.

$$f(t) = e^{-\frac{t^2}{2\sigma^2}} \quad (4)$$

This is because the Gaussian signal is good in localization in both a real space and a frequency space. For example, the 7×1 one-dimensional filters are as shown in FIG. 3A when σ=1 in formula (4).

Figures 3A, 3B, 4, 5:
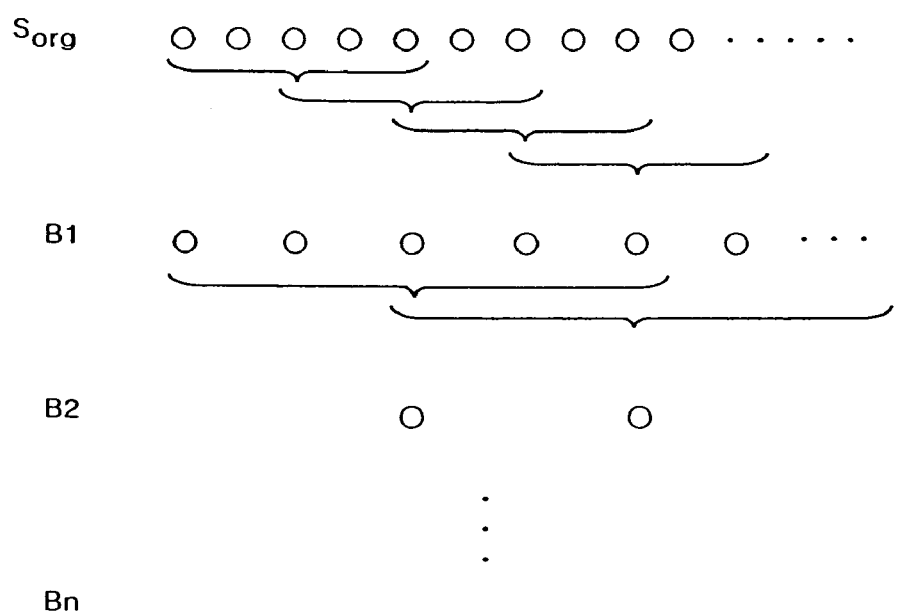
FIG. 4 shows in detail the low-resolution image signal making processing.
FIG. 5 is a view showing an example of the filter employed in the interpolation/enlargement processing.

The filtering is carried out on the original image signal $S_{org}$ or the low resolution image signals every second picture element as shown in FIG. 4. When such filtering is carried out in both x- and y-directions, the number of picture elements in obtained low resolution image signal is reduced to ¼ of the preceding image signal (e.g., the original image signal $S_{org}$ in the case of the low resolution image signal B1, and the low resolution image signal B1 in the case of the low resolution image signal B2). That is, the number of picture elements in each of the low resolution image signals $B_k$(k stands for 1 to n) is $1/2^{2k}$ of the original image signal $S_{org}$.

The interpolation/enlargement processing to be carried out on the low resolution image signals Bk thus obtained will be described, hereinbelow. Though various methods of interpolation such as B-spline can be employed, a Gaussian signal is also employed in the interpolation in this particular embodiment since low-pass filters based on Gaussian signals are employed in the filtering processing. Specifically, an approximation, $\sigma = 2^{k-1}$, is employed in the following formula (5).

$$I(t) = 2 \cdot \sigma \cdot e^{-\frac{t^2}{2\sigma^2}} \quad (5)$$

When interpolating the low resolution image signal B1, σ=1 since k=1. In this case, a one-dimensional filter of 5×1 such as shown in FIG. 5 is employed in the interpolation. In this interpolation, a picture element of 0 in value is interpolated every second picture element in the low resolution image signal B1, whereby the low resolution image signal B1 is enlarged to a size equal to the size of the original image, and the interpolated low resolution image signal B1 is subjected to a filtering processing using the one-dimensional filter shown in FIG. 5.

This interpolation/enlargement processing is carried out on all the low resolution image signals B1 to Bn. When interpolating a low resolution image signal Bk, a filter which is $3 \times 2^k - 1$ in length is prepared according to formula (5) and $2^k - 1$ picture elements of 0 in value are interpolated between each pair of adjacent picture elements, whereby the low resolution image signal Bk is enlarged to a size equal to the size of the original image signal. Then the interpolated low resolution image signal Bk is subjected to a filtering processing using the filter which is $3 \times 2^k - 1$ in length.

The frequency enhancement processing has been generally based on the assumption that the picture element density at which the original image signal $S_{org}$ is obtained is constant, and the processed image signal $S_{proc}$ has been made without taking into account the picture element density. However, in a practical image processing system, various image signals are input and all the image signals are not the same in picture element density. For example, in the radiation image processing system of this embodiment, the picture element density differs according to the size of the stimulable phosphor sheet, and is 5 lines/mm in a half size, 6.7 lines/mm in a quarter size and 10 lines/mm in a sixmo size. Further, the user can freely set the picture element density.

When image signals which are different in picture element density and accordingly in Nyquist frequency are subjected to a filtering processing using the same low-pass filters and to the same interpolation processing, band-limited signals obtained from unsharp signals $S_{us}k$ in a manner to be described later become different from each other in frequency response characteristic according to the picture element density. For example, when band-limited signals are made from unsharp image signals $S_{us}k$ obtained by carrying out a filtering processing using a one-dimensional filter shown in FIG. 3A on original image signals which are respectively read at 10 lines/mm, 5 lines/mm and 6.7 lines/ mm, the band-limited signals from the original image signal at 6.7 lines/mm quite differs in frequency bands from those from the original image signals at 10 lines/mm and 5 lines/mm though the latter band-limited signals are the same in frequency bands since the original image signal 5 lines/mm is a half of that at 10 lines/mm in Nyquist frequency. In this embodiment, the filtering processing is carried out using the filter shown in FIG. 3A on original image signals at 10 lines/mm and 5 lines/mm and using the filter shown in FIG. 3B on original image signals at 6.7 lines/mm so that the frequency bands of the obtained band-limited signals become substantially the same irrespective of the picture element density of the original image signal. The unsharp image signal making means 2 switches the filters on the basis of the picture element density information M input from the picture element density information input means 5.

Figure 6:
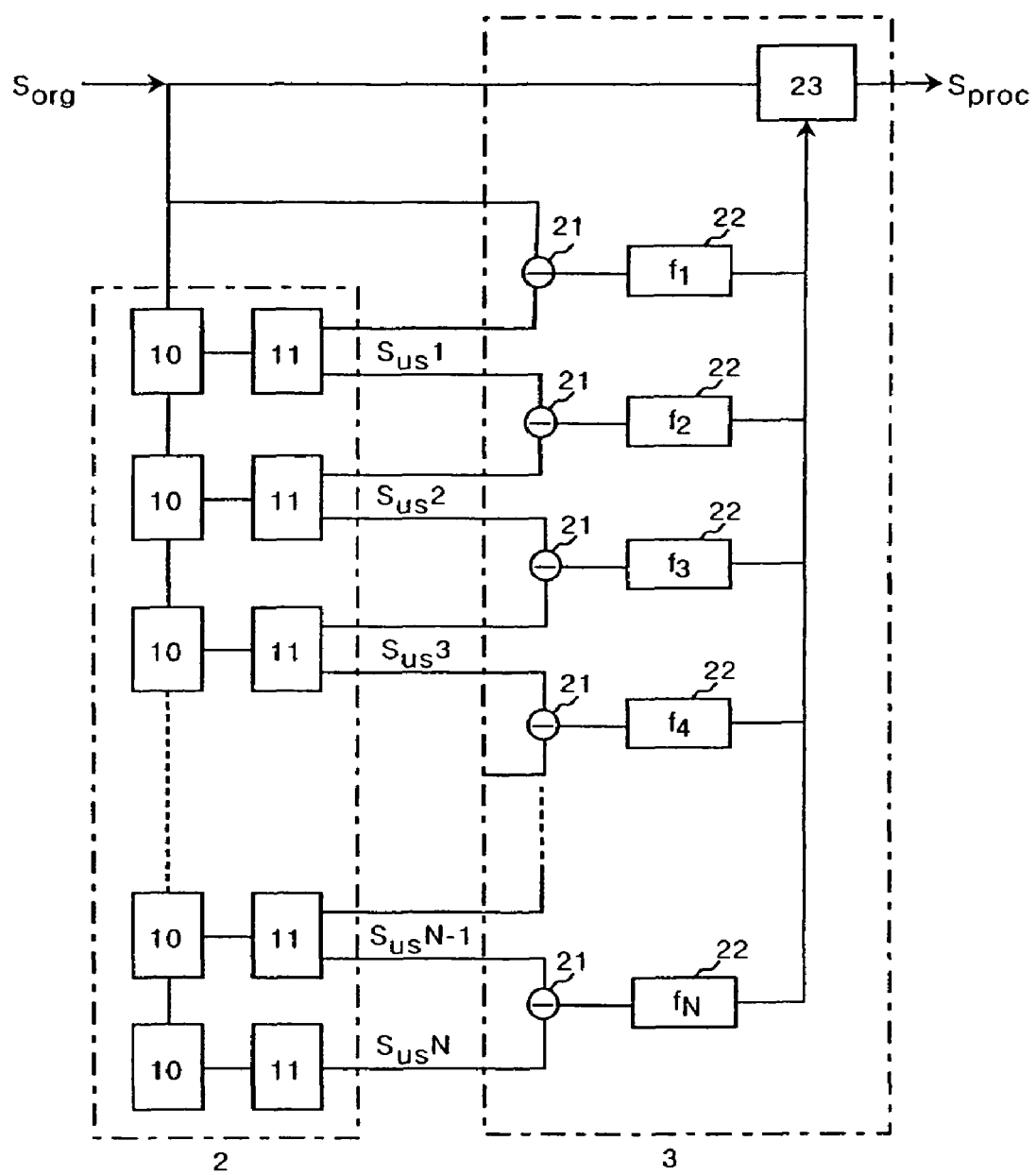
FIG. 6 is a view showing system for executing a frequency enhancement processing as a non-linear processing.

The non-linear processing to be carried out on the unsharp image signals $S_{us}k$ (k stands for 1 to n) thus obtained will be described, hereinbelow. FIG. 6 shows a system for carrying out a frequency enhancement processing (an example of the non-linear processing) together with the unsharp image signal making means 2. As shown in FIG. 6, unsharp image signals $S_{us}k$ are made from the original image signal $S_{org}$ and differences between the original image signal $S_{org}$ and the unsharp image signals $S_{us}k$ are taken by respective subtractors 21, whereby band-limited signals ($S_{org}-S_{us}1$, $S_{us}1-S_{us}2$, and the like) which are components in limited frequency bands of the original image signal $S_{org}$ are made.

The band-limited signals are transformed to predetermined amplitudes with different transformation functions $f_1$ to $f_N$ in respective transformation circuits 22 and the transformed band-limited signals are added up and further added to the original image signal $S_{org}$ by an operator 23 according to the following formulae (2), whereby a processed image signal $S_{proc}$ in which a desired frequency components is enhanced to a required degree is generated.

$$S_{proc}=S_{org}+\beta(S_{org})\times F_{usm}(S_{org}, S_{us}1, S_{us}2, \ldots S_{us}N)$$

$$F_{usm}(S_{org}, S_{us}1, S_{us}2, \ldots S_{us}N)=f_1(S_{org}-S_{us}1)+f_2(S_{us}1-S_{us}2)+\ldots+f_k(S_{us}k-1-S_{us}k)+\ldots+f_N(S_{us}N-1-S_{us}N) \quad (2)$$

wherein $S_{proc}$ is a processed image signal in which the high-frequency components are enhanced, $S_{org}$ is an original image signal, $S_{us}k$ (k=1 to N) are unsharp image signals, $f_k$(k=1 to N) is a transformation function, and $\beta(S_{org})$ is a coefficient of enhancement determined on the basis of the original image signal.

As the transformation functions $f_k$, non-linear functions represented by the following formula (6) are employed.

$$f(S_{in})=S_{out}=S_{in}\times Y\times\{\exp(X/S_{in})-1\}/\{\exp(X/S_{in})+1\} \quad (6)$$

wherein $S_{in}$ represents an input signal, $S_{out}$ represents an output signal, X represents a parameter which governs the degree of non-linearity, and Y represents a parameter which controls the inclination of the overall function. By adjusting the parameters X and Y, the frequency response characteristic of the band-limited signal can be changed.

The processed image signal $S_{proc}$ is thus made. The problem to be solved by this embodiment and the manner of solving the problem in this embodiment will be described through an example, hereinbelow. When the filtering processing is carried out on the original image signal $S_{org}$ using a filter which is determined according to the picture element density of the original image signal $S_{org}$, thereby obtaining unsharp image signals $S_{us}k$, and band-limited signals are obtained from the unsharp image signals $S_{us}k$ as disclosed in Japanese Unexamined Patent Publication No. 10(1998)-63837, the band-limited signals can be in the same frequency bands irrespective of the picture element density of the original image signal $S_{org}$. However, in this case, the frequency response characteristics of the band-limited signals differ according to the picture element density of the original image signal $S_{org}$.

Figure 7:
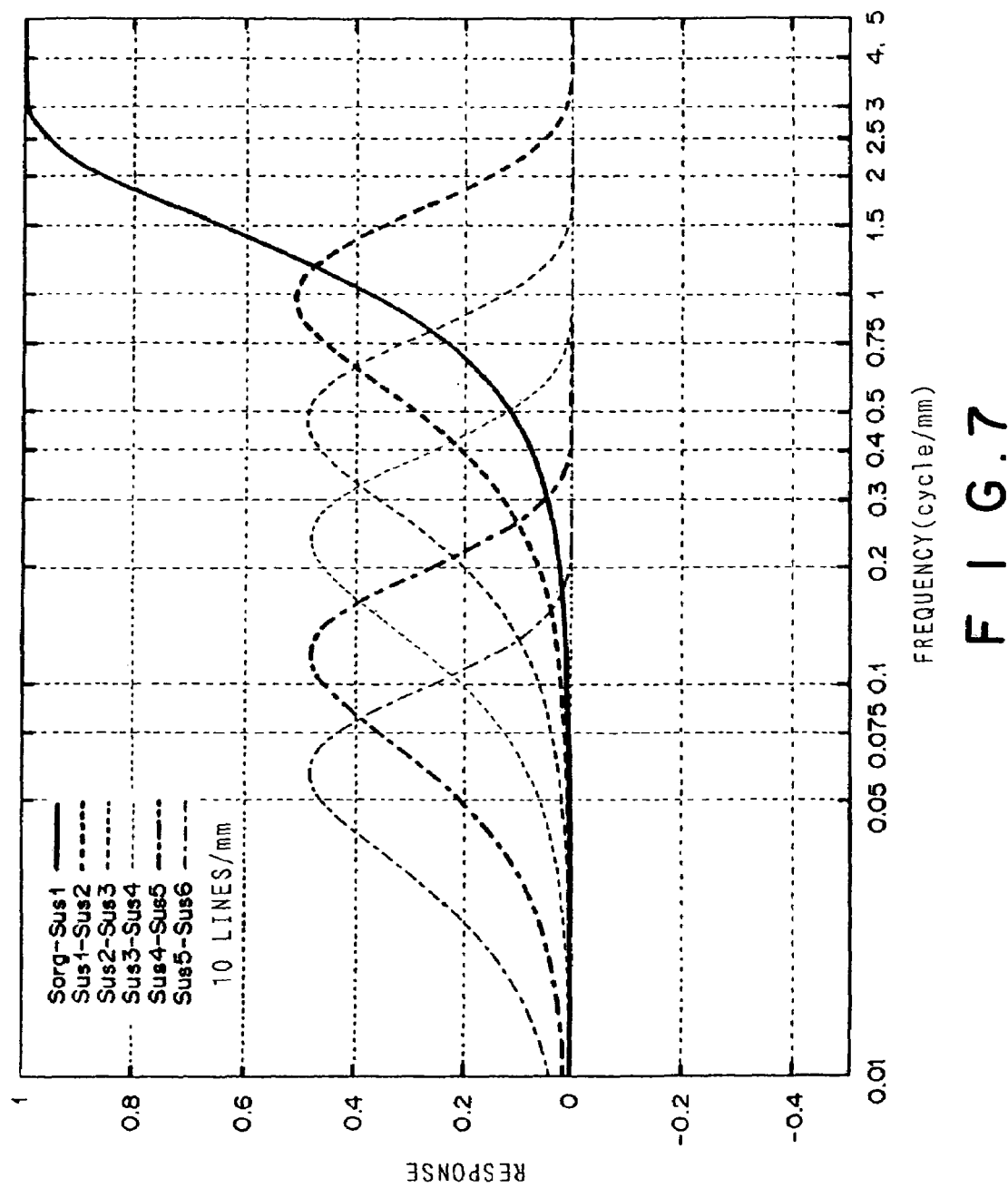
FIG. 7 shows the frequency response characteristics of band-limited signals obtained by carrying out, on an original image signal at a picture element density of 10 lines/mm, the filtering processing using the one-dimensional filter shown in FIG. 3A.
Figure 8:
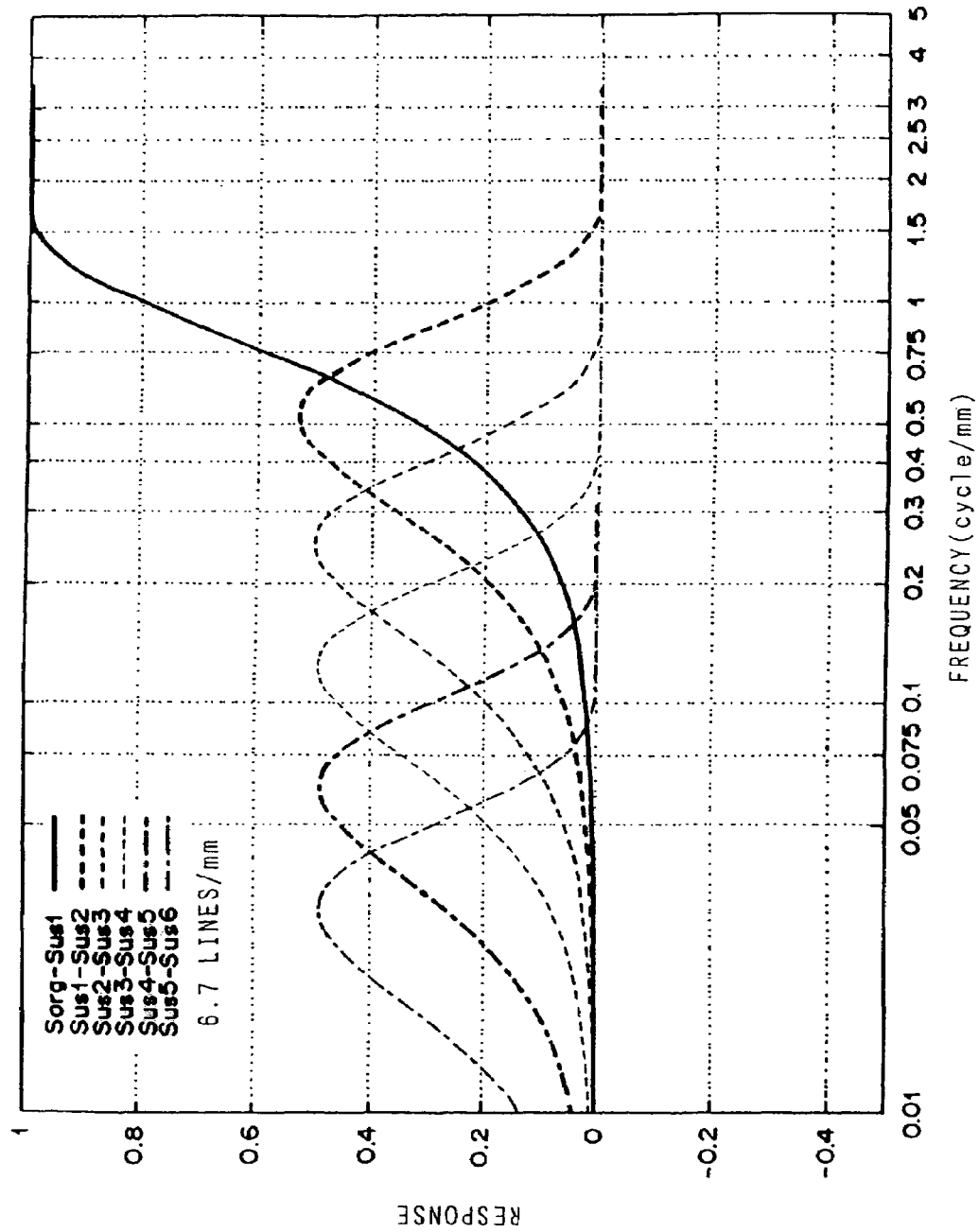
FIG. 8 shows the frequency response characteristics of band-limited signals obtained by carrying out, on an original image signal at a picture element density of 6.7 lines/mm, the filtering processing using the one-dimensional filter shown in FIG. 3B.
Figure 9:
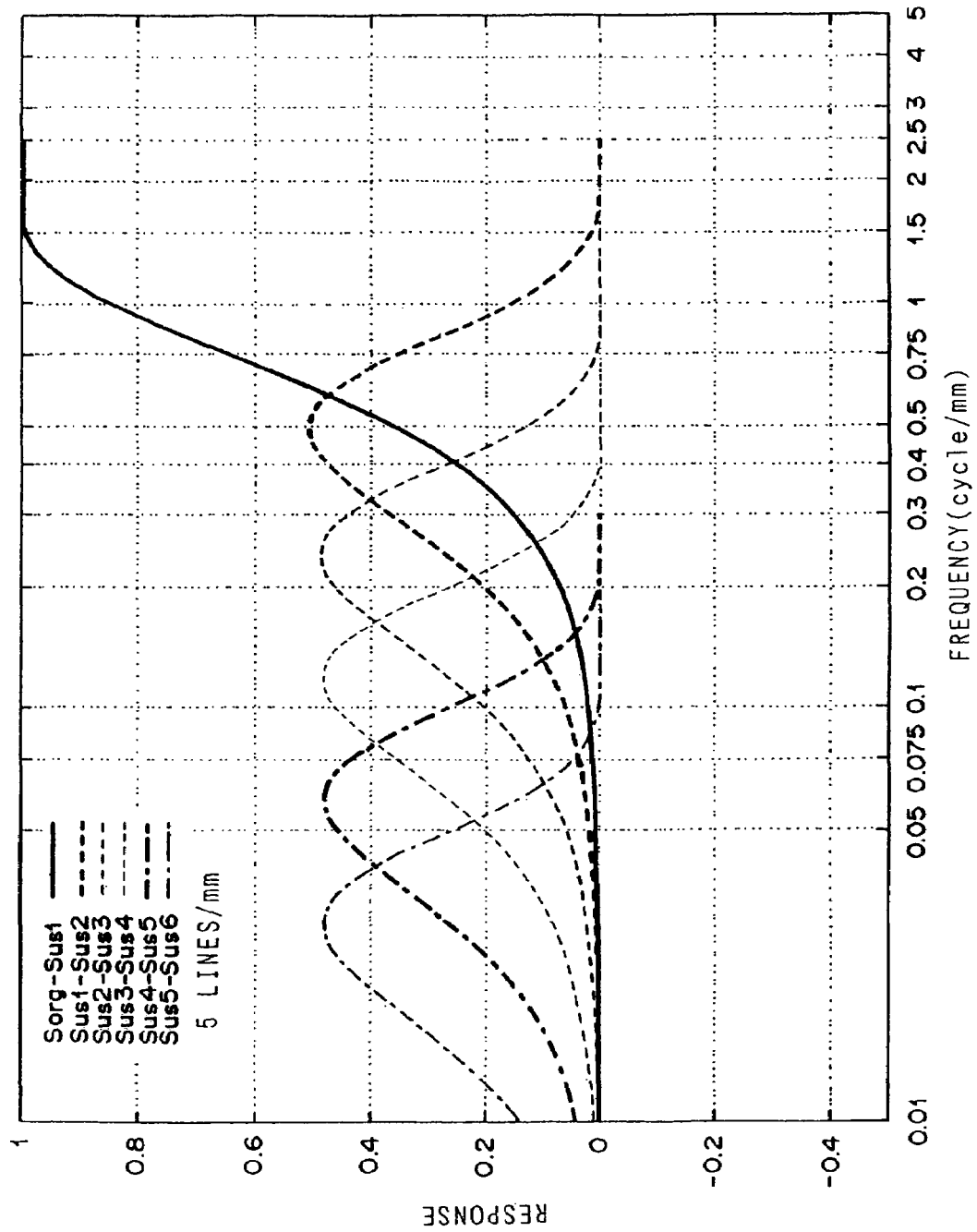
FIG. 9 shows the frequency response characteristics of band-limited signals obtained by carrying out, on an original image signal at a picture element density of 5 lines/mm, the filtering processing using the one-dimensional filter shown in FIG. 3A.

FIG. 7 shows the frequency response characteristics of band-limited signals ($S_{org}-S_{us}1$, $S_{us}1-S_{us}2$, $S_{us}2-S_{us}3$, $S_{us}3-S_{us}4$, $S_{us}4-S_{us}5$, $S_{us}5-S_{us}6$) obtained by carrying out, on an original image signal at a picture element density of 10 lines/mm, the filtering processing using the one-dimensional filter shown in FIG. 3A. FIG. 8 shows the frequency response characteristics of band-limited signals ($S_{org}-S_{us}1$, $S_{us}1-S_{us}2$, $S_{us}2-S_{us}3$, $S_{us}3-S_{us}4$, $S_{us}4-S_{us}5$, $S_{us}5-S_{us}6$) obtained by carrying out, on an original image signal at a picture element density of 6.7 lines/mm, the filtering processing using the one-dimensional filter shown in FIG. 3B. FIG. 9 shows the frequency response characteristics of band-limited signals ($S_{org}-S_{us}1$, $S_{us}1-S_{us}2$, $S_{us}2-S_{us}3$, $S_{us}3-S_{us}4$, $S_{us}4-S_{us}5$, $S_{us}5-S_{us}6$) obtained by carrying out, on an original image signal at a picture element density of 5 lines/mm, the filtering processing using the one-dimensional filter shown in FIG. 3A. As can be seen from FIGS. 7 to 9, though the maximum frequency band of the band-limited signals can be determined according to the picture element density, the peak frequencies of the band-limited signals obtained from the respective original image signals other than the maximum frequency band are reduced ½ by ½, e.g., 1 (only in the case of picture element density of 10 lines/mm), 0.5, 0.25, 0.125. . . . That is, the peak frequency of k-th band-limited signal is ½ of (k−1)-th band-limited signal for each picture element density. Whereas, the response at each peak frequency, that is, energy of each band-limited signal, differs according to the picture element density. Accordingly, if the same parameters X and Y (formula (6)) are used for different picture element densities, the frequency response characteristic of the obtained processed image signal $S_{proc}$ differs according to the picture element density of the original image signal $S_{org}$.

Figure 10:
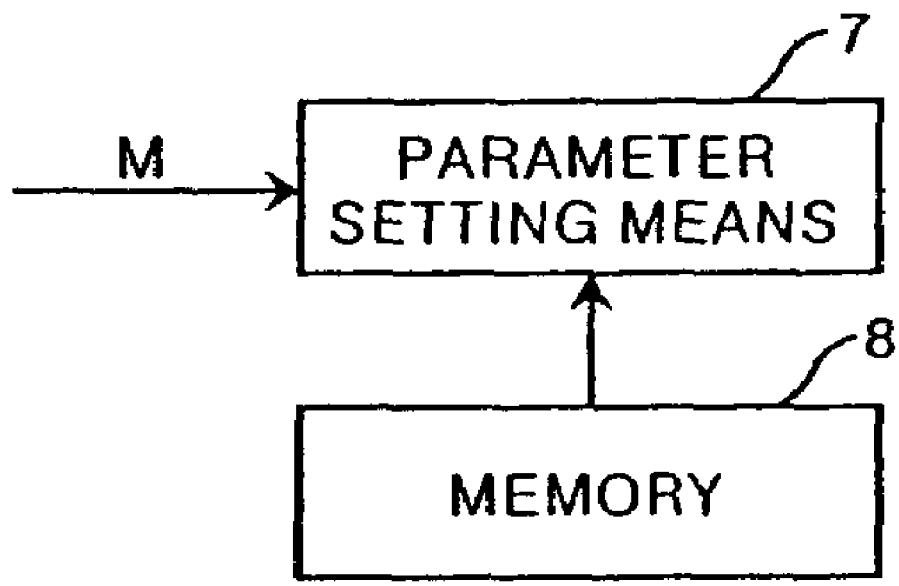
FIG. 10 is a schematic block diagram showing the structure of the transformation function defining means.

In accordance with the present invention, in order to overcome this problem, the transformation function defining means 4 sets the parameters X and Y of the transformation function on the basis of the picture element density information M input from the picture element density information input means 5 and the band-limited signals are transformed according to the transformation function which is defined according to the picture element density of the original image signal $S_{org}$. FIG. 10 shows in detail the structure of the transformation function defining means 4. As shown in FIG. 10, the transformation function defining means 4 comprises a parameter setting means 7 and a memory 8 in which combinations of parameters X and Y for each picture element density are stored.

An example of combination of parameters X and Y is shown in the following table 1. In the combinations of parameters X and Y shown in table 1, the parameters X and Y for the picture element densities of 6.7 lines/mm and 5 lines/mm are set so that a processed image signal $S_{proc}$ having a frequency response substantially equal to that obtained by the parameters X and Y for the picture element density of 10 lines/mm can be obtained. In table 1, the parameters X and Y for each picture element density on higher lines are for band-limited signals in higher frequency bands, and since no band-limited signal having a frequency peak at 0.03 cycles/mm exists for the picture element densities of 6.7 lines/mm and 5 lines/mm, no parameter is given.

TABLE 1

| 10 lines/mm | | 6.7 lines/mm | | 5 lines/mm | |
|---|---|---|---|---|---|
| X | Y | X | Y | X | Y |
| 15 | 1.00 | 20 | 1.00 | 20 | 1.00 |
| 20 | 0.99 | 30 | 0.83 | 30 | 0.81 |
| 30 | 0.80 | 40 | 0.67 | 40 | 0.66 |
| 40 | 0.66 | 50 | 0.43 | 50 | 0.42 |
| 50 | 0.41 | 60 | 0.32 | 60 | 0.29 |
| 60 | 0.29 | | | | |

The parameter setting means 7 selects the combinations of parameters X and Y stored in the memory 8 according to the picture element density represented by the picture element density information M input from the picture element density information input means 5, and the selected combinations of parameters X and Y are input into the transformation function defining means 4. The transformation function defining means 4 defines the transformation functions on the basis of the selected combinations of parameters X and Y, and the non-linear processing means 3 carries out on the-band-limited signals according to formulae (2) on the basis of the transformation functions thus defined.

Figure 11:
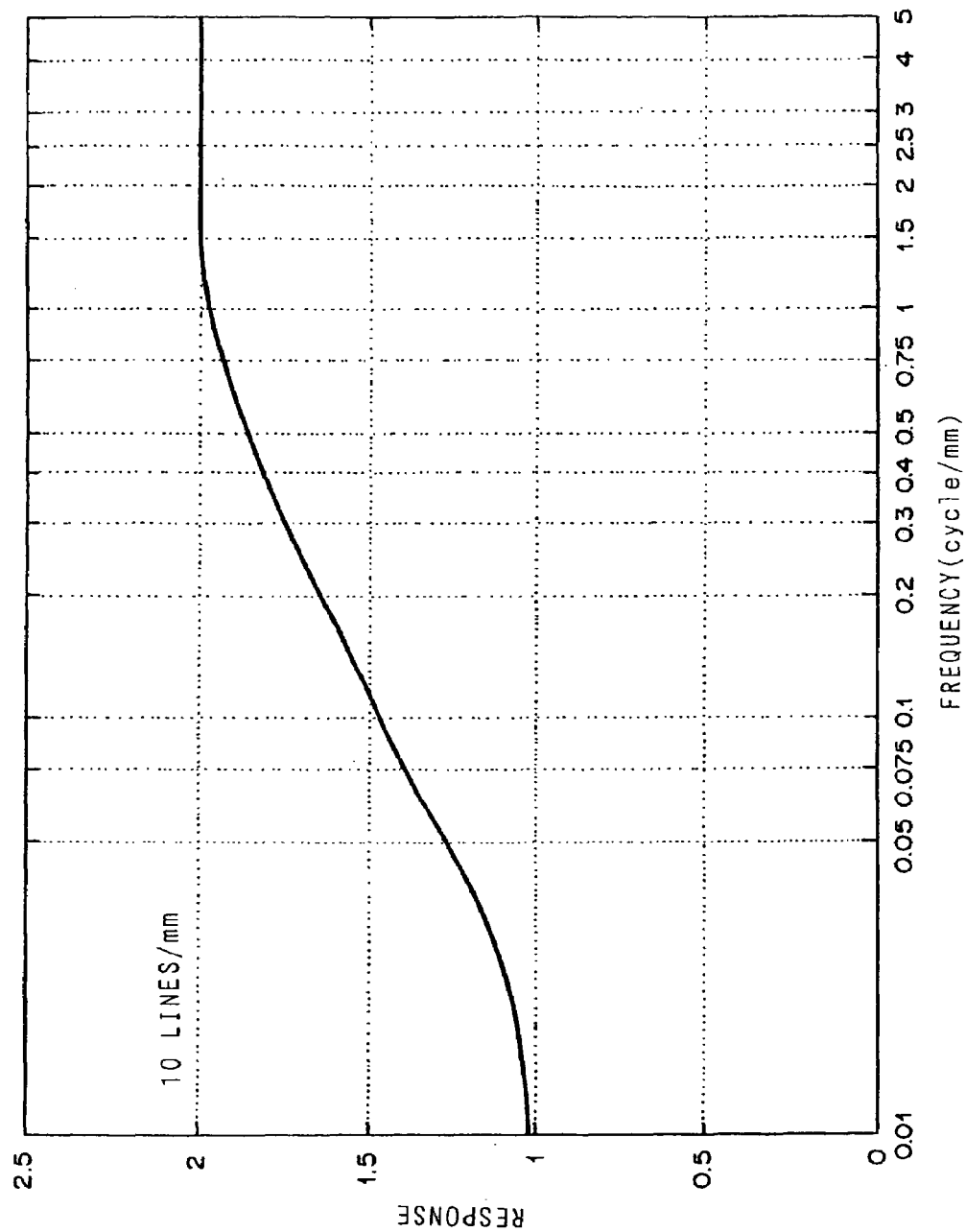
FIG. 11 is a view showing the frequency response characteristic of the processed image signal obtained by processing the band-limited signals obtained from an original image signal at 10 lines/mm by the image processing system of the first embodiment.
Figure 12:
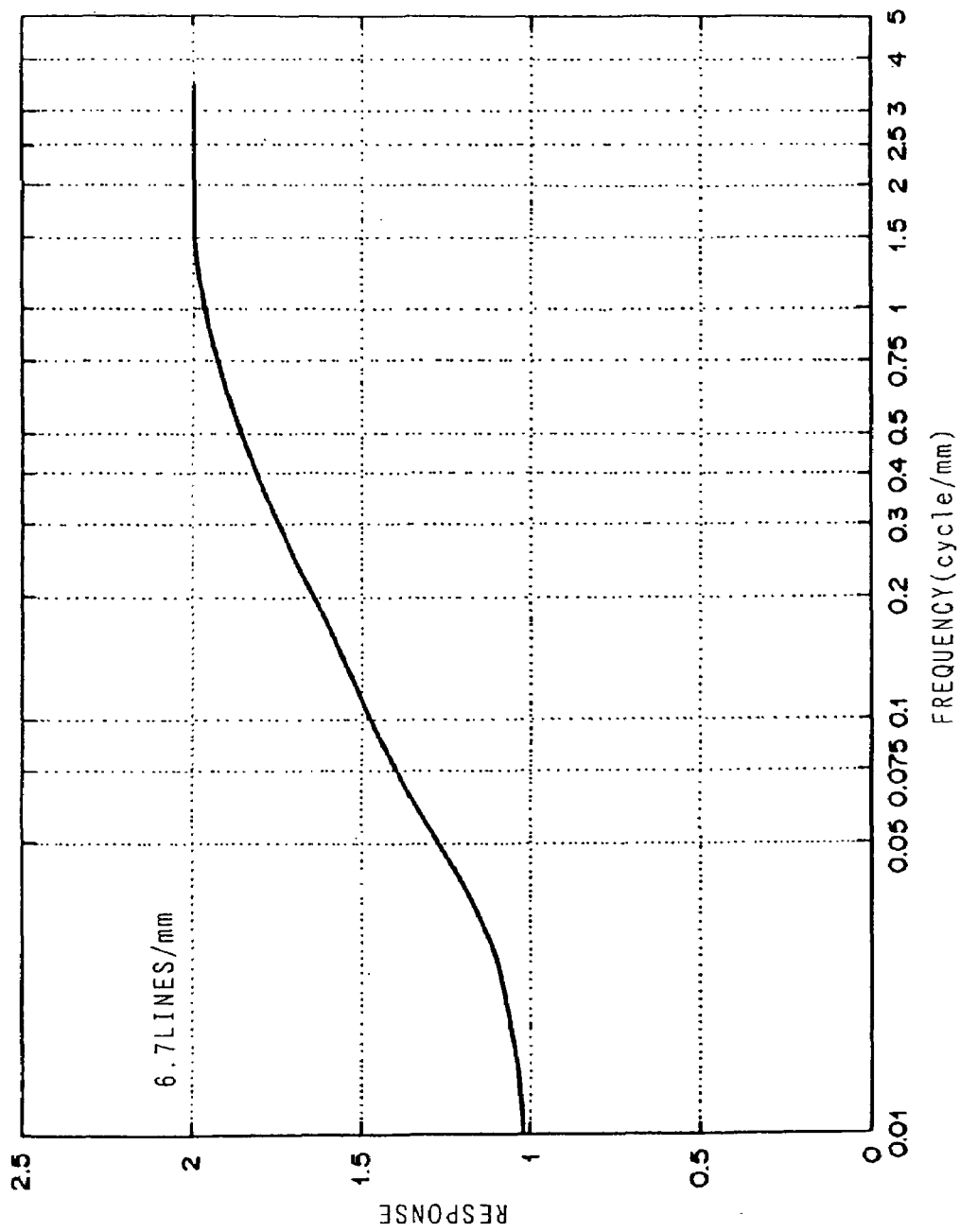
FIG. 12 is a view showing the frequency response characteristic of the processed image signal obtained by processing the band-limited signals obtained from an original image signal at 6.7 lines/mm by the image processing system of the first embodiment.
Figure 13:
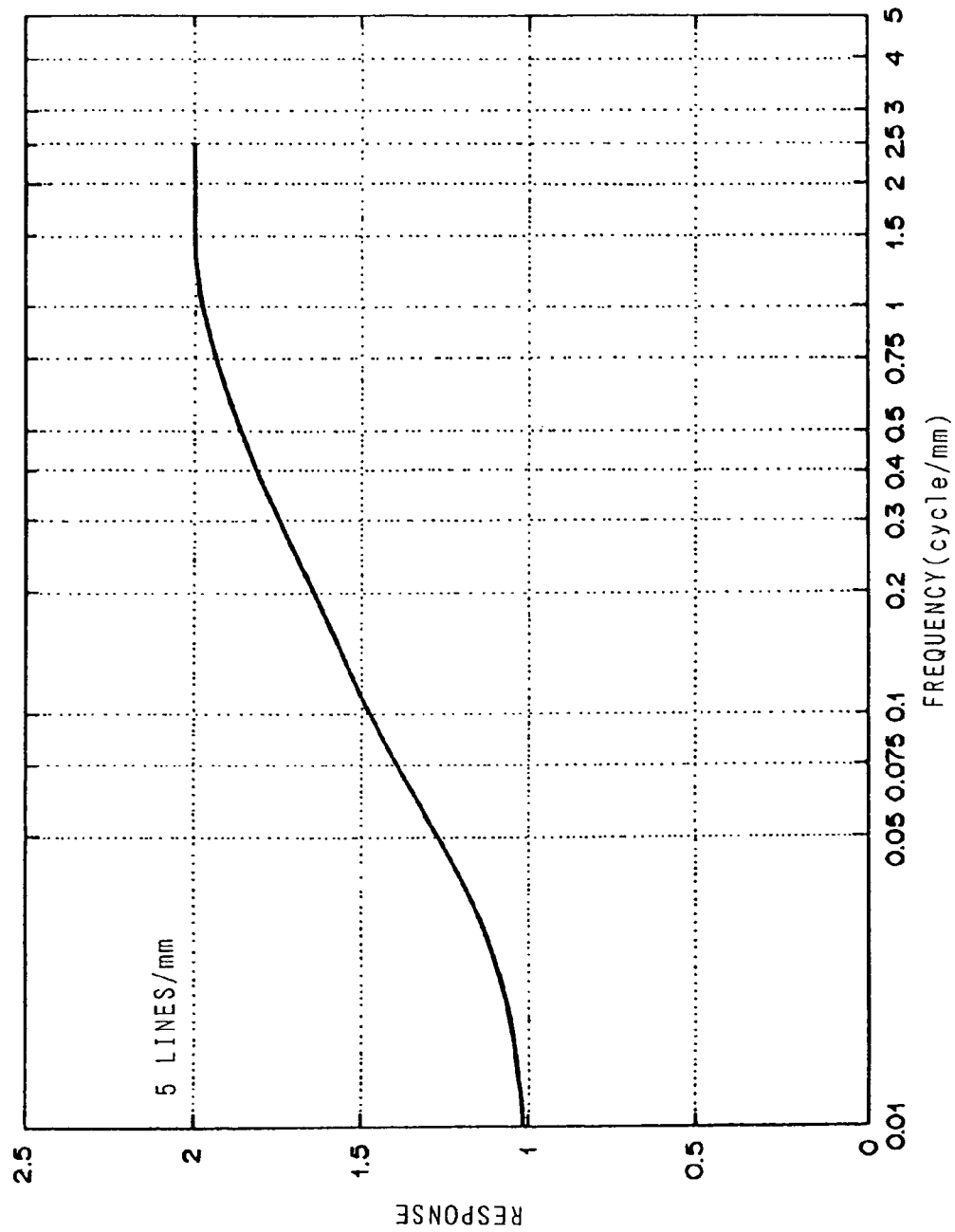
FIG. 13 is a view showing the frequency response characteristic of the processed image signal obtained by processing the band-limited signals obtained from an original image signal at 5 lines/mm by the image processing system of the first embodiment.

FIG. 11 shows the frequency response characteristic of the processed image signal $S_{proc}$ obtained by processing the band-limited signals obtained from an original image signal at 10 lines/mm using the transformation functions defined in the manner described above. FIG. 12 shows the frequency response characteristic of the processed image signal $S_{proc}$ obtained by processing the band-limited signals obtained from an original image signal at 6.7 lines/mm using the transformation functions defined in the manner described above. FIG. 13 shows the frequency response characteristic of the processed image signal $S_{proc}$ obtained by processing the band-limited signals obtained from an original image signal at 5 lines/mm using the transformation functions defined in the manner described above. As can be seen from FIGS. 11 to 13, when the frequency enhancement processing is carried out by use of transformation functions defined by the parameters X and Y shown in table 1, the frequency response characteristic of the obtained processed image signal $S_{proc}$ is substantially constant irrespective of the picture element density of the original image signal.

The parameters X and Y may be set, for instance, by the method disclosed in Japanese Unexamined Patent Publication No. 10(1998)-63838. This method will be described, hereinbelow. As a system for setting the parameters X and Y, a system which prompts the user to enter a desired frequency response characteristic by way of a display and recognizes through the input the frequency response characteristic which the user desires. Specifically, the system comprises software, an input system, a display and the like.

When setting the parameters X and Y, a screen 7a (FIG. 14) which shows the frequency response characteristic curve of the processed image signal $S_{proc}$ obtained when the band-limited signals are processed by the current transformation functions (initial transformation functions). On the characteristic curve, six movable points are displayed. That is, in the case where the image processing is a non-linear processing using n band-limited signals, the number of the movable points is n.

Figure 14:
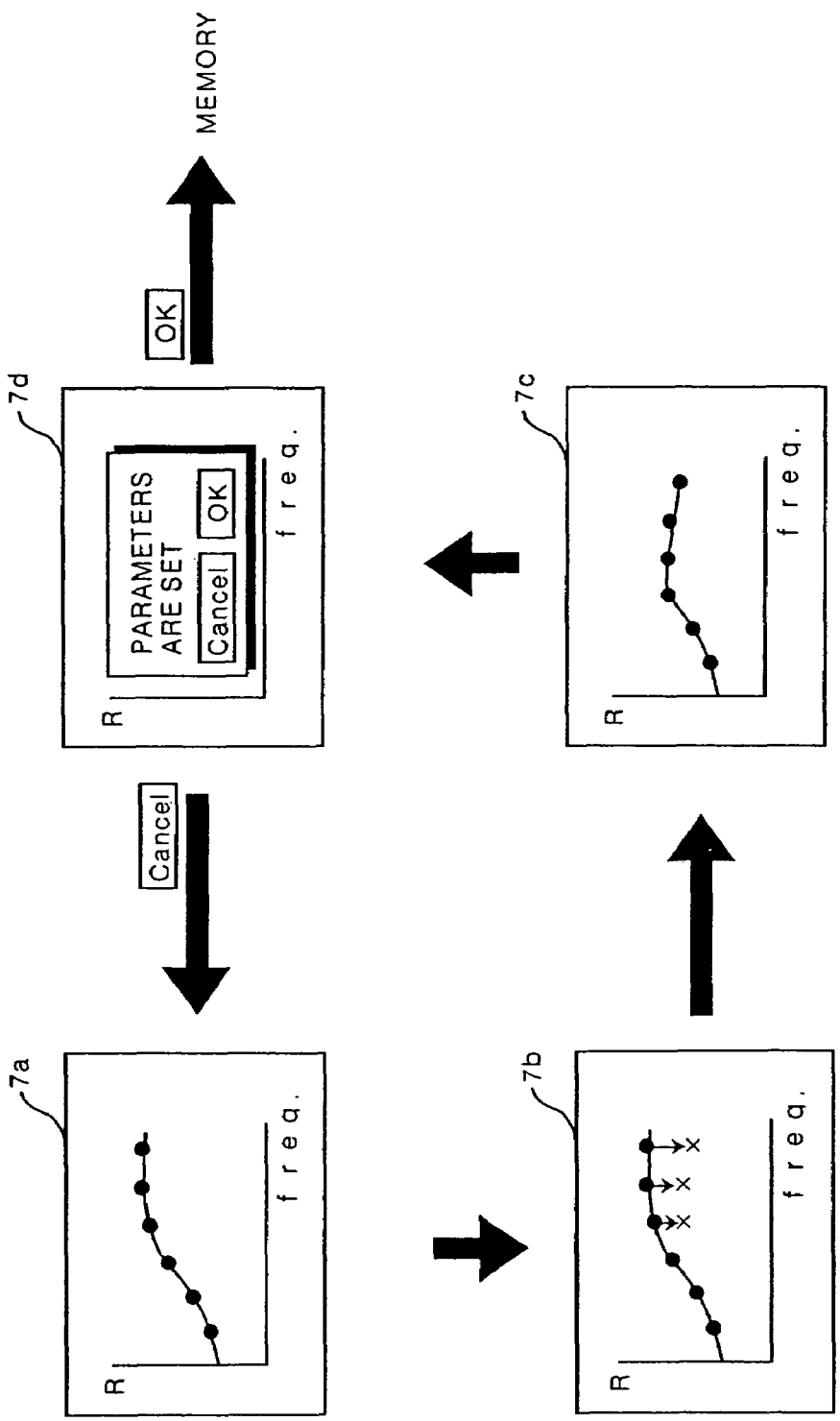
FIG. 14 is a view showing an example of the user interface for designating the frequency response characteristics.

The user moves necessary point(s) to a position corresponding to a desired frequency response characteristic by operating a pointing device such as a mouse. Screen 7b in FIG. 14 shows this procedure. This is done so that the responses in the respective frequency bands become equal to each other. After the necessary points are moved, the new points are recognized as to indicate desired frequency responses at the frequencies designated by the points, and the frequency response characteristic curve is recalculated and a new characteristic curve which passes through the new points is displayed. Screen 7c in FIG. 14 shows this state. When the new characteristic curve is a desired one, the user selects the "OK" button shown in screen 7d and otherwise selects the "Cancel" button to redo setting parameters. The parameters may be set in other various ways. For example, the parameter setting means may be arranged so that a plurality of values of frequency are shown on the screen in sequence and the user inputs a desired frequency response characteristic for the shown frequency.

When instruction that the parameters are to be set is made, the input desired frequency response characteristics a1 to a6 (in the case where the image processing to be carried out using six band-limited signals) are substituted, for instance, in the following simultaneous equations (7).

$$a1 = Y1 \times S11 + Y2 \times S21 + Y3 \times S31 + Y4 \times S41 + Y5 \times S51 + Y6 \times S61$$

$$a2 = Y1 \times S12 + Y2 \times S22 + Y3 \times S32 + Y4 \times S42 + Y5 \times S52 + Y6 \times S62$$

$$a3 = Y1 \times S13 + Y2 \times S23 + Y3 \times S33 + Y4 \times S43 + Y5 \times S53 + Y6 \times S63$$

$$a4 = Y1 \times S14 + Y2 \times S24 + Y3 \times S34 + Y4 \times S44 + Y5 \times S54 + Y6 \times S64$$

$$a5 = Y1 \times S15 + Y2 \times S25 + Y3 \times S35 + Y4 \times S45 + Y5 \times S55 + Y6 \times S65$$

$$a6 = Y1 \times S16 + Y2 \times S26 + Y3 \times S36 + Y4 \times S46 + Y5 \times S56 + Y6 \times S66 \quad Y1 \sim Y6 \geq 0 \quad (7)$$

wherein a1 to a6 represent the desired frequency response characteristics, S11 to S66 represent the frequency response characteristics of the band-limited signals made on the basis of the original image signal, and Y1 to Y6 represent parameters representing the inclinations of the transformation functions near 0. The degree of the equations is determined according to the number of the band-limited signals and the above equations are given only as an example.

By solving the simultaneous equations (7) with the desired frequency response characteristics a1 to a5 and the frequency response characteristics of the band-limited signals S11 to S66 taken as known values and the parameters Y1 to Y6 taken as variables, the parameters Y1 to Y6 are obtained, and the transformation functions are defined on the basis of the parameters. The parameters X representing the degree of non-linearity may be set to any values corresponding to the parameters Y1 to Y6 and, for instance, may be set to fixed values which are determined according to the picture element densities as shown in the aforesaid table 1. The parameters X and Y determined picture element density by picture element density are stored in the memory 8.

The values of the frequency response characteristics of the band-limited signals S11 to S66 are for six band-limited signals and S11 to S16 (S21 to S26, . . . S61 to S66) represent the frequency response characteristics at six frequencies of one band-limited signal. The values of the frequency response characteristics of the band-limited signals S11 to S66 can be obtained by a method of transformation normally used in frequency analysis on the basis of the coefficients of filter and the coefficients of interpolation used in making the unsharp image signals.

The parameters X and Y may be set by trial and error.

Figure 15:
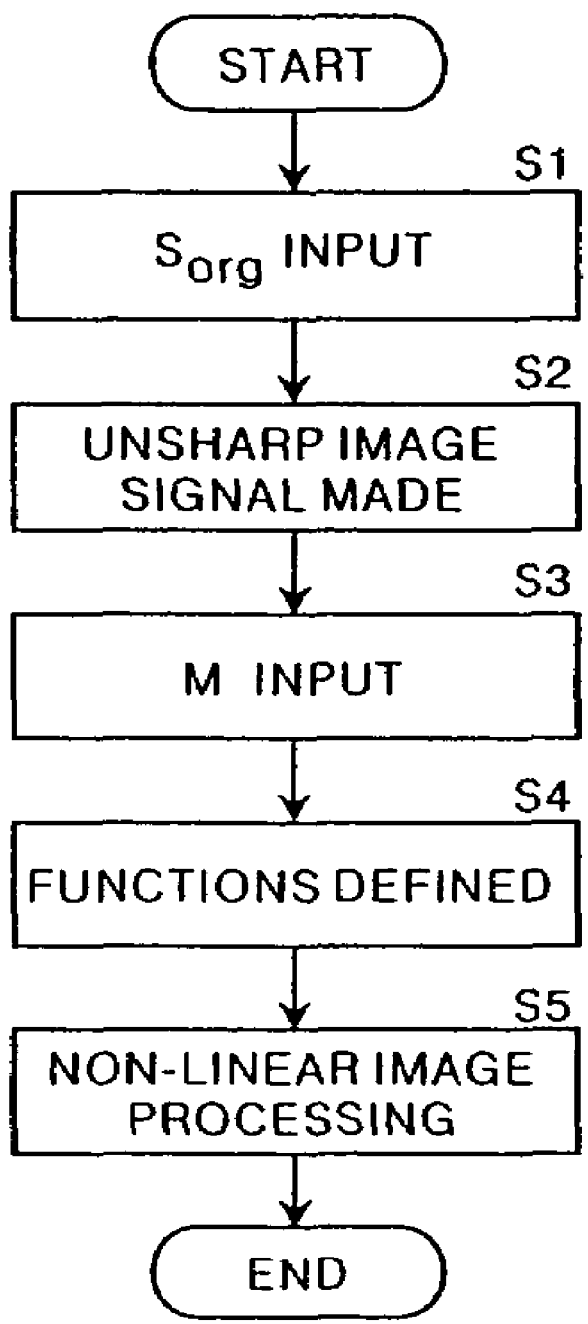
FIG. 15 is a flow chart for illustrating operation of the image processing system of the first embodiment.

Operation of the image processing system 1 of this embodiment will be described with reference to the flow chart shown in FIG. 15. An original image signal $S_{org}$ is first input into the image processing system 1, for instance, from an image read-out apparatus. (step S1) The original image signal $S_{org}$ is input into the unsharp image signal making means 2 and unsharp image signals $S_{us}k$ are made according to the picture element density of the original image signal $S_{org}$. (step S2) Picture element density information M on the original image signal $S_{org}$ is input into the picture element density information input means 5. (step S3) Then the combinations of the parameters are selected in the transformation function defining means 4 on the basis of the picture element density information M in the manner described above, and the transformation functions are defined on the basis of the selected combinations of the parameters. (step S4) Steps S3 and S4 may be executed before steps S1 and S2. When steps S3 and S4 and steps S1 and S2 are executed in parallel, the operation time can be shortened. Frequency-limited signals are made on the basis of the unsharp image signals $S_{us}k$ and the non-linear processing (frequency enhancement processing) represented by the aforesaid formulae (2) is executed by the non-linear processing means 3 on the basis of the transformation functions defined by the transformation function defining means 4, whereby a processed image signal $S_{proc}$ is obtained. (step S5).

The frequency enhancement processing is for making add signals, which are to be added to the original image signal in order to enhance desired frequency components, by use of the unsharp image signals. The frequency bands are differently processed so that the signals in the respective frequency bands forming the respective add signals become desired signals in order to prevent generation of artifact due to the frequency enhancement processing. In order to make the desired signals, it is preferred that signals have desired frequency response characteristics irrespective of the picture element density of the original image signal $S_{org}$. In the image processing system 1 of this embodiment, the parameters of the transformation functions are defined so that the frequency response characteristic of the processed image signal $S_{proc}$ become substantially constant irrespective of the picture element density of the original image signal $S_{org}$, and accordingly, a processed image signal $S_{proc}$ having substantially constant frequency response characteristic can be obtained irrespective of the picture element density of the original image signal $S_{org}$.

Figure 16:
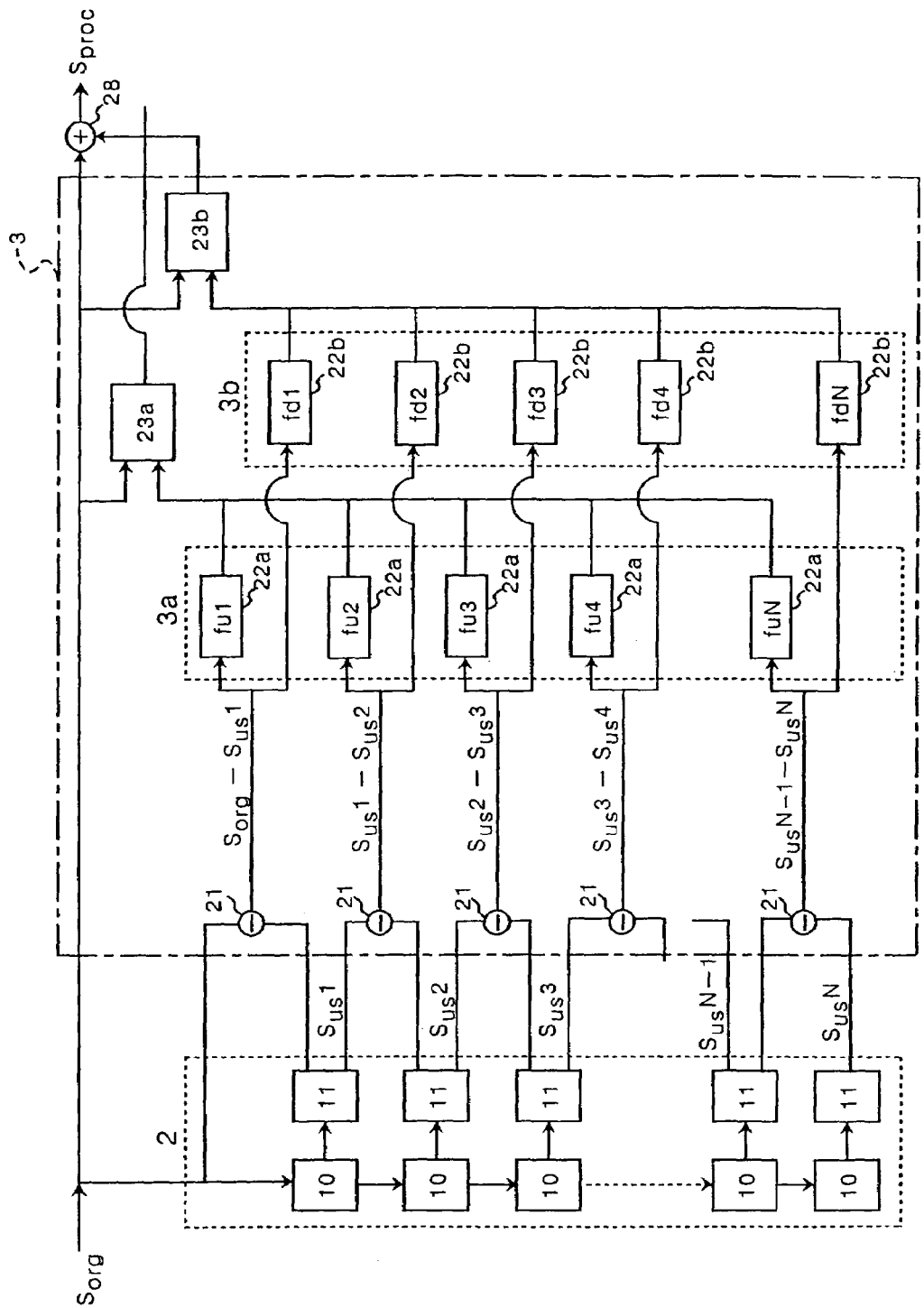
FIG. 16 is a view showing system for executing a frequency enhancement processing and a dynamic range compression processing as a non-linear processing in an image processing system in accordance with a second embodiment of the present invention.

Though, in the embodiment described above, the frequency enhancement processing represented by the aforesaid formulae (2) is carried out as a non-linear processing, a dynamic range compression processing and a frequency enhancement processing may be executed simultaneously as a non-linear processing. FIG. 16 is a view showing a system for executing a frequency enhancement processing and a dynamic range compression processing as a non-linear processing in an image processing system in accordance with a second embodiment of the present invention. As shown in FIG. 16, differences between two of the original image signal $S_{org}$ and the unsharp image signals $S_{us}k$ made by the filtering means 10 and the interpolation means 11 are taken, whereby a plurality of band-limited signals (e.g., $S_{org}-S_{us}1$, $S_{us}1-S_{us}2$ and the like) respectively representing frequency components in limited frequency bands of the original image signal are made. The filters used in the filtering means 19 are determined according to the picture element density of the original image signal in the manner similar to that described above. The band-limited signals thus obtained are input into first and second transformation sections 3a and 3b and processed by respective transformation means 22a and 22b in the first and second transformation sections 3a and 3b.

Figure 17:
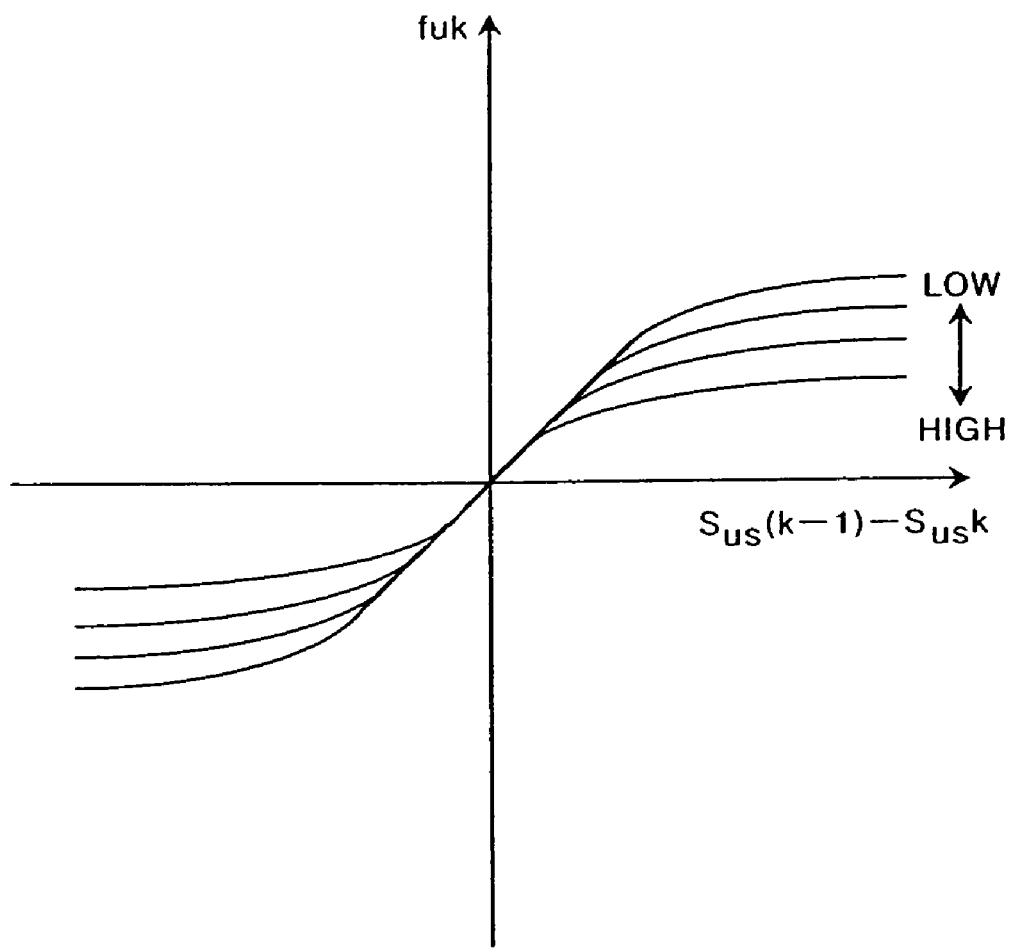
FIG. 17 is a view showing an example of the transformation functions used in the first transformation section in the second embodiment.
Figure 18:
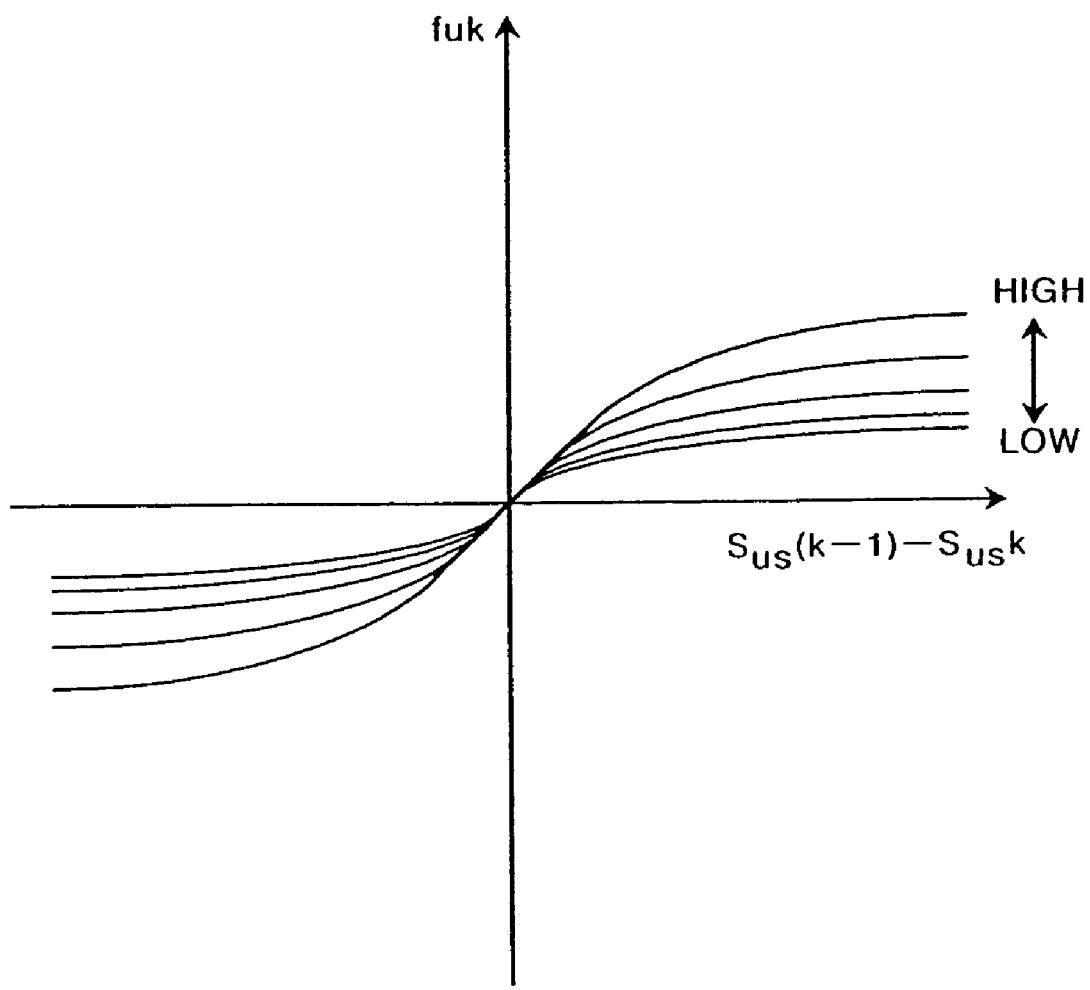
FIG. 18 is a view showing another example of the transformation functions used in the first transformation section in the second embodiment.

Transformation by the transformation means 22a in the first transformation section 3a is executed by use of the transformation functions defined on the basis of the picture element density information M on the original image signal $S_{org}$ as described above. For example, the transformation functions shown in FIG. 17 or 18 or combinations of the transformation functions shown in FIGS. 17 and 18 are used. These transformation functions are obtained by setting the parameters so that the frequency response characteristic of the processed image signal $S_{proc}$ becomes substantially constant irrespective of the picture element density of the original image signal $S_{org}$.

In accordance with the transformation functions shown in FIG. 17, the band-limited signals are transformed so that those which are large in amplitude are suppressed and the degree of suppression is increased as the frequency band of the band-limited signal becomes higher. This is for taking into account the fact that higher frequency components contained in edges of an actual radiation image is smaller in amplitude than low frequency components. In actual radiation images, even a substantially sharp edge is not in the form of a correct step and the amplitude often becomes smaller as the frequency becomes higher. Accordingly, it is preferred that suppression be made from a smaller amplitude as the frequency of the band-limited signals becomes higher. The functions shown in FIG. 17 serve for this purpose.

The transformation functions shown in FIG. 18 are for transforming the band-limited signals to those having values not larger than absolute values of the band-limited signals, which values are determined on the basis of the absolute values of the band-limited signals. As the frequency of the frequency band to be processed by the function becomes lower, the absolute value of a transformed image signal obtained by transforming a band-limited signal whose absolute value is in a predetermined range near 0 becomes smaller. That is, the functions all pass through the origin and all have inclinations smaller than 1. Further, the inclination near 0 is smaller as the frequency of the frequency band to be processed by the function becomes lower. When an add signal obtained by adding up the transformed image signals is added to the original image signal $S_{org}$, these functions contribute to smoothen the joint between the original image signal $S_{org}$ and the add signal, that is, rise of the signal.

Figure 19:
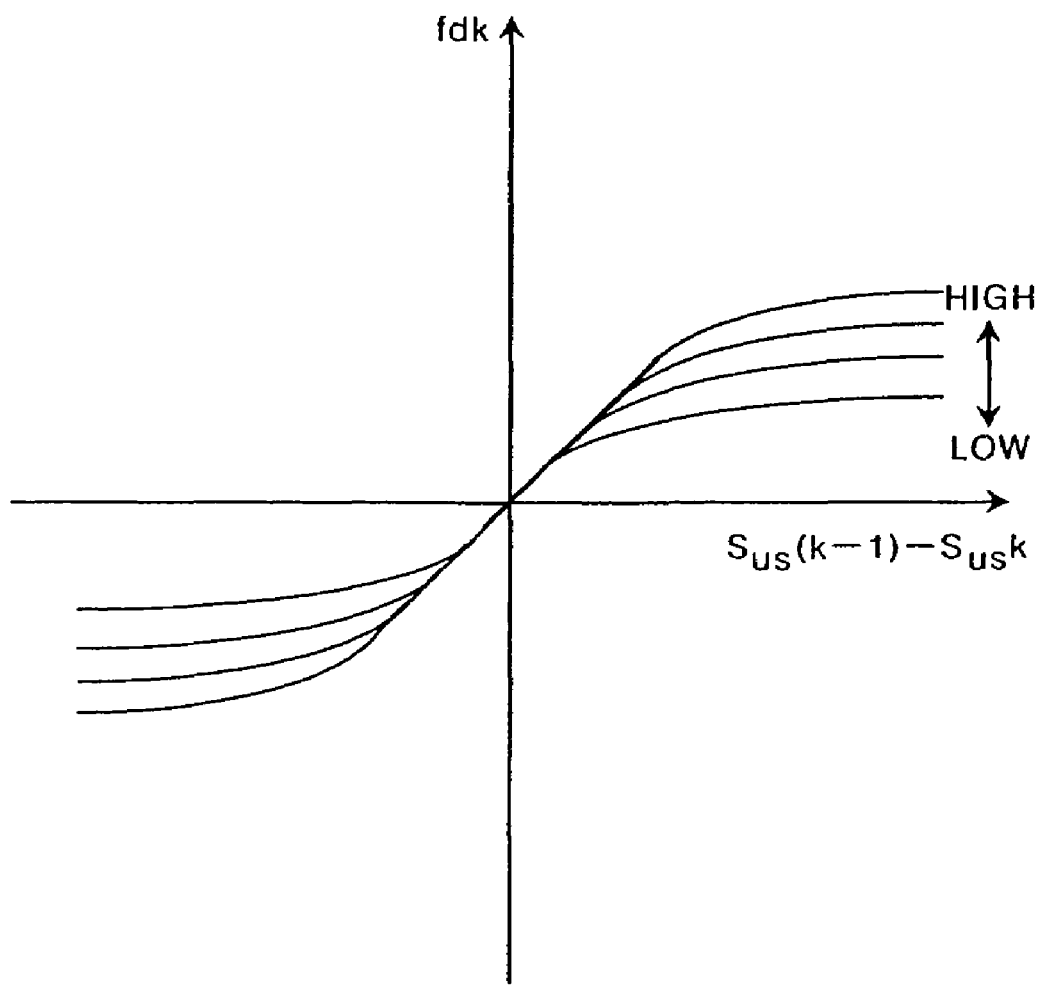
FIG. 19 is a view showing an example of the transformation functions used in the second transformation section in the second embodiment.

Similarly transformation by each transformation means 22b in the second transformation section 3b is executed by use of the transformation functions shown in FIG. 19 or 18 or combinations of the transformation functions shown in FIGS. 19 and 18. The transformed image signals output from the first and second transformation sections 3a and 3b are respectively input into operators 23a and 23b. The operator 23a executes operation for making signals necessary for the frequency enhancement processing, and the operator 23b executes operation for making signals necessary for the dynamic range compression processing.

The operator 23a executes a frequency enhancement processing similar to that described above with reference to FIG. 6. That is, the band-limited signals transformed by the first transformation section 3a are added up, and an add signal thus obtained is multiplied by a coefficient of enhancement β which is determined according to the value of the original image signal $S_{org}$.

The operator 23b executes a dynamic range compression processing in the following manner. The band-limited signals transformed by the second transformation section 3b are added up, and an add signal thus obtained is subtracted from the original image signal $S_{org}$. Then the differential signal thus obtained is transformed on the basis of a transformation function, thereby obtaining a coefficient of dynamic range compression. The signals respectively obtained by the operators 23a and 23b are added to the original image signal $S_{org}$ by an adder 28, whereby a processed image signal $S_{proc}$ is obtained.

The processing described above is represented by the following formula (3).

$$S_{proc} = S_{org} + \beta(S_{org}) \times F_{usm}(S_{org}, S_{us}1, S_{us}2, \ldots S_{us}N) + D\{S_{org} - F_{drc}(S_{org}, S_{us}1, S_{us}2, \ldots S_{us}N)\}$$

$$F_{usm}(S_{org}, S_{us}1, S_{us}2, \ldots S_{us}N) = \{f_{u1}(S_{org} - S_{us}1) + f_{u2}(S_{us}1 - S_{us}2) + \ldots + f_{uk}(S_{us}k-1 - S_{us}k) + \ldots + f_{uN}(S_{us}N-1 - S_{us}N)$$

$$F_{drc}(S_{org}, S_{us}1, S_{us}2, \ldots S_{us}N) = \{f_{d1}(S_{org} - S_{us}1) + f_{d2}(S_{us}1 - S_{us}2) + \ldots + f_{dk}(S_{us}k-1 - S_{us}k) + \ldots + f_{dN}(S_{us}N-1 - S_{us}N) \quad (3)$$

wherein $S_{proc}$ is a processed image signal, $S_{org}$ is an original image signal, $S_{us}$ (k=1 to N) is an unsharp image signal, $f_{uk}$(k=1 to N) is a transformation function used in the first transformation section, $f_{dk}$(k=1 to N) is a transformation function used in the second transformation section, $\beta(S_{org})$ is a coefficient of enhancement determined on the basis of the original image signal, and $D\{S_{org} - F_{drc}(S_{org}, S_{us}1, S_{us}2, \ldots S_{us}N)\}$ is a coefficient of dynamic range compression determined on the basis of the low frequency component signal, D being a function for transforming $D\{S_{org} - F_{drc}(S_{org}, S_{us}1, S_{us}2, \ldots S_{us}N)\}$.

In the image processing system shown in FIG. 16, the add signal used in the frequency enhancement processing and that used in the dynamic range compression processing are separately obtained on the basis of the original image signal $S_{org}$ and are finally added. However, it is possible to first carry out on one of the frequency enhancement processing and the dynamic range compression processing on the original image signal $S_{org}$ and to carry out the other processing on the resultant signal. Generally the lower density portion of a radiation image includes a relatively large amount of noise since the lower density portion is exposed to less radiation upon taking the radiation image. Since the frequency enhancement processing is a density-dependent processing where the degree of enhancement is increased with increase in density, the low density portion is not enhanced and accordingly noise is not enhanced when the frequency enhancement processing is directly carried out on the original image signal. To the contrast, when the frequency enhancement processing is carried out after the dynamic range compression processing is carried out on the original image signal, the low density portion is increased in its density by the dynamic range compression processing, and accordingly, the low density portion is enhanced by the following frequency enhancement processing, whereby noise is also enhanced. Accordingly, it is preferred that each signal be made on the basis of the original image signal $S_{org}$. Further also from the viewpoint of saving the processing time, it is preferred that the two processings be executed in parallel.

By defining the parameters for the transformation functions so that the frequency response characteristic of the processed image signal $S_{proc}$ becomes constant irrespective of the picture element density of the original image signal $S_{org}$, the processed image signal $S_{proc}$ can have a substantially constant frequency response characteristic irrespective of the picture element density of the original image signal $S_{org}$.

Figure 20:
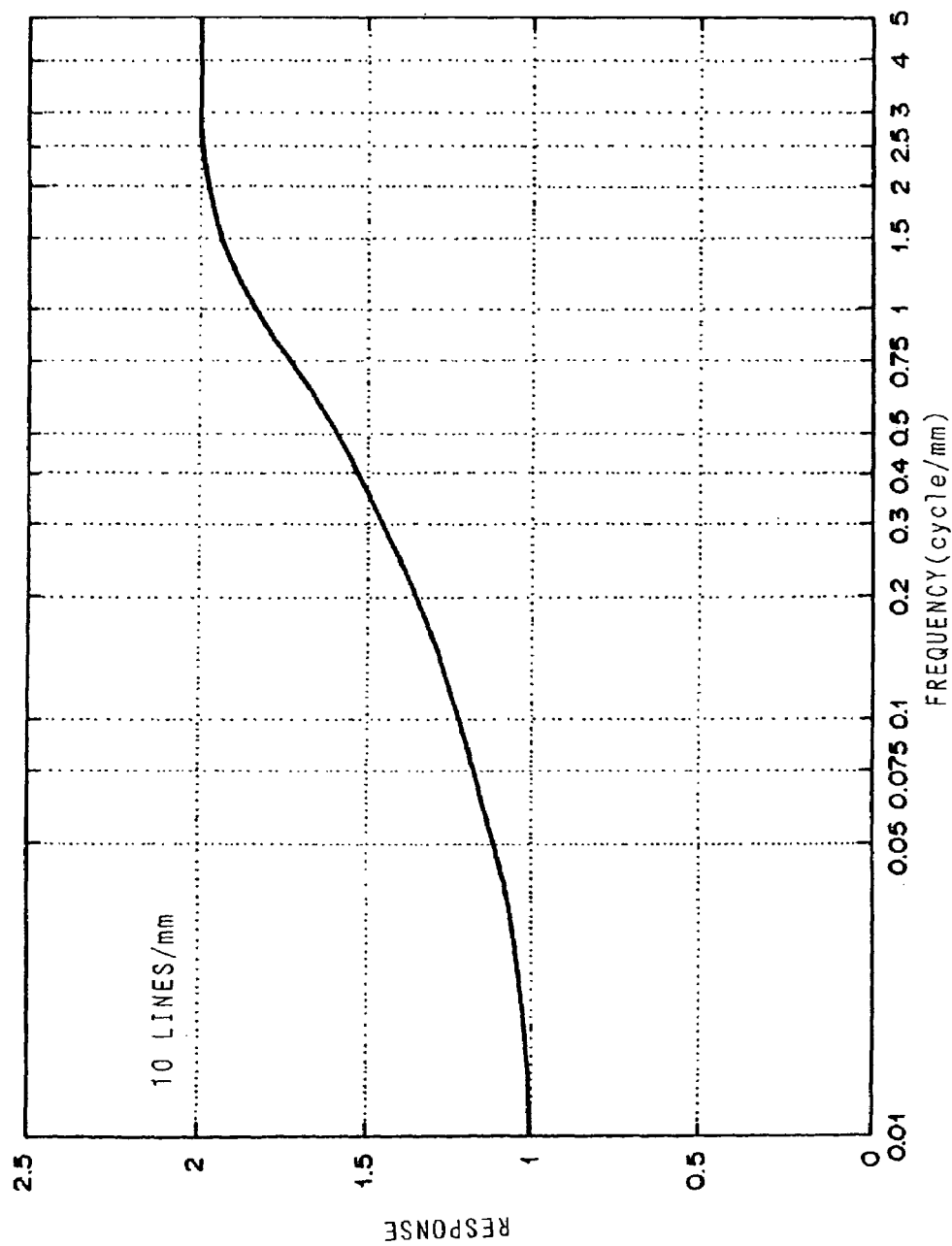
FIG. 20 is a view showing the frequency response characteristic of the processed image signal $S_{proc}$ obtained by processing an original image signal at 10 lines/mm in the image processing system of the second embodiment.
Figure 21:
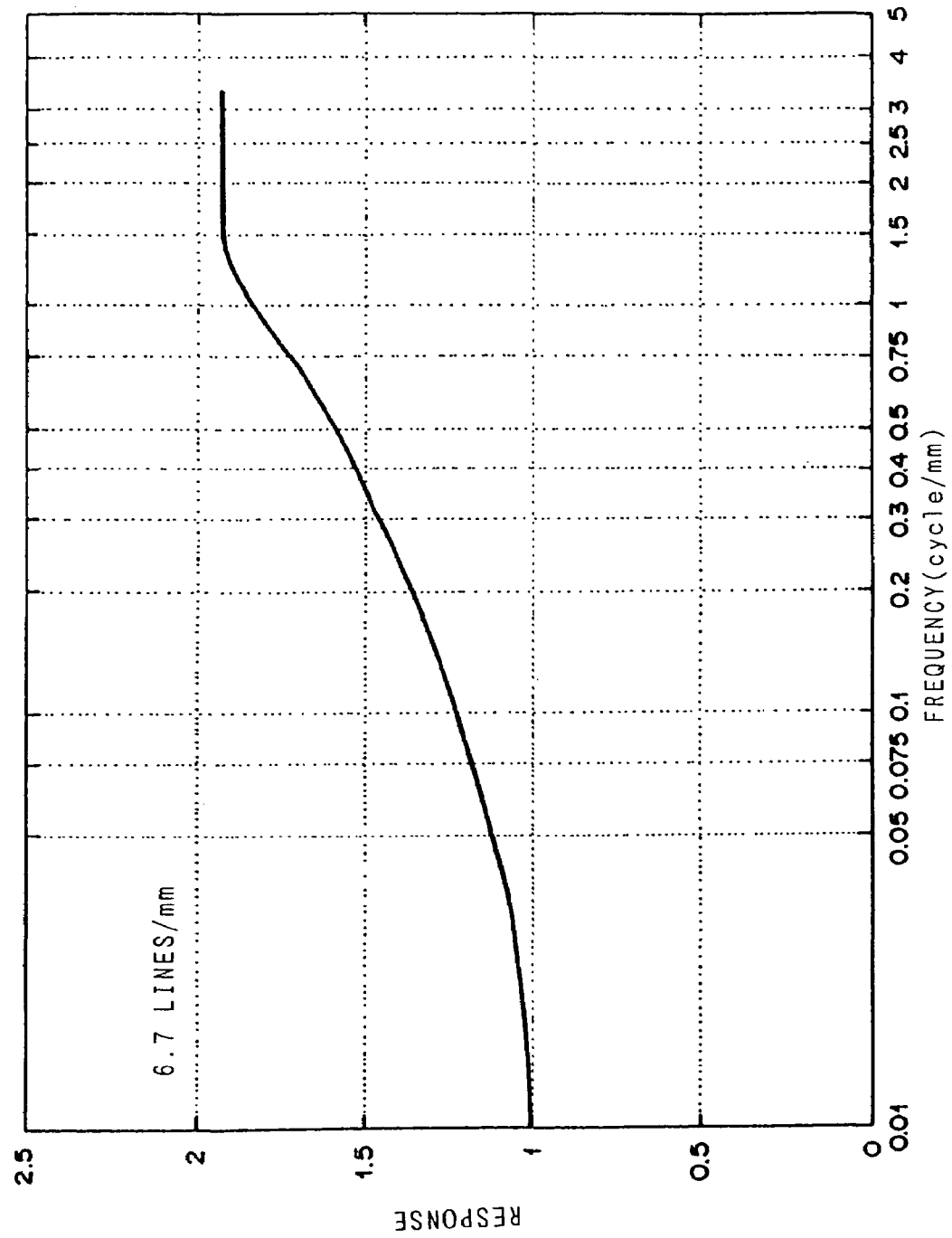
FIG. 21 is a view showing the frequency response characteristic of the processed image signal $S_{proc}$ obtained by processing an original image signal at 6.7 lines/mm in the image processing system of the second embodiment.
Figure 22:
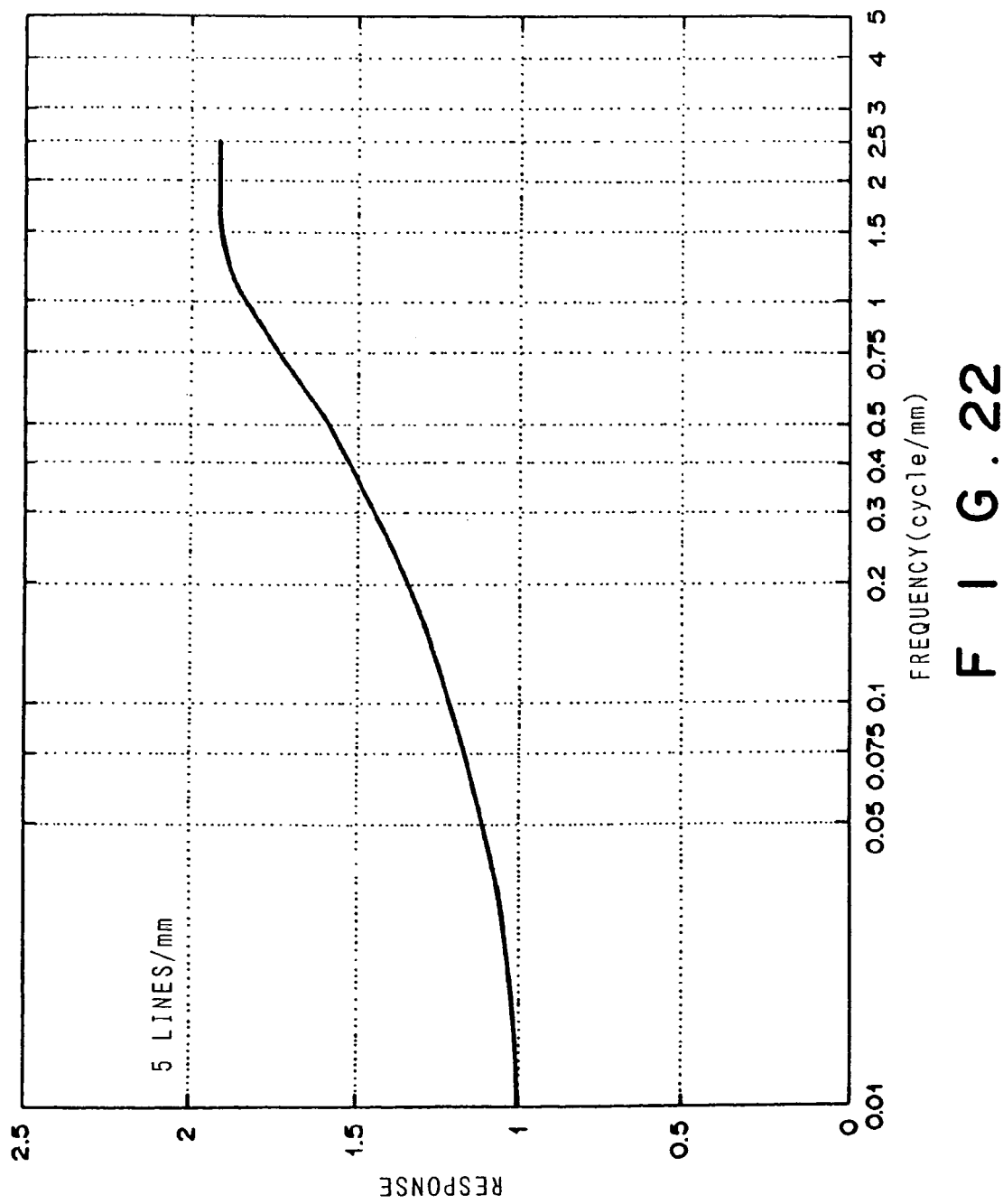
FIG. 22 is a view showing the frequency response characteristic of the processed image signal $S_{proc}$ obtained by processing an original image signal at 5 lines/mm in the image processing system of the second embodiment.

In the second embodiment described above, when the parameters of the transformation functions are set as shown in the following table 2 in the case where the picture element density of the original image signal is 10 lines/mm, the frequency response characteristic of the processed image signal $S_{proc}$ becomes as shown in FIG. 20. As shown in FIGS. 7 to 9, in the case of an original image signal at 10 lines/mm, there exists a band-limited signal corresponding to 1 cycle/mm, but in the case of an original image signal at 6.7 lines/mm or at 5 lines/mm, there exists no band-limited signal corresponding to 1 cycle/mm. Accordingly, in the case of original image signals at 6.7 lines/mm and at 5 lines/mm, the frequency response characteristics of the processed image signals $S_{proc}$ cannot conform to the processed image signal $S_{proc}$ for the original image signal at 10 lines/mm over the entire frequency bands. In an image obtained by reproducing a processed image signal, the low frequency components are visually more prominent than the high frequency components. Accordingly, in such a case, it is preferred that the transformation functions for band-limited signals at 6.7 lines/mm and at 5 lines/mm be defined by the parameters X and Y shown in table 2 so that the high frequency components not lower than 1 cycle/mm conform to those of the band-limited signals at 10 lines/mm to a certain extent and the low frequency components lower than 1 cycle/mm conform to those of the band-limited signals at 10 lines/mm. When the parameters of the transformation functions are set as shown in the following table 2 in the case where the picture element densities of the original image signals are 6.7 lines/mm and 5 lines/mm, the frequency response characteristics of the processed image signals $S_{proc}$ become as shown in FIGS. 21 and 22. As shown in FIGS. 21 and 22, when original image signals at 6.7 lines/mm and 5 lines/mm are processed by use of transformation functions defined by the parameters shown in table 2, the frequency response characteristics of the processed image signals $S_{proc}$ well conform to the processed image signal $S_{proc}$ for the original image signal at 10 lines/mm as for the low frequency components lower than 1 cycle/mm though less conform to the processed image signal $S_{proc}$ for the original image signal at 10 lines/mm as for the high frequency components not lower than 1 cycle/mm. Accordingly, a processed image signal $S_{proc}$ the frequency response characteristic of which is substantially constant irrespective of the picture element density of the original image signal at least for the low frequency components, which are visually more prominent than the high frequency components, can be obtained.

TABLE 1

| 10 lines/mm | | 6.7 lines/mm | | 5 lines/mm | |
| --- | --- | --- | --- | --- | --- |
| X | Y | X | Y | X | Y |
| 15 | 1.00 | 20 | 1.93 | 20 | 1.92 |
| 20 | 0.83 | 30 | 0.44 | 30 | 0.42 |
| 30 | 0.42 | 40 | 0.37 | 40 | 0.36 |
| 40 | 0.36 | 50 | 0.18 | 50 | 0.17 |
| 50 | 0.17 | 60 | 0.13 | 60 | 0.12 |
| 60 | 0.12 | | | | |

Though, in the embodiments described above, the original image signal $S_{org}$ is an image signal read out from a stimulable phosphor sheet, the original image signal $S_{org}$ may be any image signal provided that the resolution of the image represented by the image signal, e.g., the relation between the size of the object and the sampling intervals (dpi), is known.

Further, though in the embodiments described above, non-linear functions are used and a non-linear processing is carried out on the band-limited signals, linear functions or constants may be employed as the transformation functions. In such a case, the parameters of the linear functions or the values of the constants are set according to the picture element density of the original image signal.

Further, though, in the embodiments described above, the unsharp image signals are obtained from the original image signal by filtering and interpolation/enlargement and the band-limited signals are obtained from the original image signal and the unsharp image signals, the band-limited signals may be made, for instance, by transforming the original image signal to multiple resolution image signals by a wavelet transformation or a Laplacian pyramid, making the unsharp image signals from the image signals at the respective resolutions and making the band-limited signals from the unsharp image signals.

Further, though, in the embodiments described above, the parameter setting means 7 shown in FIG. 10 is arranged to set the parameters X and Y on the basis of the original image signal and the picture element density thereof each time an original image signal $S_{org}$ is input, the parameter setting means 7 may be arranged to determine the parameters X and Y for the original image signal $S_{org}$ by comparing the picture element density of the original image signal $S_{org}$ with reference picture element densities which have been stored in the memory 8 together with the parameters X and Y for the respective picture element densities and by setting, as the parameters X and Y for the original image signal $S_{org}$, the parameters X and y for the reference picture element density closest to the picture element density of the original image signal $S_{org}$. The reference picture element density closest to the picture element density of the original image signal $S_{org}$ may be determined, for instance, in the following manner. That is, assuming that three reference picture element densities stored in the memory 8 together with the parameters X and Y for the respective reference picture element densities are a, b and c (a<b<c) and the picture element density of the original image signal $S_{org}$ to be processed is x, the reference picture element density is c when x>b+(c−b)/2, is b when b+(c−b)/2≧x>a+(b−a)/2, and is a when a+(b−a)/2≧x. Specifically the reference picture element densities may be at least two of 10 lines/mm, 6.7 lines/mm and 5 lines/mm. In this case, when the picture element density of the original image signal $S_{org}$ to be processed is higher than 6.7+(10−6.7)/2=8.35, the combinations of the parameters X and Y for the picture element density of 10 lines/mm shown in table 1 or table 2 are set as the parameters X and Y for the original image signal $S_{org}$. When the picture element density of the original image signal $S_{org}$ to be processed is not higher than 6.7+(10−6.7)/2=8.35 and higher than 5+(6.7−5)/2=5.85, the combinations of the parameters X and Y for the picture element density of 6.7 lines/mm shown in table 1 or table 2 are set as the parameters X and Y for the original image signal $S_{org}$. When the picture element density of the original image signal $S_{org}$ to be processed is not higher than 5+(6.7−5)/2=5.85, the combinations of the parameters X and Y for the picture element density of 5 lines/mm shown in table 1 or table 2 are set as the parameters X and Y for the original image signal $S_{org}$.

It is preferred that the parameters selected be stored related to the processed image signal $S_{proc}$ and/or the picture element density of the original image signal $S_{org}$. With this arrangement, when an image is output (output as a hard copy on photographic film or displayed on a CRT or the like) another time, an image at a quality equivalent to that of a previously output image can be obtained. The parameters selected and the picture element density of the original image signal $S_{org}$ may be stored either in the same storage medium or different storage media.

An image processing system in accordance with a third embodiment of the present invention will be described, hereinbelow. An image processing system 101 in accordance with the third embodiment of the present invention is also for carrying out a frequency enhancement processing by use of unsharp image signals on an original image signal obtained by reading out a radiation image of a human body recorded on a stimulable phosphor sheet so that an image suitable for diagnosis can be obtained. An image reproduced on the basis of the processed image signal is mainly recorded on photographic film and used in diagnosis.

Figure 23:
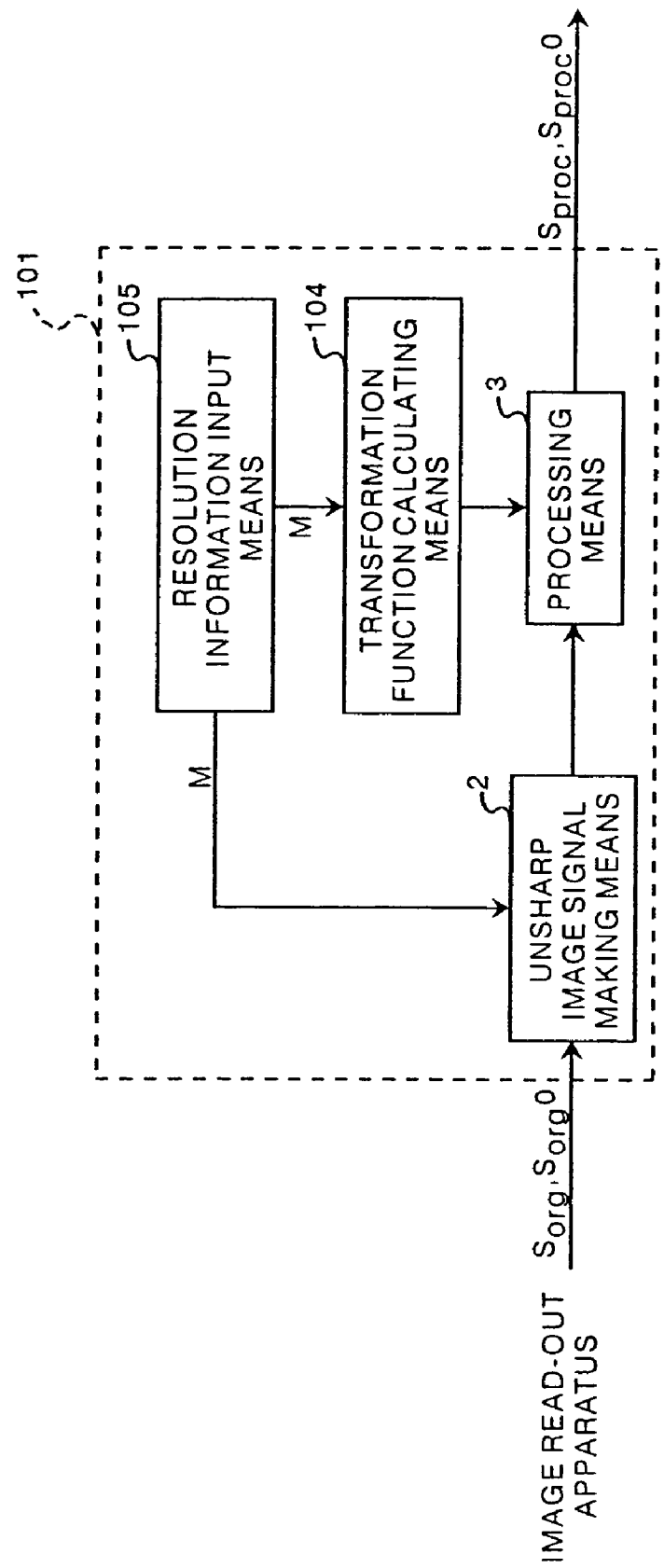
FIG. 23 is a schematic block diagram showing the arrangement of an image processing system in accordance with a third embodiment of the present invention.

As shown FIG. 23, the image processing system 101 in accordance with the third embodiment of the present invention is substantially the same as the image processing system 1 in accordance with the first embodiment of the present invention. Accordingly, in FIG. 23, the elements analogous to those shown in FIG. 1 are given the same reference numerals and will not be described in detail here. The image processing system of this embodiment comprises an unsharp image signal making means 2, a processing means 3 which carries out a frequency enhancement processing for enhancing a particular frequency and obtains a processed image signal $S_{proc}$, a transformation function calculating means 104 and a resolution information input means 105. The image processing system of the third embodiment mainly differs from that of the first embodiment in arrangement of the transformation function calculating means 104. That is, in this embodiment, transformation function calculating means 104 calculates the transformation functions, which the processing means 3 uses in the frequency enhancement processing, by correcting reference transformation functions which are employed to carry out the frequency enhancement processing on an original image signal having a known reference picture element density, according to the resolution of the original image signal $S_{org}$ represented by the resolution information M input from the resolution information input means 105, as will become apparent later. The transformation functions for the original image signal have been determined and stored in advance.

Unsharp image signals $S_{us}k$ are made in the same manner as described above in conjunction with FIG. 2 and the frequency enhancement processing is carried out by use of the unsharp image signals $S_{us}k$ in the same manner as described above in conjunction with FIG. 6.

Figure 24:
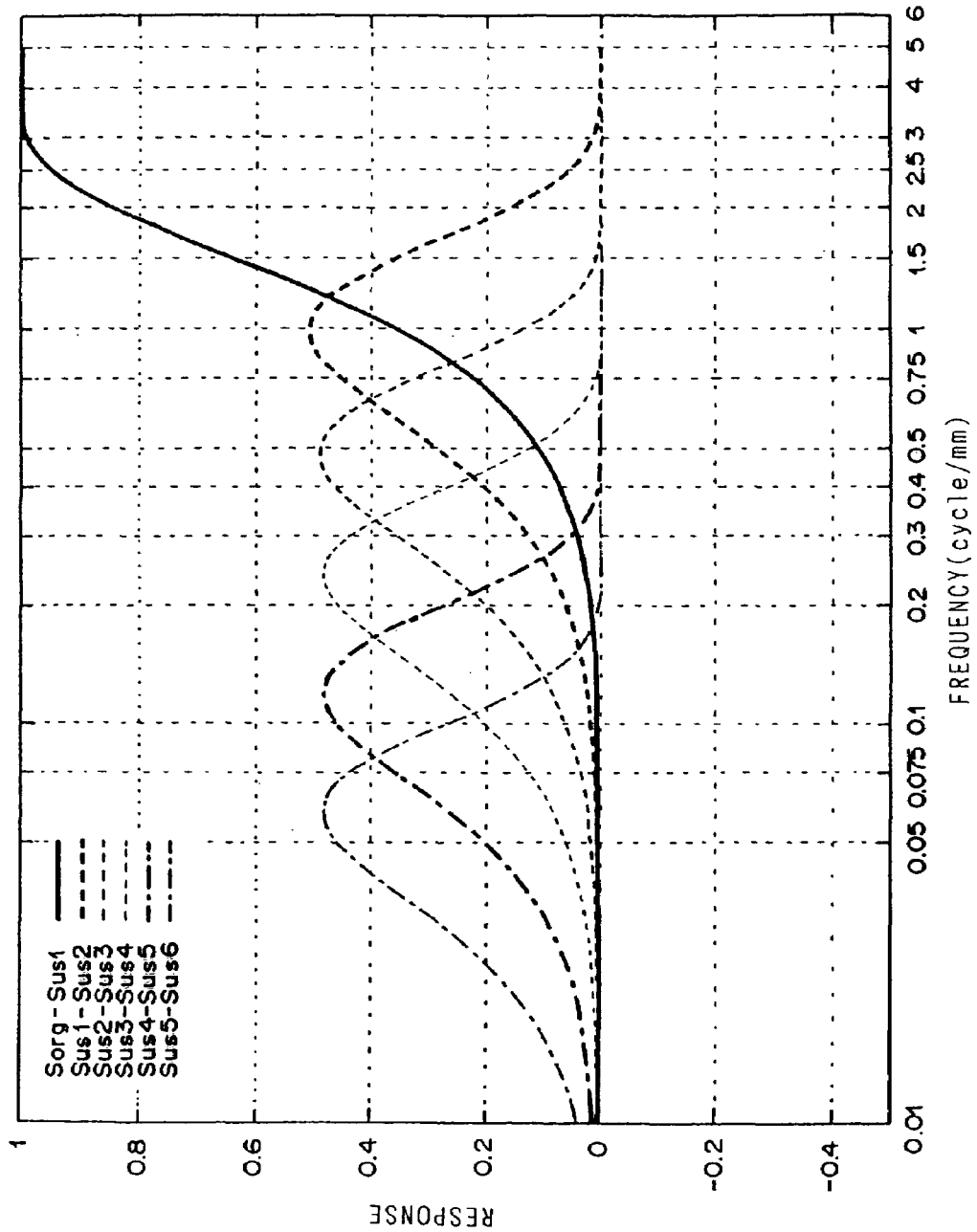
FIG. 24 is a view showing the frequency response characteristics of the band-limited signals obtained from an original image signal $S_{org}$ having a picture element density of 10 lines/mm.

In this embodiment, the transformation functions $f_k$ (k stands for 1 to N) for transforming the band-limited signals are determined in the following manner. In this particular embodiment, the transformation functions $f_k$ are constants and the reference resolution is 10 lines/mm. FIG. 24 shows the frequency response characteristics of the band-limited signals obtained from an original image signal $S_{org}$ having a resolution of 10 lines/mm. As shown in FIG. 24, six band-limited signals are obtained from the original image signal $S_{org}$. The original image signal $S_{org}$ having a resolution of 10 lines/mm is 5 cycles/mm in Nyquist frequency. The peak frequency of the band-limited signal in the highest frequency band falls on the Nyquist frequency. The peak frequency of the band-limited signal in the second highest frequency band is 1.0 cycle/mm, ⅕ of the Nyquist frequency. The peak frequency of the band-limited signal is reduced ½ by ½, e.g., 0.5 cycles/mm, 0.25 cycles/mm/0.12 cycles/mm and 0.06 cycles/mm, as the frequency band of the band-limited signal becomes lower. In this particular embodiment, the transformation functions $f_k$ (k stands for 1 to N) for transforming the band-limited signals obtained from the original image signal $S_{org}$ having a resolution of 10 lines/mm are as shown in the following table 3.

TABLE 3

| peak frequency (cycles/mm) | 5 | 1.0 | 0.5 | 0.25 | 0.12 | 0.06 |
|---|---|---|---|---|---|---|
| transformation function | 1.00 | 0.90 | 0.80 | 0.60 | 0.40 | 0.20 |

Figure 25:
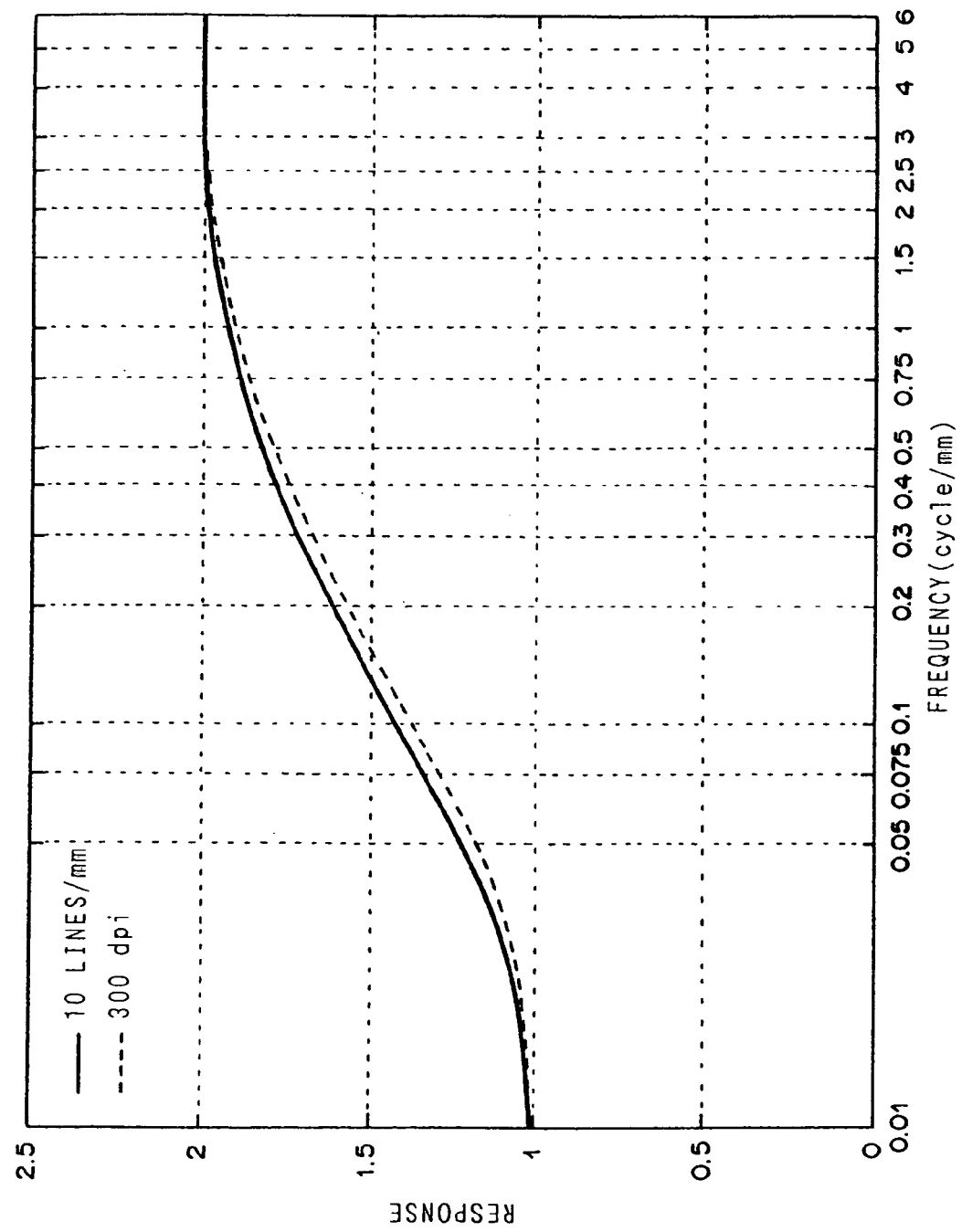
FIG. 25 is a view showing the frequency response characteristic of the processed image signal $S_{proc}$ obtained by carrying out the frequency enhancement processing by use of the transformation functions shown in table 3 on the original image signal $S_{org}$ at 10 lines/mm (solid line) and that of the processed image signal $S_{proc}$ obtained by carrying out the frequency enhancement processing by use of the transformation functions shown in table 3 on the original image signal $S_{org}$ at 300 dpi (broken line)

In order to enhance a desired frequency component of the original image signal $S_{org}$, it is necessary to carry out the frequency enhancement processing by use of transformation functions $f_k$ determined frequency by frequency of the band-limited signals. However, when the transformation functions for an original image signal $S_{org}$ having a resolution of 10 lines/mm are used, as they are, for frequency enhancement processing of an original image signal $S_{org}$ having a resolution of 300 dpi, the frequency response characteristic of the processed image signal $S_{proc}$ differs from that of the processed image signal $S_{proc}$ obtained from the original image signal $S_{org}$ having a resolution of 10 lines/mm. In FIG. 25, the solid line shows the frequency response characteristic of the processed image signal $S_{proc}$ obtained by carrying out the frequency enhancement processing by use of the transformation functions shown in table 3 on the original image signal $S_{org}$ at 10 lines/mm and the broken line shows that of the processed image signal $S_{proc}$ obtained by carrying out the frequency enhancement processing by use of the transformation functions shown in table 3 on the original image signal $S_{org}$ at 300 dpi.

In order to overcome this problem, when an original image signal $S_{org}$ having a resolution different from 10 lines/mm (reference resolution) is input, the transformation functions shown in table 3 (reference transformation functions) are corrected according to the resolution (300 dpi in this particular embodiment) of the input original image signal $S_{org}$.

Figure 26:
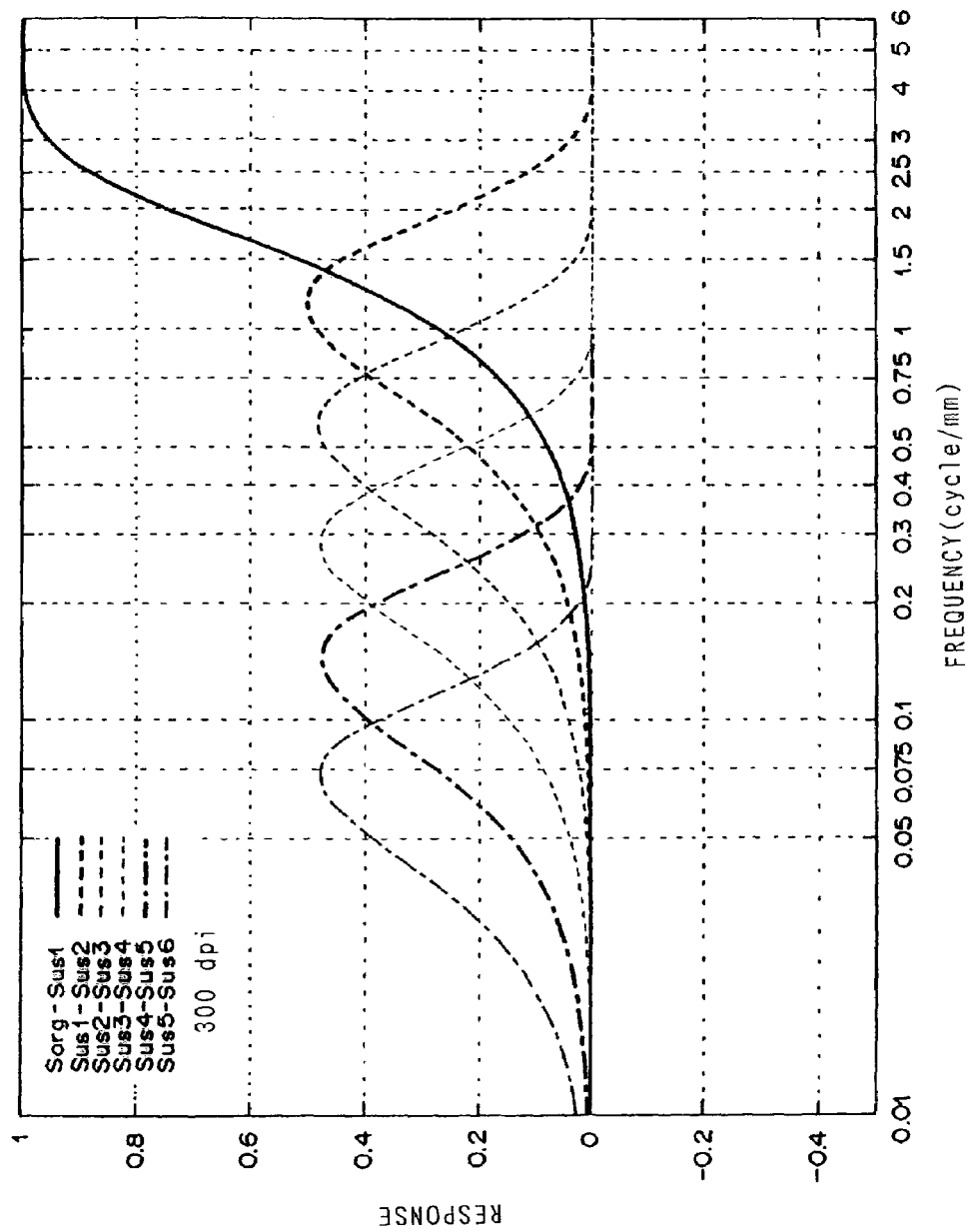
FIG. 26 is a view showing the frequency response characteristics of the band-limited signals obtained from an original image signal at 300 dpi.

FIG. 26 shows the frequency response characteristic of band-limited signals obtained from an original image signal $S_{org}$ having a resolution of 300 dpi. As can be seen from FIG. 26, the original image signal $S_{org}$ at 300 dpi is 5.9 cycles/mm in Nyquist frequency, which falls on the peak frequency of the band-limited signal in the highest frequency band. The peak frequency of the band-limited signal in the second highest frequency band is 1.018 cycle/mm, ⅕ of the Nyquist frequency. The peak frequency of the band-limited signal is reduced ½ by ½, e.g., 0.59 cycles/mm, 0.30 cycles/mm/0.15 cycles/mm and 0.07 cycles/mm, as the frequency band of the band-limited signal becomes lower. This relation substantially conforms to the relation for the original image signal $S_{org}$ at 10 lines/mm shown in FIG. 24, and holds irrespective of the resolution of the original image signal $S_{org}$ so long as the filters used in making the low-resolution image signals are not changed.

The transformation functions for transforming the band-limited signals obtained from an original image signal $S_{org}$ at 300 dpi are obtained by correcting the reference transformation functions shown in table 3 on the basis of the peak frequencies of the band-limited signals obtained from the original image signal $S_{org}$ at 10 lines/mm (reference original image signal $S_{org}0$) and those of the band-limited signals obtained from the original image signal $S_{org}$ at 300 dpi. This correction can be made, for instance, by interpolation or extrapolation. For example, the transformation function for the band-limited signals whose peak frequency is 1.18 cycles/mm is obtained by determining the relation between the peak frequencies and the values of the transformation functions on the basis of the values of the transformation functions at 5 cycles/mm and 1 cycle/mm in table 3, and substituting the value of the peak frequency (1.18) in the following formula (6) representing the determined relation between the peak frequencies and the values of the transformation functions.

$$fx = \frac{1}{40} \times C + 0.875 \qquad (6),$$

wherein fx=the value of the transformation function and C represents the peak frequency. Such linear interpolation is carried out on all the peak frequencies of the band-limited signals obtained from the original image signal $S_{org}$ at 300 dpi, thereby obtaining the transformation functions for all the band-limited signals as shown in the following table 4.

TABLE 4

| peak frequency (cycles/mm) | 5.9 | 1.18 | 0.59 | 0.30 | 0.15 | 0.07 |
|---|---|---|---|---|---|---|
| transformation function | 1.02 | 0.91 | 0.82 | 0.64 | 0.45 | 0.24 |

Though, in the description above, linear interpolation is used, other interpolations may be employed.

Figure 27:
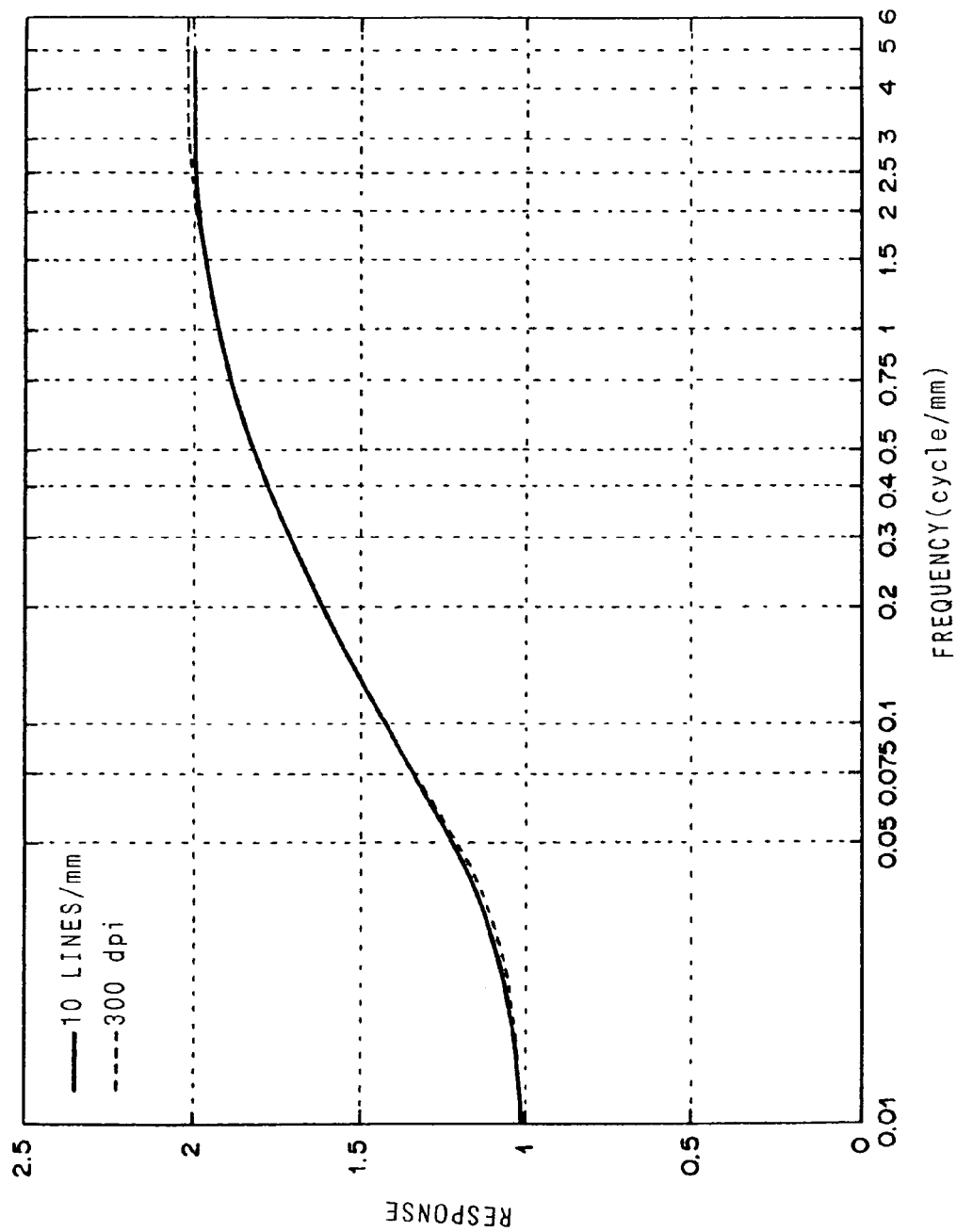
FIG. 27 is a view showing the frequency response characteristic of the processed image signal $S_{proc}$ obtained by processing an original image signal at 300 dpi by the image processing of the third embodiment of the present invention.

In FIG. 27, the solid line shows the frequency response characteristic of the processed image signal $S_{proc}$ obtained by carrying out the frequency enhancement processing by use of the transformation functions shown in table 3 on the original image signal $S_{org}$ at 10 lines/mm and the broken line shows that of the processed image signal $S_{proc}$ obtained by carrying out the frequency enhancement processing by use of the transformation functions shown in table 4 on the original image signal $S_{org}$ at 300 dpi. As can be seen from FIG. 27, the processed image signals $S_{proc}$ are substantially equal to each other in frequency response characteristic.

Figure 28:
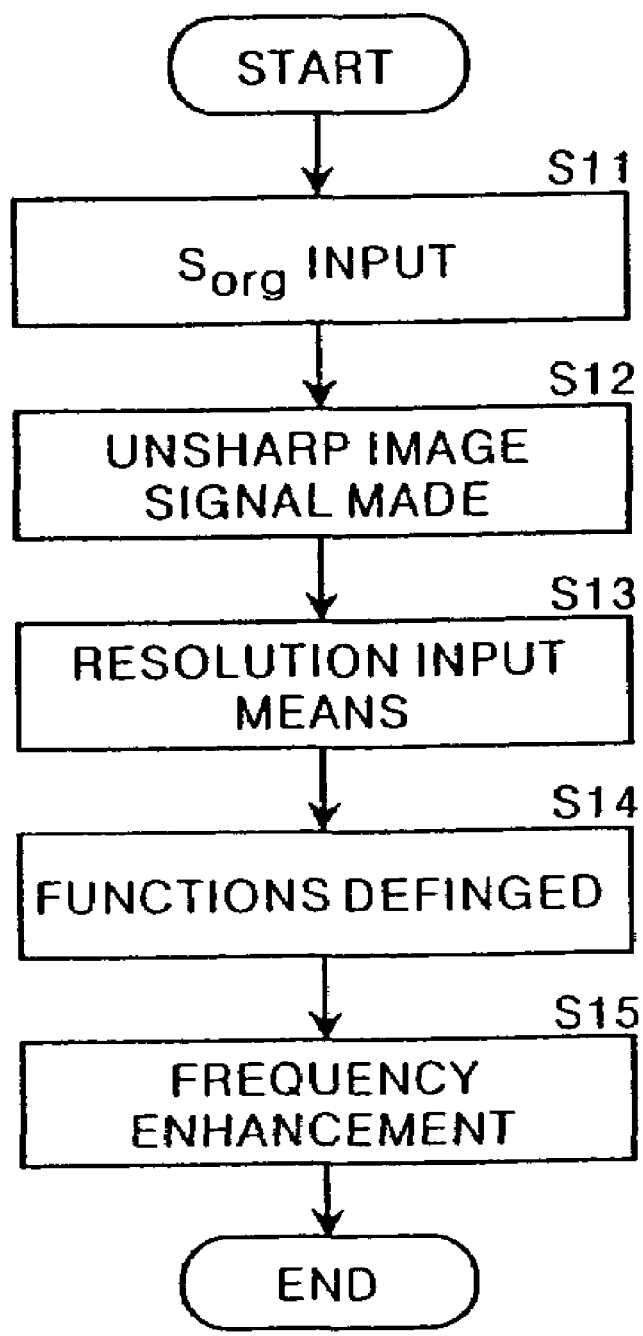
FIG. 28 is a flow chart for illustrating operation of the image processing system of the third embodiment.

Operation of the image processing system 101 of this embodiment will be described with reference to the flow chart shown in FIG. 28. An original image signal $S_{org}$ is first input into the image processing system 101, for instance, from an image read-out apparatus. (step S11) The original image signal $S_{org}$ is input into the unsharp image signal making means 2 and unsharp image signals $S_{us}k$ are made by the unsharp image signal making means 2. (step S12) Resolution information M on the original image signal $S_{org}$ is input into the resolution information input means 105. (step S13) Then the transformation function calculating means 4 calculates the transformation functions on the basis of the resolution information M in the manner described above. (step S14) Steps S3 and S4 may be executed before steps S1 and S2. When steps S3 and S4 and steps S1 and S2 are executed in parallel, the operation time can be shortened. Frequency-limited signals are made on the basis of the unsharp image signals $S_{us}k$ and the frequency enhancement processing represented by the aforesaid formulae (2) is executed by the processing means 3 on the basis of the transformation functions calculated by the transformation function calculating means 4, whereby a processed image signal $S_{proc}$ is obtained. (step S15).

The frequency enhancement processing is for making add signals, which are to be added to the original image signal in order to enhance desired frequency components, by use of the unsharp image signals. The frequency bands are differently processed so that the signals in the respective frequency bands forming the respective add signals become desired signals in order to prevent generation of artifact due to the frequency enhancement processing. In order to make the desired signals, it is preferred that signals have desired frequency response characteristics irrespective of the resolution of the original image signal $S_{org}$. In the image processing system 101 of this embodiment, the transformation functions are calculated so that the frequency response characteristics of the processed image signal $S_{proc}$ become substantially constant irrespective of the resolution of the original image signal $S_{org}$, and accordingly, a processed image signal $S_{proc}$ having substantially constant frequency response characteristics can be obtained irrespective of the resolution of the original image signal $S_{org}$.

Further, since the transformation functions for original image signals $S_{org}$ having resolutions different from the reference resolution are obtained by correcting the reference transformation functions, it is not necessary to prepare a plurality of transformation functions for various resolutions, whereby trouble to manage a plurality of transformation functions can be saved.

Figure 29A:
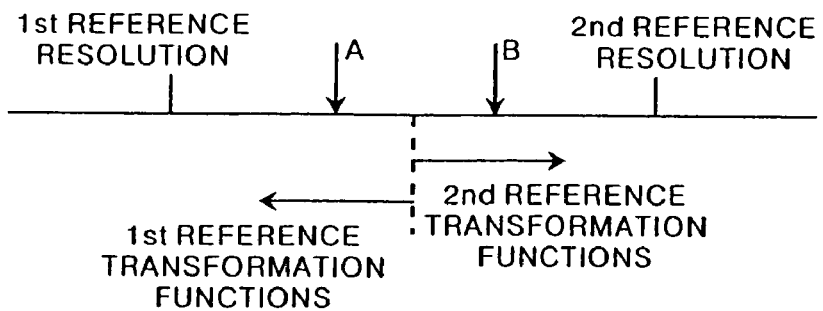
FIGS. 29A and 29B are views for illustrating different manners for selecting a reference picture element density.
Figure 29B:
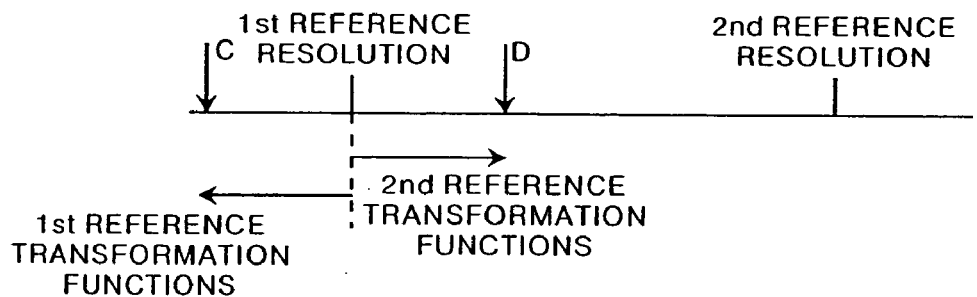

Though, in the third embodiment described above, only one series of reference transformation functions for one reference resolution, 10 lines/mm, are prepared and transformation functions for other resolution are calculated on the basis of the one series of reference transformation functions, it is possible to prepare a plurality of series of reference transformation functions for a plurality of resolutions which are relatively frequently used and to calculate transformation functions for an object picture element density on the basis of one of the reference resolutions. For example, when first and second reference transformation functions for first and second resolutions are prepared in advance, transformation functions for an object original image signal to be processed may be calculated on the basis the first reference transformation functions when the resolution of the object original image signal is lower than the middle between the first and second resolutions as shown by arrow A in FIG. 29A and on the basis the second reference transformation functions when the resolution of the object original image signal is not lower than the middle between the first and second resolutions as shown by arrow B. Otherwise, the transformation functions for the object original image signal may be calculated on the basis the first reference transformation functions when the resolution of the object original image signal is not higher than the first resolution as shown by arrow C in FIG. 29B and on the basis the second reference transformation functions when the resolution of the object original image signal is higher than the first resolution as shown by arrow D.

Further, though in the third embodiment described above, the transformation functions are constants, the transformation functions may be non-linear functions having predetermined inclinations.

An image processing system in accordance with a fourth embodiment of the present invention, where non-linear functions are employed as the transformation functions, will be described, hereinbelow.

Figure 30:
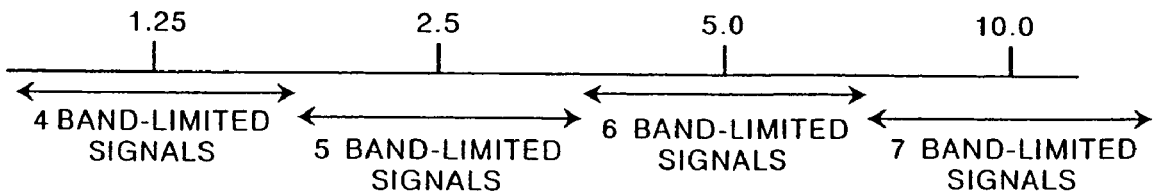
FIG. 30 is a view showing the relation between the number of the band-limited signals and the resolution.

In the fourth embodiment, as the transformation functions $f_k$, non-linear functions represented by the following formula (8) are employed.

$$f(S_{in}) = S_{out} = S_{in} \times Y \times \{\exp(X/S_{in}) - 1\} / \{(\exp(X/S_{in}) + 1\} \quad (8)$$

wherein $S_{in}$ represents an input signal, $S_{out}$ represents an output signal, X represents a parameter which governs the degree of non-linearity, i.e., the condition of suppression, and Y represents a parameter which controls the inclination of the overall function, i.e., the frequency response characteristic. By adjusting the parameters X and Y, the frequency response characteristic of the band-limited signal can be changed. In this embodiment, parameters X and Y shown in the following table 5 are employed. Table 5 shows combinations of parameters X and Y for the resolutions of, 10 lines/mm, 6.7 lines/mm and 5 lines/mm, and in table 5, the parameters X and Y for each resolution on higher lines are for band-limited signals in higher frequency bands. As shown in FIG. 30, as the Nyquist frequency becomes lower, the number of the band-limited signals used in the non-linear processing is reduced. For example, in the case of an original image signal at 10 lines/mm, the number of the band-limited signals is 6, whereas in case of original image signals at 6.7 lines/mm and 5 lines/mm, the number of the band-limited signals is 5. This is because no band-limited signal having a frequency peak at 0.03 cycles/mm exists for the resolutions of 6.7 lines/mm and 5 lines/mm. The case where 10 lines/mm is employed as the reference resolution, the transformation functions defined by the combinations of the parameters X and Y shown in table 5 are employed as the reference transformation functions, and the resolution of the original image signal to be processed is 200 dpi will be described, hereinbelow.

TABLE 5

| 10 lines/mm | | 6.7 lines/mm | | 5 lines/mm | |
| --- | --- | --- | --- | --- | --- |
| X | Y | X | Y | X | Y |
| 15 | 1.00 | 20 | 1.00 | 20 | 1.00 |
| 20 | 0.99 | 30 | 0.83 | 30 | 0.81 |
| 30 | 0.80 | 40 | 0.67 | 40 | 0.66 |
| 40 | 0.66 | 50 | 0.43 | 50 | 0.42 |
| 50 | 0.41 | 60 | 0.32 | 60 | 0.29 |
| 60 | 0.29 | | | | |

FIG. 31 shows the frequency response characteristics of band-limited signals obtained from an original image signal $S_{org}$ having a resolution of 200 dpi. As can be seen from FIG. 31, the original image signal $S_{org}$ at 200 dpi is about 4.0 cycles/mm (more strictly 3.937 cycles/mm) in Nyquist frequency, which falls on the peak frequency of the band-limited signal in the highest frequency band. The peak frequency of the band-limited signal in the second highest frequency band is 0.8 cycles/mm, ⅕ of the Nyquist frequency. The peak frequency of the band-limited signal is reduced ½ by ½, e.g., 0.4 cycles/mm, 0.2 cycles/mm/0.1 cycles/mm and 0.05 cycles/mm, as the frequency band of the band-limited signal becomes lower. This relation substantially conforms to the relation for the original image signal $S_{org}$ at 10 lines/mm shown in FIG. 24, and holds irrespective of the resolution of the original image signal $S_{org}$ so long as the filters used in making the low-resolution image signals are not changed. FIG. 32 shows the frequency response characteristics of the processed image signal $S_{proc}$ obtained by processing the original image signal $S_{org}$ at 200 dpi by use of the reference transformation functions (broken line)

and the processed image signal $S_{proc}0$ obtained by processing the reference original image signal $S_{org}0$ at the reference resolution by use of the reference transformation functions (solid line). As can be seen from FIG. 32, the processed image signal $S_{proc}$ is enhanced in frequency bands lower than the processed image signal $S_{proc}0$.

Accordingly, as in the third embodiment, the transformation functions for transforming the band-limited signals obtained from an original image signal $S_{org}$ at 200 dpi are obtained by correcting the reference transformation functions on the basis of the resolution of the original image signal $S_{org}$. In this embodiment, the peak frequencies of the band-limited signals obtained from the reference original image signal $S_{org}$ at 10 lines/mm, the parameters of the reference transformation functions (the values of Y in table 5), and the peak frequencies of the band-limited signals obtained from the original image signal $S_{org}$ at 200 dpi, and the number of the transformation functions to be obtained (six) are known. Accordingly, responses at peak frequencies of the band-limited signals obtained from the original image signal $S_{org}$ at 200 dpi are first obtained according to the following formulae (9) on the basis of the frequency response characteristics of the band-limited signals obtained from the reference original image signal $S_{org}$ at 10 lines/mm, the parameters Y of the reference transformation functions and the peak frequencies of the band-limited signals obtained from the original image signal $S_{org}$ at 200 dpi.

$$R1=X1[F1]*Y1+X2[F1]*Y2+X3[F1]*Y3+X4[F1]*Y4+X5[F1]*Y5+X6[F1]*Y6$$

$$R2=X1[F2]*Y1+X2[F2]*Y2+X3[F2]*Y3+X4[F2]*Y4+X5[F2]*Y5+X6[F2]*Y6$$

$$R3=X1[F3]*Y1+X2[F3]*Y2+X3[F3]*Y3+X4[F3]*Y4+X[F3]*Y5+X6[F3]*Y6$$

$$R4=X1[F4]*Y1+X2[F4]*Y2+X3[F4]*Y3+X4[F4]*Y4+X5[F4]*Y5+X6[F4]*Y6$$

$$R5=X1[F5]*Y1+X2[F5]*Y2+X3[F5]*Y3+X4[F5]*Y4+X5[F5]*Y5+X6[F5]*Y6$$

$$R6=X1[F6]*Y1+X2[F6]*Y2+X3[F6]*Y3+X4[F6]*Y4+X5[F6]*Y5+X6[F6]*Y6 \quad (9)$$

wherein R1 to R6 represent responses at peak frequencies (200 dpi), X1[F1] to X6[F6] represent responses of the band-limited signals obtained from the reference original image signal at frequencies of F1 to F6, Y1 to Y6 represent the parameters of the reference transformation functions.

Then by solving the following simultaneous equations 10, parameters A1 to A6 of the transformation functions for the original image signal at 200 dpi are obtained.

$$R1=Z1[F1]*A1+Z2[F1]*A2+Z3[F1]*A3+Z4[F1]*A4+Z5[F1]*A5+Z6[F1]*A6$$

$$R2=Z1[F2]*A1+Z2[F2]*A2+Z3[F2]*A3+Z4[F2]*A4+Z5[F2]*A5+Z6[F2]*A6$$

$$R3=Z1[F3]*A1+Z2[F3]*A2+Z3[F3]*A3+Z4[F3]*A4+Z5[F3]*A5+Z6[F3]*A6$$

$$R4=Z1[F4]*A1+Z2[F4]*A2+Z3[F4]*A3+Z4[F4]*A4+Z5[F4]*A5+Z6[F4]*A6$$

$$R5=Z1[F5]*A1+Z2[F5]*A2+Z3[F5]*A3+Z4[F5]*A4+Z5[F5]*A5+Z6[F5]*A6$$

$$R6=Z1[F6]*A1+Z2[F6]*A2+Z3[F6]*A3+Z4[F6]*A4+Z5[F6]*A5+Z6[F6]*A6 \quad (10)$$

wherein R1 to R6 represent responses at peak frequencies (200 dpi) obtained according to formulae (9), Z1[F1] to Z6[F6] represent responses of the band-limited signals obtained from the original image signal at 200 dpi at frequencies of F1 to F6, A1 to A6 represent the parameters of the transformation functions for the original image signal at 200 dpi.

When the frequency enhancement processing is carried out on the original image signal at 200 dpi by use of the transformation functions thus obtained, a processed image signal $S_{proc}$ which is substantially constant in frequency response characteristic can be obtained irrespective of the resolution of the original image signal.

A method of calculating Z1[F1] to Z6[F6] in formulae (10) will be described, hereinbelow. As described above, the band-limited signals obtained from the reference original image signal $S_{org}0$ at 10 lines/mm have characteristics shown in FIG. 24. The characteristic of the band-limited signal in the highest frequency band shown by the solid line can be obtained by obtaining the frequency response characteristic of the unsharp image signal by multiplying Fourier-transformed value of the coefficient of filter of the one-dimensional filter shown in FIG. 3A by Fourier-transformed value of the coefficient of filter of the one-dimensional filter shown in FIG. 5, and subtracting the frequency response characteristic of the unsharp image signal thus obtained from the frequency response characteristic of the reference original image signal $S_{org}0$ (=1 over the entire frequency bands). The characteristic of band-limited signals in lower frequency bands can be obtained by obtaining the frequency response characteristic of the unsharp image signal in the similar manner on the basis of the coefficient of filter for obtaining the low-resolution image signal corresponding to the frequency band and the coefficient of filter for obtaining the unsharp image signal, and by subtracting the frequency response characteristic of the unsharp image signal thus obtained from the frequency response characteristic of the unsharp image signal in the frequency band higher by one stage.

Figure 33:
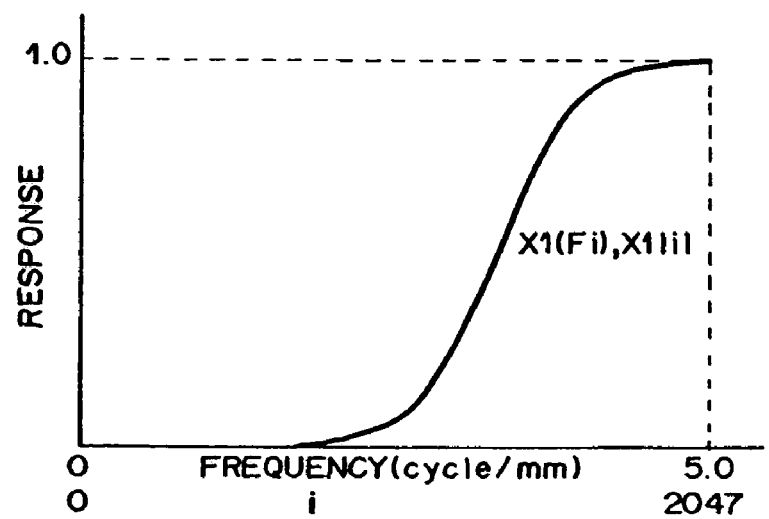
FIG. 33 is a view showing the relation between the response X1[Fi] and the function X1[i]

When the response of the band-limited signal in the highest frequency band of the reference original image signal $S_{org}0$ is represented by a function X1[Fi] (Fi being a frequency) and the values obtained by sampling the response of the band-limited signal in the highest frequency band of the reference original image signal at 2048 frequencies are represented by a function X1[I], the relation between Fi and i is as shown by the following formula (11).

$$i=2047 \times Fi/fnq \quad (11)$$

wherein fnq represents a Nyquist frequency and $2047 \geq i \geq 0$. This is shown in FIG. 33. When the function X1[i] is handled as a table, i represents addresses. By thus obtaining responses for the band-limited signals in all the frequency bands as functions X1[i] to X6[i] and handling the functions X1[i] to X6[i] as tables, values of X1[F1] to X6[F6] in the aforesaid formulae (9) and (10) can be easily obtained.

Figure 34:
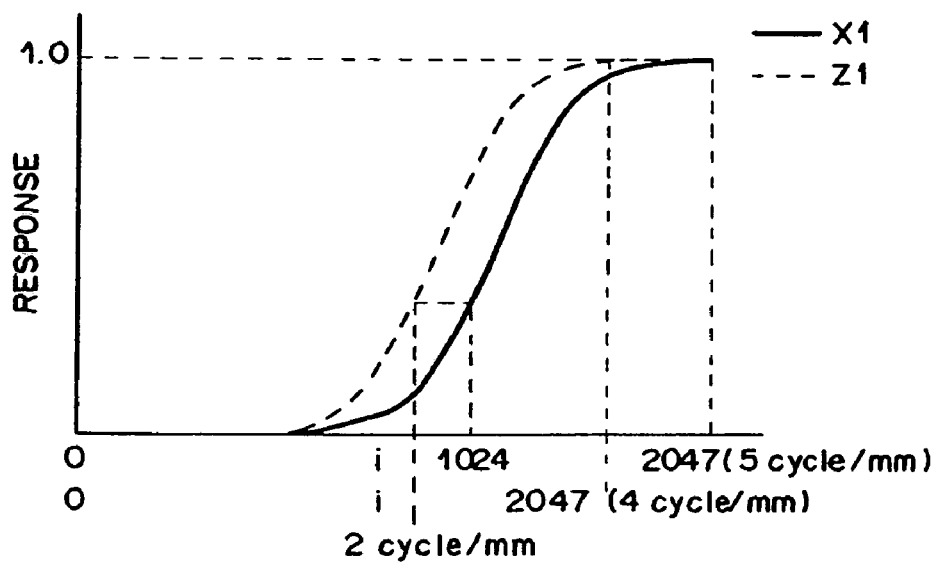
FIG. 34 is a view showing the relation between the functions X1[i], and Z1[i]

The response Z1[F1] to Z6[F6] are obtained on the basis of the functions X1[i] to X6[i]. The response Z1[Fi] at a given frequency Fi is obtained from the function X1[i] in the following manner. The response Z1[Fi] is the response of the band-limited signal in the highest frequency band in the band-limited signals obtained from the original image signal at 200 dpi. The Nyquist frequency of the original image signal at 200 dpi is 4 cycles/mm, and when the values obtained by sampling, at 2048 frequencies, the response of the band-limited signal at the frequency band at which the response is Z1[Fi] are represented by a function Z1[i], the relation between Fi and i is as shown by the aforesaid formula (11) as in the case of X1[i]. FIG. 34 shows the relation between the functions X1[i] and Z1[i]. Though, in concept, the functions X1[i] and Z1[i] are different functions which are different in Nyquist frequency, the response Z1[Fi] can be approximated by use of the function X1[i]. For example, the response Z1[Fi] at 2 cycles/mm is obtained in the following manner. That is, since i=2047×2/4=1024 from the aforesaid formula (11), the response Z1[Fi] at 2 cycles/mm is given as the value of the function X1[i] at address of 1024.

By handling the functions X1[i] to X6[i] as tables and obtaining the address i on the basis of formula (11) and the Nyquist frequency of the original image signal on which the frequency enhancement processing is to be carried out, and referring to the tables (the functions X1[i] to X6[i]) according to the address i, the responses Z1[F1] to Z6[F6] can be approximated.

When the frequency enhancement processing is to be carried out on an original image signal $S_{org}$ at 300 dpi, the responses at frequencies corresponding to the peak frequencies of the band-limited signals obtained from the original image signal at 300 dpi are obtained according to the aforesaid formulae (8) on the basis of the frequency response characteristics of the band-limited signals obtained from the reference original image signal, the peak frequencies of the band-limited signals obtained from the original image signal at 300 dpi and the parameters Y of the reference transformation functions. Then the parameters for the transformation functions are obtained according to the aforesaid formulae (10). In the original image signal at 300 dpi, the Nyquist frequency is 5.9 cycles/mm and higher than the Nyquist frequency of the reference original image signal $S_{org}0$. Since X1[F1] to X6[F6] in the aforesaid formulae (9) are functions for the range of 0 to 5 cycles/mm, no value is given for 5.9 cycles/mm by formulae (9) and R1 cannot be obtained. In this case, the peak frequencies of the band-limited signals obtained from the reference original image signal are employed as the peak frequencies of the band-limited signals obtained from the original image signal at 300 dpi.

The case where the frequency enhancement processing is to be carried out on a original image signal $S_{org}$ at 100 dpi will be described, hereinbelow. Since the Nyquist frequency of the original image signal at 100 dpi is about 2.0 cycles/mm (strictly 1.97 cycles/mm), the number of the band-limited signals is 5. Accordingly, the aforesaid formulae (9) and (10) are rewritten as the following formulae (12) and (13) and five parameters for the transformation functions are obtained according to formulae (12) and (13).

$R1=X1[F1]*Y1+X2[F1]*Y2+X3[F1]*Y3+X4[F1]*Y4+X5[F1]*Y5+X6[F1]*Y6$ $R2=X1[F2]*Y1+X2[F2]*Y2+X3[F2]*Y3+X4[F2]*Y4+X5[F2]*Y5+X6[F2]*Y6$ $R3=X1[F3]*Y1+X2[F3]*Y2+X3[F3]*Y3+X4[F3]*Y4+X5[F3]*Y5+X6[F3]*Y6$ $R4=X1[F4]*Y1+X2[F4]*Y2+X3[F4]*Y3+X4[F4]*Y4+X5[F4]*Y5+X6[F4]*Y6$ $R5=X1[F5]*Y1+X2[F5]*Y2+X3[F5]*Y3+X4[F5]*Y4+X5[F5]*Y5+X6[F5]*Y6$ (12)

wherein R1 to R5 represent responses at peak frequencies (100 dpi), X1[F1] to X6[F5] represent responses of the band-limited signals obtained from the reference original image signal at frequencies of F1 to F5, Y1 to Y6 represent the parameters of the reference transformation functions.

$R1=Z1[F1]*A1+Z2[F1]*A2+Z3[F1]*A3+Z4[F1]*A4+Z5[F1]*A5$ $R2=Z1[F2]*A1+Z2[F2]*A2+Z3[F2]*A3+Z4[F2]*A4+Z5[F2]*A5$ $R3=Z1[F3]*A1+Z2[F3]*A2+Z3[F3]*A3+Z4[F3]*A4+Z5[F3]*A5$ $R4=Z1[F4]*A1+Z2[F4]*A2+Z3[F4]*A3+Z4[F4]*A4+Z5[F4]*A5$ $R5=Z1[F5]*A1+Z2[F5]*A2+Z3[F5]*A3+Z4[F5]*A4+Z5[F5]*A5$ (13)

wherein R1 to R5 represent responses at peak frequencies (100 dpi) obtained according to formulae (12), Z1[F1] to Z5[F5] represent responses of the band-limited signals obtained from the original image signal at 100 dpi at frequencies of F1 to F5, A1 to A5 represent the parameters of the transformation functions for the original image signal at 100 dpi.

Figure 35:
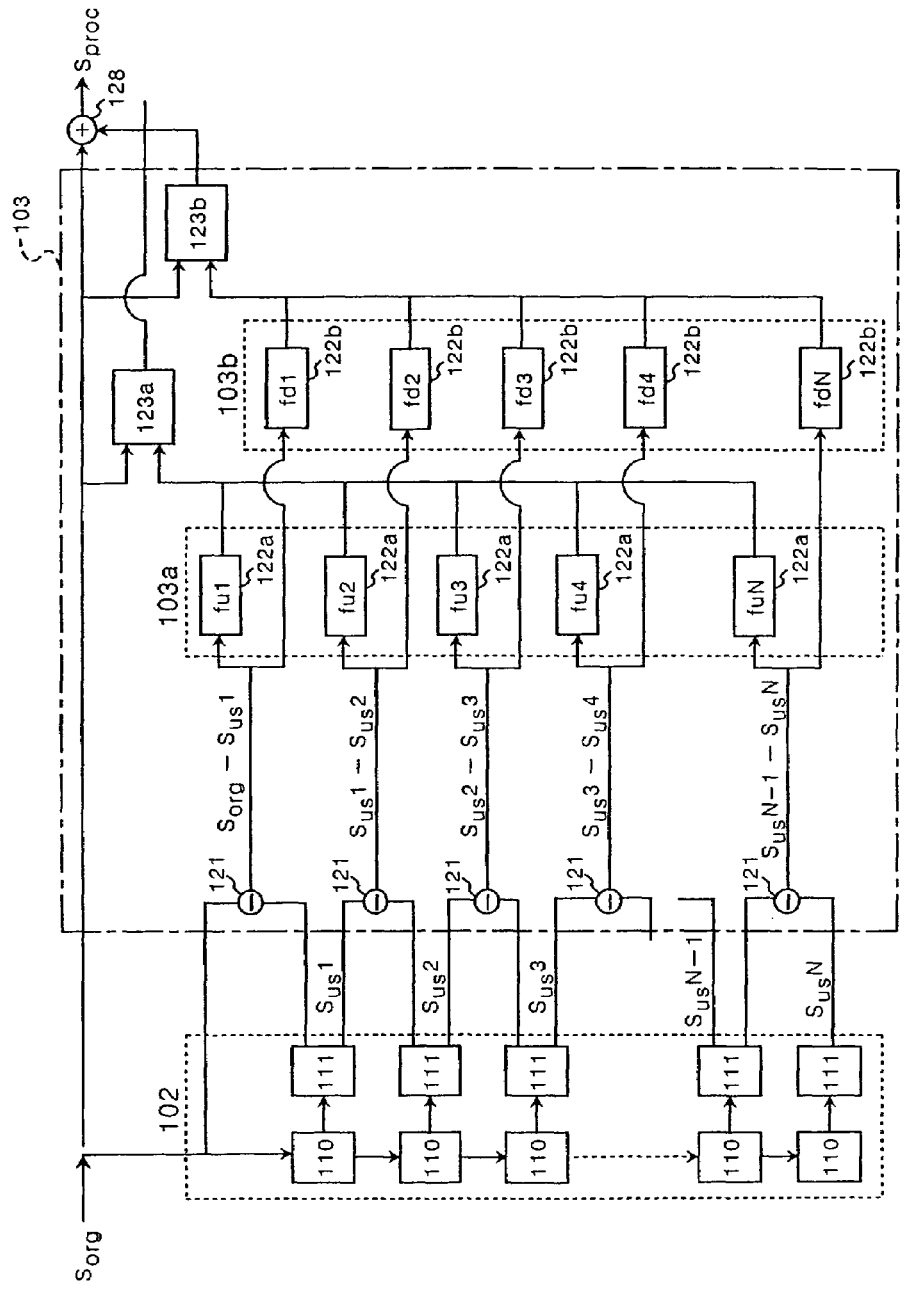
FIG. 35 is a view showing a system for executing a frequency enhancement processing and a dynamic range compression processing as a transformation processing in an image processing system in accordance with a fifth embodiment of the present invention.

Though, in the third and fourth embodiments described above, the frequency enhancement processing represented by the aforesaid formulae (2) is carried out as a transformation processing, a dynamic range compression processing and a frequency enhancement processing may be executed simultaneously as a transformation processing. FIG. 35 is a view showing a system for executing a frequency enhancement processing and a dynamic range compression processing as a transformation processing in an image processing system in accordance with a fifth embodiment of the present invention. As shown in FIG. 35, differences between two of the original image signal $S_{org}$ and the unsharp image signals $S_{us}k$ made by the filtering means 110 and the interpolation means 111 are taken, whereby a plurality of band-limited signals (e.g., $S_{org}-S_{us}1$, $S_{us}1-S_{us}2$ and the like) respectively representing frequency components in limited frequency bands of the original image signal are made. The band-limited signals thus obtained are input into first and second transformation sections 103a and 103b and processed by respective transformation means 122a and 122b in the first and second transformation sections 103a and 103b.

Transformation by the transformation means 122a in the first transformation section 103a is executed by use of the transformation functions calculated on the basis of the resolution of the original image signal $S_{org}$ as described above. For example, the transformation functions shown in FIG. 36 or 37 or combinations of the transformation functions shown in FIGS. 36 and 37 are used as the reference transformation functions and transformation functions are calculated on the basis of the reference transformation functions according to the resolution of the original image signal $S_{org}$ to be processed so that the frequency response characteristic of the processed image signal $S_{proc}$ becomes substantially constant irrespective of the resolution of the original image signal $S_{org}$.

Figure 36:
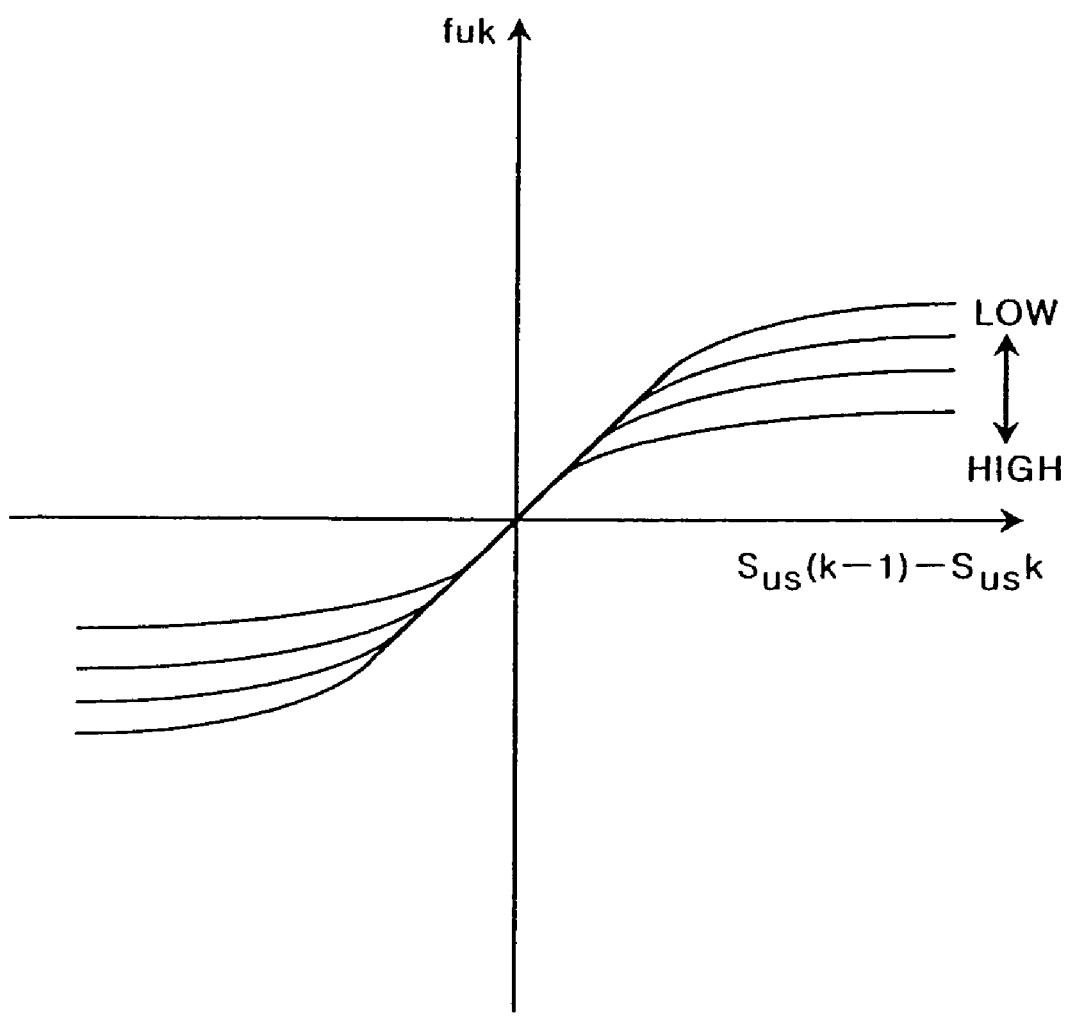
FIG. 36 is a view showing an example of the transformation functions used in the first transformation section in the fifth embodiment.

In accordance with the transformation functions shown in FIG. 36, the band-limited signals are transformed so that those which are large in amplitude are suppressed and the degree of suppression is increased as the frequency band of the band-limited signal becomes higher. This is for taking into account the fact that higher frequency components contained in edges of an actual radiation image is smaller in amplitude than low frequency components. In actual radiation images, even a substantially sharp edge is not in the form of a correct step and the amplitude often becomes smaller as the frequency becomes higher. Accordingly, it is preferred that suppression be made from a smaller amplitude as the frequency of the band-limited signals becomes higher. The functions shown in FIG. 36 serve for this purpose.

Figure 37:
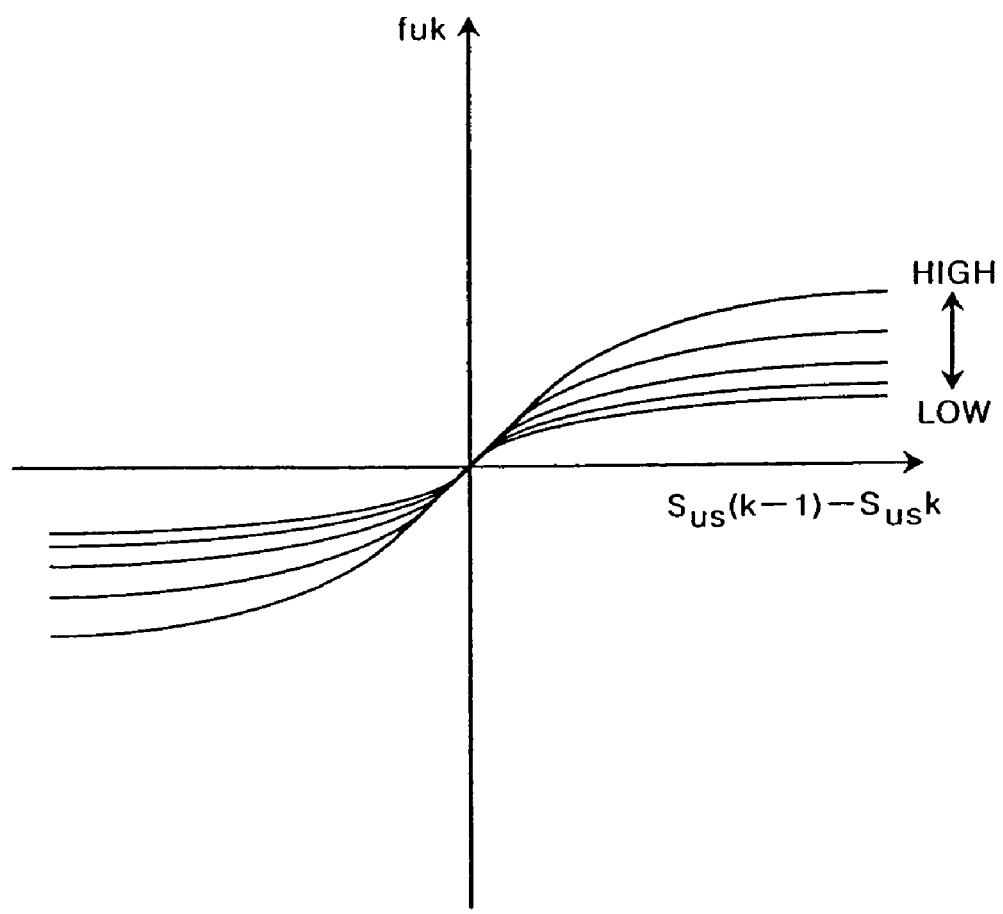
FIG. 37 is a view showing another example of the transformation functions used in the first transformation section in the fifth embodiment.

The transformation functions shown in FIG. 37 are for transforming the band-limited signals to those having values not larger than absolute values of the band-limited signals, which values are determined on the basis of the absolute values of the band-limited signals. As the frequency of the frequency band to be processed by the function becomes lower, the absolute value of a transformed image signal obtained by transforming a band-limited signal whose absolute value is in a predetermined range near 0 becomes smaller. That is, the functions all pass through the origin and all have inclinations smaller than 1. Further, the inclination near 0 is smaller as the frequency of the frequency band to be processed by the function becomes lower. When an add signal obtained by adding up the transformed image signals is added to the original image signal $S_{org}$, these functions contribute to smoothen the joint between the original image signal $S_{org}$ and the add signal, that is, rise of the signal.

Figure 38:
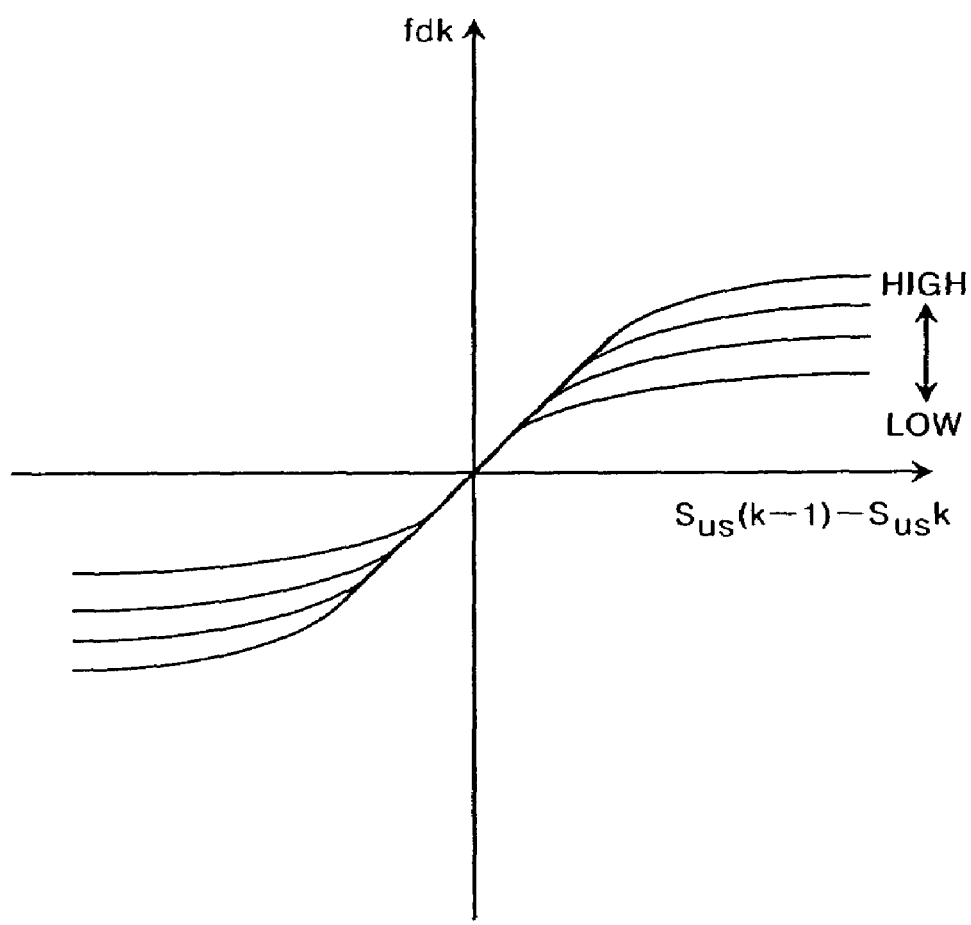
FIG. 38 is a view showing an example of the transformation functions used in the second transformation section in the fifth embodiment.

Similarly transformation by the transformation means 22b in the second transformation section 103b is executed by use of the transformation functions shown in FIG. 38 or 37 or combinations of the transformation functions shown in FIGS. 38 and 37. The transformed image signals output from the first and second transformation sections 103a and 103b are respectively input into operators 123a and 123b. The operator 123a executes operation for making signals necessary for the frequency enhancement processing, and the operator 123b executes operation for making signals necessary for the dynamic range compression processing.

The operator 123a executes a frequency enhancement processing similar to that in the third embodiment described above. That is, the band-limited signals transformed by the first transformation section 103a are added up, and an add signal thus obtained is multiplied by a coefficient of enhancement β which is determined according to the value of the original image signal $S_{org}$.

The operator 123b executes a dynamic range compression processing in the following manner. The band-limited signals transformed by the second transformation section 103b are added up, and an add signal thus obtained is subtracted from the original image signal $S_{org}$. Then the differential signal thus obtained is transformed on the basis of a transformation function, thereby obtaining a coefficient of dynamic range compression.

The signals respectively obtained by the operators 123a and 123b are added to the original image signal $S_{org}$ by an adder 128, whereby a processed image signal $S_{proc}$ is obtained.

The processing described above is represented by the following formula (3).

$$S_{proc} = S_{org} + \beta(S_{org}) \times F_{usm}(S_{org}, S_{us}1, S_{us}2, \ldots S_{us}N) + D\{S_{org} - F_{drc}(S_{org}, S_{us}1, S_{us}2, \ldots S_{us}N)\}$$

$$F_{usm}(S_{org}, S_{us}1, S_{us}2, \ldots S_{us}N) = \{f_{u1}(S_{org} - S_{us}1) + f_{u2}(S_{us}1 - S_{us}2) + \ldots + f_{uk}(S_{us}k-1 - S_{us}k) + \ldots f_{uN}(S_{us}N-1 - S_{us}N)\}$$

$$F_{drc}(S_{org}, S_{us}1, S_{us}2, \ldots S_{us}N) = \{f_{d1}(S_{org} - S_{us}1) + f_{d2}(S_{us}1 - S_{us}2) + \ldots + f_{dk}(S_{us}k-1 - S_{us}k) + \ldots + f_{dN}(S_{us}N-1 - S_{us}N)\} \quad (3)$$

wherein $S_{proc}$ is a processed image signal, $S_{org}$ is an original image signal, $S_{us}k$ (k=1 to N) is an unsharp image signal, $F_{uk}$(k=1 to N) is a transformation function used in the first transformation section, $f_{dk}$(k=1 to N) is a transformation function used in the second transformation section, $\beta(S_{org})$ is a coefficient of enhancement determined on the basis of the original image signal, and $D\{S_{org} - F_{drc}(S_{org}, S_{us}1, S_{us}2, \ldots S_{us}N)\}$ is a coefficient of dynamic range compression determined on the basis of the low frequency component signal, D being a function for transforming $D\{S_{org} - F_{drc}(S_{org}, S_{us}1, S_{us}2, \ldots S_{us}N)\}$.

In the image processing system shown in FIG. 35, the add signal used in the frequency enhancement processing and that used in the dynamic range compression processing are separately obtained on the basis of the original image signal $S_{org}$ and are finally added. However, it is possible to first carry out on one of the frequency enhancement processing and the dynamic range compression processing on the original image signal $S_{org}$ and to carry out the other processing on the resultant signal. Generally the lower density portion of a radiation image includes a relatively large amount of noise since the lower density portion is exposed to less radiation upon taking the radiation image. Since the frequency enhancement processing is a density-dependent processing where the degree of enhancement is increased with increase in density, the low density portion is not enhanced and accordingly noise is not enhanced when the frequency enhancement processing is directly carried out on the original image signal. To the contrast, when the frequency enhancement processing is carried out after the dynamic range compression processing is carried out on the original image signal, the low density portion is increased in its density by the dynamic range compression processing, and accordingly, the low density portion is enhanced by the following frequency enhancement processing, whereby noise is also enhanced. Accordingly, it is preferred that each signal be made on the basis of the original image signal $S_{org}$. Further also from the viewpoint of saving the processing time, it is preferred that the two processings be executed in parallel.

By calculating the transformation functions so that the frequency response characteristic of the processed image signal $S_{proc}$ becomes constant irrespective of resolution of the original image signal $S_{org}$, the processed image signal $S_{proc}$ can have a substantially constant frequency response characteristic irrespective of the resolution of the original image signal $S_{org}$.

Though, in the third to fifth embodiments, the transformation functions are calculated by correcting the reference transformation functions on the basis of the resolution of the original image signal $S_{org}$ input, the transformation functions obtained may be further corrected on the basis of information on the response characteristics of the original image signal $S_{org}$. That is, the original image signal $S_{org}$ is obtained from various apparatuses such as of a semiconductor sensor other than the radiation image read-out apparatus where a radiation image stored on a stimulable phosphor sheet is read out, and the response of the original image signal $S_{org}$ differs by apparatus to apparatus. Accordingly, by correcting the transformation functions on the basis of information on the response characteristics of the original image signal $S_{org}$, a processed image signal $S_{proc}$ having a constant frequency response characteristic can be obtained irrespective of the apparatus by which the original image signal $S_{org}$ is obtained. For example, when the response at 2 cycles/mm of an original image signal $S_{org}$ obtained by a certain apparatus is inferior to a reference response by 40%, the fact is input into the image processing system, and the image processing system corrects the transformation functions so that response at 2 cycles/mm becomes equal to the reference response.

Further, though in the fourth and fifth embodiments described above, non-linear functions are used and a non-linear processing is carried out on the band-limited signals, linear functions or constants may be employed as the transformation functions.

Further, though, in the third to fifth embodiments described above, the unsharp image signals are obtained from the original image signal by filtering and interpolation/enlargement and the band-limited signals are obtained from the original image signal and the unsharp image signals, the band-limited signals may be made, for instance, by transforming the original image signal to multiple resolution image signals by a wavelet transformation or a Laplacian pyramid, making the unsharp image signals from the image signals at the respective resolutions and making the band-limited signals from the unsharp image signals.

When the transformation functions for transforming band-limited signals obtained from an original image signal which is different from the reference original image signal in resolution are obtained by correcting the reference transformation functions, it is generally impossible to conform the frequency response characteristic of the processed image signal $S_{proc}$ to the reference processed image signal $S_{proc}0$ (the processed image signal $S_{proc}$ obtained by transforming the band-limited signals from the reference image signal by use of the reference transformation functions) over the entire frequency bands. In an image obtained by reproducing a processed image signal, the low frequency components are visually more prominent than the high frequency components. Accordingly, it is preferred that the transformation functions for band-limited signals for the original image signal to be processed be calculated so that the frequency response characteristic of the processed image signal $S_{proc}$ conforms to that of the reference processed image signal $S_{proc}0$ in frequency bands not lower than ⅕, more preferably not lower than ½, of the Nyquist frequency of the original image signal to be processed. For example, when the reference resolution is 5 lines/mm and the resolution of the original image signal $S_{org}$ to be processed is 4 lines/mm, it is preferred that the transformation functions for transforming the band-limited signals obtained from the original image signal $S_{org}$ to be processed be calculated on the basis of reference transformation functions for 5 lines/mm in the following manner.

That is, since the image signal is reduced ½ by ½ when a plurality of band-limited signals are obtained, the band-limited signal in the highest frequency band is at least 1.0 to 2.0 cycles/mm in characteristic width. Accordingly, in the image processing system in accordance with the third to fifth embodiments of the present invention, where the gains of the band-limited signals are controlled by the transformation functions, it is impossible to finely control the response in a frequency band between 1.0 and 2.0 cycles/mm and accordingly, when the frequency response characteristic sharply changes in the frequency band between 1.0 and 2.0 cycles/mm, it is impossible to obtain the transformation functions for the 4 lines/mm which can precisely conform the frequency response characteristic of the processed image signal $S_{proc}$ to that of the reference processed image signal $S_{proc}0$ in the frequency band between 1.0 and 2.0 cycles/mm. Accordingly, it is preferred that the transformation functions for band-limited signals for the original image signal (at 4 lines/mm) to be processed be calculated so that the frequency response characteristic of the processed image signal $S_{proc}$ conforms to that of the reference processed image signal $S_{proc}0$ in frequency bands not lower than ⅕, more preferably not lower than ½, of the Nyquist frequency of the original image signal to be processed, as shown in FIGS. 39A and 39B. In FIG. 39A, the broken line shows the frequency response characteristic of the reference processed image signal $S_{proc}0$ obtained by transforming the band-limited signals from the reference image signal (having a picture element density of 5 lines/mm) by use of reference transformation functions which are set so that relatively low frequency components are enhanced and the solid line shows the frequency response characteristic of the processed image signal $S_{proc}$ obtained by transforming the band-limited signals from the original image signal $S_{org}$ to be processed by use of the transformation functions which are obtained by correcting the reference transformation functions according to the resolution (4 lines/mm) of the original image signal $S_{org}$ to be processed. In FIG. 39B, the broken line shows the frequency response characteristic of the reference processed image signal $S_{proc}0$ obtained by transforming the band-limited signals from the reference image signal (having resolution of 5 lines/mm) by use of reference transformation functions which are set so that relatively high frequency components are enhanced and the solid line shows the frequency response characteristic of the processed image signal $S_{proc}$ obtained by transforming the band-limited signals from the original image signal $S_{org}$ to be processed by use of the transformation functions which are obtained by correcting the reference transformation functions according to the resolution (4 lines/mm) of the original image signal $S_{org}$ to be processed.

An image processing system in accordance with a sixth embodiment of the present invention will be described, hereinbelow. The image processing system is for carrying out a frequency enhancement processing by use of unsharp image signals on an original image signal obtained by reading out a radiation image of a human body recorded on a stimulable phosphor sheet so that an image suitable for diagnosis can be obtained. An image reproduced on the basis of the processed image signal is mainly recorded on photographic film and used in diagnosis.

Figure 40:
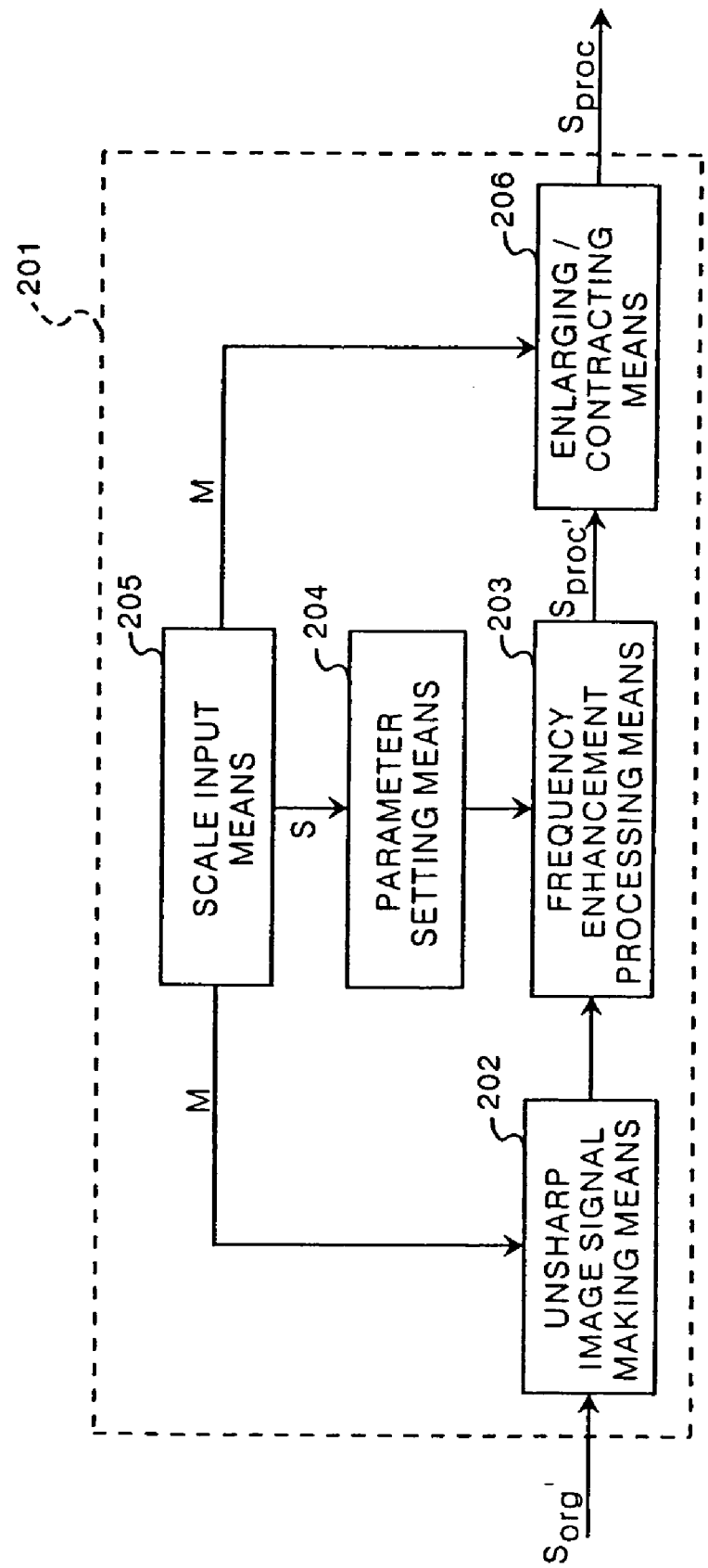
FIG. 40 is a schematic block diagram showing the arrangement of an image processing system in accordance with a sixth embodiment of the present invention.

In FIG. 40, an image processing system 201 in accordance with a sixth embodiment of the present invention comprises an unsharp image signal making means 202 which makes a plurality of unsharp image signals from multiple resolution image signals $S_{org}'$ which are obtained from an original image signal $S_{org}$ by transforming the original image signal $S_{org}$ to multiple resolution space and encoding the transformed image signals, and a frequency enhancement processing means 203 which carries out a frequency enhancement processing for enhancing a particular frequency and obtains an intermediate processed image signal $S_{proc}'$. The image processing system 201 further comprises a parameter setting means 204, a scale input means 205 and an enlarging/contracting means 206. The parameter setting means 204 is a means which sets transformation functions which the frequency enhancement processing means 203 uses in the frequency enhancement processing on the basis of scale information S input from the scale input means 205. The scale input means 205 is a means for obtaining scale information S on the original image signal $S_{org}$. The scale information S may be input as a value by the operator by a keyboard or by the operator selecting a value from a plurality of scales displayed on a control screen. The enlarging/contracting means 206 enlarges or contracts the intermediate processed image signal $S_{proc}'$ obtained by the frequency enhancement processing means 203 on the basis of the scale information S, thereby making a final processed image signal $S_{proc}$.

The original image signal $S_{org}$ is transformed into multiple resolution space and the transformed image signals are encoded in the following manner. That is, as shown in FIG. 41A, the original image signal $S_{org}$ is subjected to wavelet transformation and is decomposed into four pieces of data LL1, HL0, LH0 and HH0 by resolution. The data LL1 represents an image obtained by reducing the original image to ½ in both longitudinal and lateral directions. The data HL0, LH0 and HH0 represents a longitudinal edge, a lateral edge and an oblique edge. When the four pieces of data LL1, HL0, LH0 and HH0 are subjected to inverse wavelet transformation, the original image signal $S_{org}$ is obtained. Then the data LL1 is further subjected to wavelet transformation and decomposed into four pieces of data LL2, HL1, LH1 and HH1 as shown in FIG. 41B. The data LL2 represents an image obtained by reducing data LL1 to ½ in both longitudinal and lateral directions. The data HL1, LH1 and HH1 represents a longitudinal edge component, a lateral edge component and an oblique edge component of the data LL1. When the four pieces of data LL2, HL1, LH1 and HH1 are subjected to inverse wavelet transformation, a low resolution image signal having a resolution equal to ½ of that of the original image signal is obtained. Further wavelet transformation is repeated a desired number of times on data LL obtained each time the wavelet transformation is carried out, thereby obtaining a plurality of pieces of data which are different in resolution. Thereafter, data at each resolution is encoded as shown in FIG. 41C and the multiple resolution image signals $S_{org}'$ is obtained.

By decoding only image signals up to a desired resolution in the multiple resolution image signals $S_{org}'$ and carrying out inverse wavelet transformation on the image signals, a low resolution image signal representing an image at a resolution of $½^k$ (k being the desired resolution) of that of the original image can be obtained.

Figure 42:
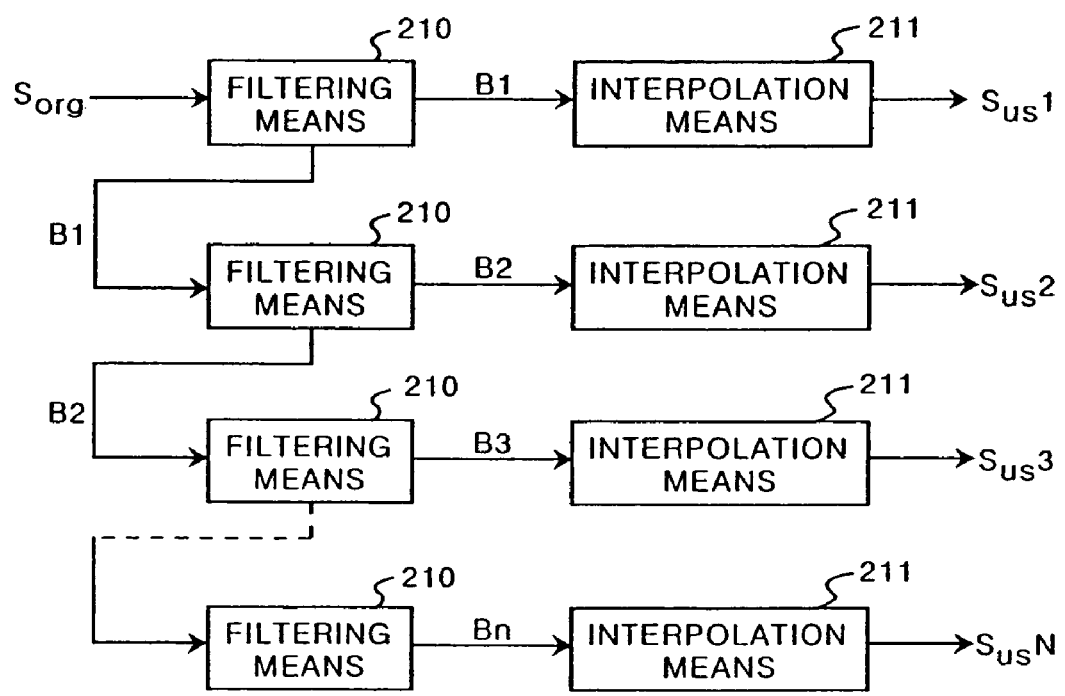
FIG. 42 is a schematic block diagram showing the arrangement of the unsharp image signal making means employed in the image processing system shown in FIG. 40.

Making the unsharp image signals will be described, hereinbelow. As shown in FIG. 42, the unsharp image signal making means 202 comprises first to n-th filtering means 210. The first filtering means 210 carries out a filtering processing on the original image signal $S_{org}$, reconstructed from the multiple resolution image signals $S_{org}'$, in x- and y-directions and makes a low resolution image signal B1 which is lower than the original image signal $S_{org}$ in resolution. The second filtering means 210 carries out a similar filtering processing on the low resolution image signal B1 thus obtained and makes a low resolution image signal B2 which is lower than the low resolution image signal B1 in resolution, and the third filtering means 210 carries out a similar filtering processing on the low resolution image signal B2 thus obtained and makes a low resolution image signal B3 which is lower than the low resolution image signal B3 in resolution. In this manner, the n-th filtering means 210 carries out a similar filtering processing on the low resolution image signal Bn−1 and makes a low resolution image signal Bn which is lower than the low resolution image signal Bn−1 in resolution. The unsharp image signal making means 202 further comprises first to n-th interpolation means 211. The interpolation means 211 carry out an interpolation/enlargement processing on the low resolution image signals B1 to Bn obtained at the respective stages of filtering, and makes a plurality of unsharp image signals $S_{us}k$ ($S_{us}1$ to $S_{us}N$) which are different in sharpness.

In this particular embodiment, filters which substantially conform to one-dimensional Gaussian distribution are used in the filtering processing. That is, coefficients of the filters are determined according the following formula (4) which relates to a Gaussian signal.

$$f(t) = e^{-\frac{t^2}{2\sigma^2}} \quad (4)$$

This is because the Gaussian signal is good in localization in both a real space and a frequency space. For example, the 5×1 one-dimensional filters are as shown in FIG. 43 when σ=1 in formula (4).

Figures 43, 44, 45:
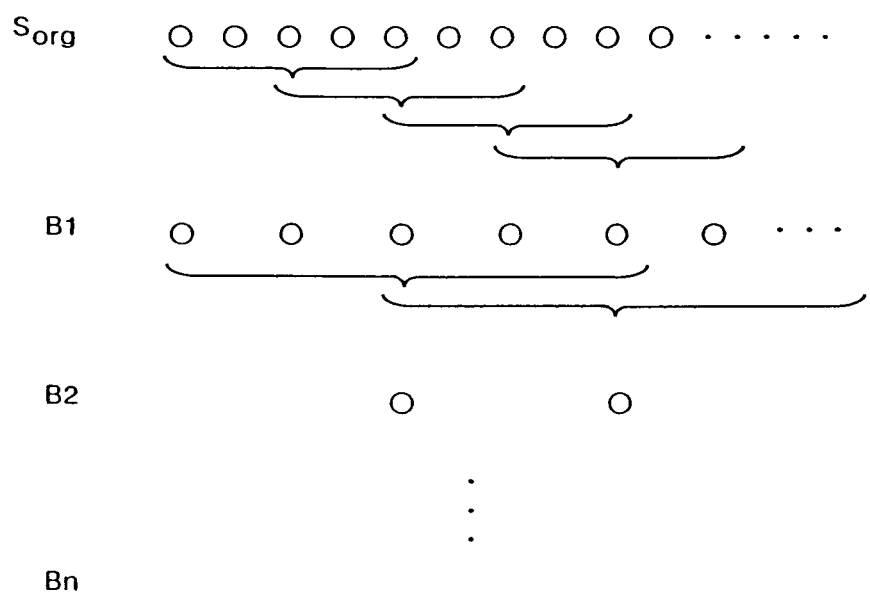
FIG. 43 is a view showing an example of the filter to be used in the filtering processing.
FIG. 44 shows in detail the low-resolution image signal making processing.
FIG. 45 is a view showing an example of the filter employed in the interpolation/enlargement processing.

The filtering is carried out on the original image signal $S_{org}$ or the low resolution image signals every second picture element as shown in FIG. 44. When such filtering is carried out in both x- and y-directions, the number of picture elements in obtained low resolution image signal is reduced to ¼ of the preceding image signal (e.g., the original image signal $S_{org}$ in the case of the low resolution image signal B1, and the low resolution image signal B1 in the case of the low resolution image signal B2). That is, the number of picture elements in each of the low resolution image signals Bk(k stands for 1 to n) is $½^k$ of the original image signal $S_{org}$.

The interpolation/enlargement processing to be carried out on the low resolution image signals Bk thus obtained will be described, hereinbelow. Though various methods of interpolation such as B-spline can be employed, a Gaussian signal is also employed in the interpolation in this particular embodiment since low-pass filters based on Gaussian signals are employed in the filtering processing. Specifically, an approximation, $\sigma=2^{k-1}$, is employed in the following formula (5).

$$I(t) = 2 \cdot \sigma \cdot e^{-\frac{t^2}{2\sigma^2}} \quad (5)$$

When interpolating the low resolution image signal B1, σ=1 since k=1. In this case, a one-dimensional filter of 5×1 such as shown in FIG. 45 is employed in the interpolation. In this interpolation, a picture element of 0 in value is interpolated every second picture element in the low resolution image signal B1, whereby the low resolution image signal B1 is enlarged to a size equal to the size of the original image, and the interpolated low resolution image signal B1 is subjected to a filtering processing using the one-dimensional filter shown in FIG. 45.

This interpolation/enlargement processing is carried out on all the low resolution image signals Bk (B1 to Bn). When interpolating a low resolution image signal Bk, a filter which is $3\times2^{k-1}$ in length is prepared according to formula (5) and $2^{k-1}$ picture elements of 0 in value are interpolated between each pair of adjacent picture elements, whereby the low resolution image signal Bk is enlarged to a size equal to the size of the original image signal. Then the interpolated low resolution image signal Bk is subjected to a filtering processing using the filter which is $3\times2^{k-1}$ in length.

Figure 46:
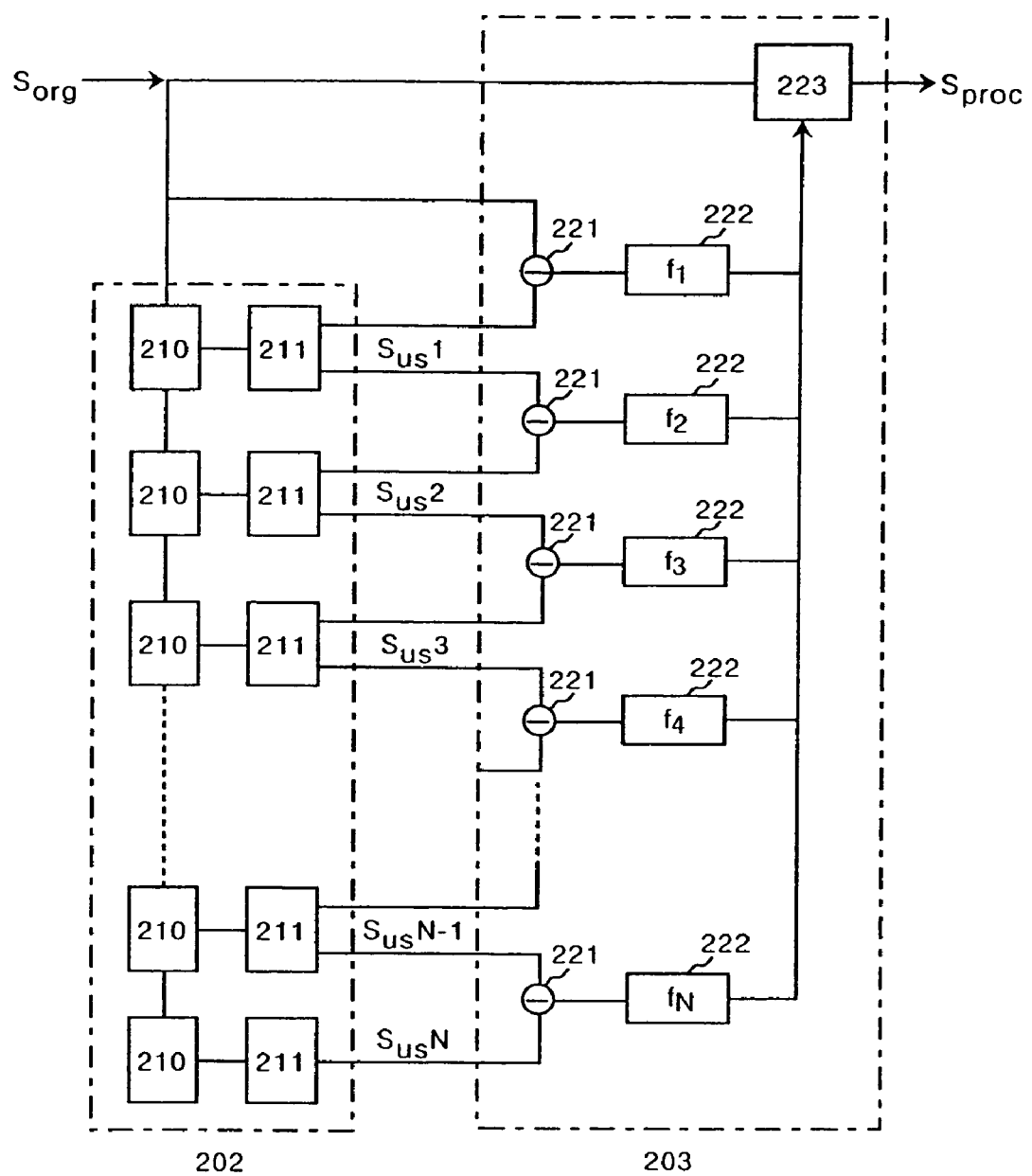
FIG. 46 is a view showing system for executing a frequency enhancement processing.

The frequency enhancement processing to be carried out by use of the unsharp image signals $S_{us}k$ thus obtained will be described, hereinbelow. FIG. 46 shows a system for carrying out a frequency enhancement processing together with the unsharp image signal making means 202. As shown in FIG. 46, unsharp image signals $S_{us}k$ are made from the original image signal $S_{org}$ and differences between the original image signal $S_{org}$ and the unsharp image signals $S_{us}k$ are taken by respective subtractors 221, whereby band-limited signals ($S_{org}-S_{us}1$, $S_{us}1-S_{us}2$, and the like) which are components in limited frequency bands of the original image signal $S_{org}$ are made.

The band-limited signals are transformed to predetermined amplitudes with different transformation functions $f_1$ to $f_N$ in respective transformation circuits 222 and the transformed band-limited signals are added up and further added to the original image signal $S_{org}$ by an operator 223 according to the following formulae (2'), whereby an intermediate processed image signal $S_{proc}'$ in which a desired frequency components is enhanced to a required degree is generated.

$$S_{proc}'=S_{org}+\beta(S_{org})\times F_{usm}(S_{org}, S_{us}1, S_{us}2, \ldots S_{us}N)$$

$$F_{usm}(S_{org}, S_{us}1, S_{us}2, \ldots S_{us}N)=f_1(S_{org}-S_{us}1)+f_2(S_{us}1-S_{us}2)+ \ldots +f_k(S_{us}k-1-S_{us}k)+ \ldots +f_N(S_{us}N-1-S_{us}N) \quad (2')$$

wherein $S_{proc}'$ is an intermediate processed image signal in which the high-frequency components are enhanced, $S_{org}$ is an original image signal, $S_{us}k$ (k=1 to N) are unsharp image signals, $f_k$(k=1 to N) is a transformation function, and $\beta(S_{org})$ is a coefficient of enhancement determined on the basis of the original image signal.

Figure 47:
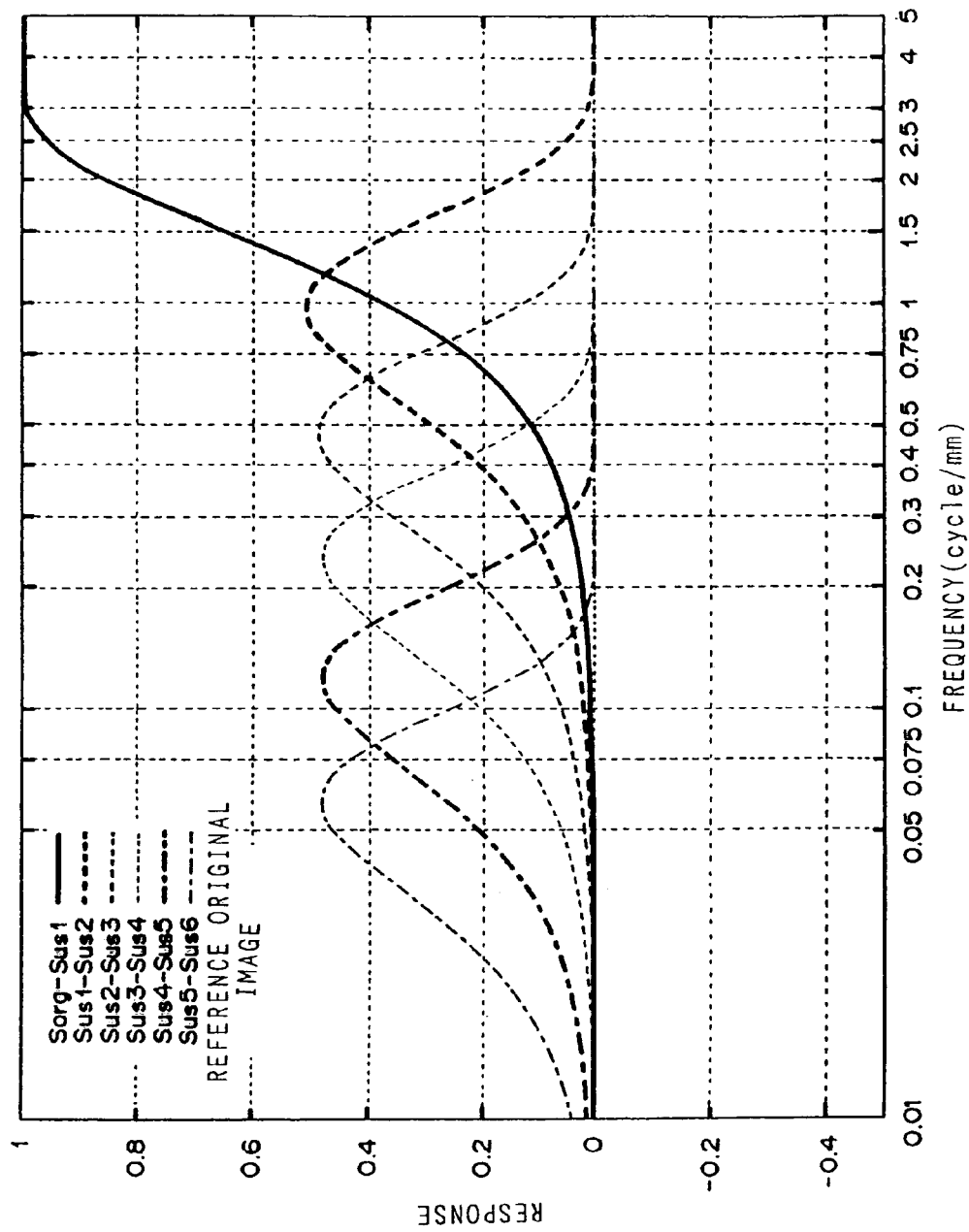
FIG. 47 shows the frequency response characteristics of band-limited signals obtained from the reference original image signal.
Figure 48:
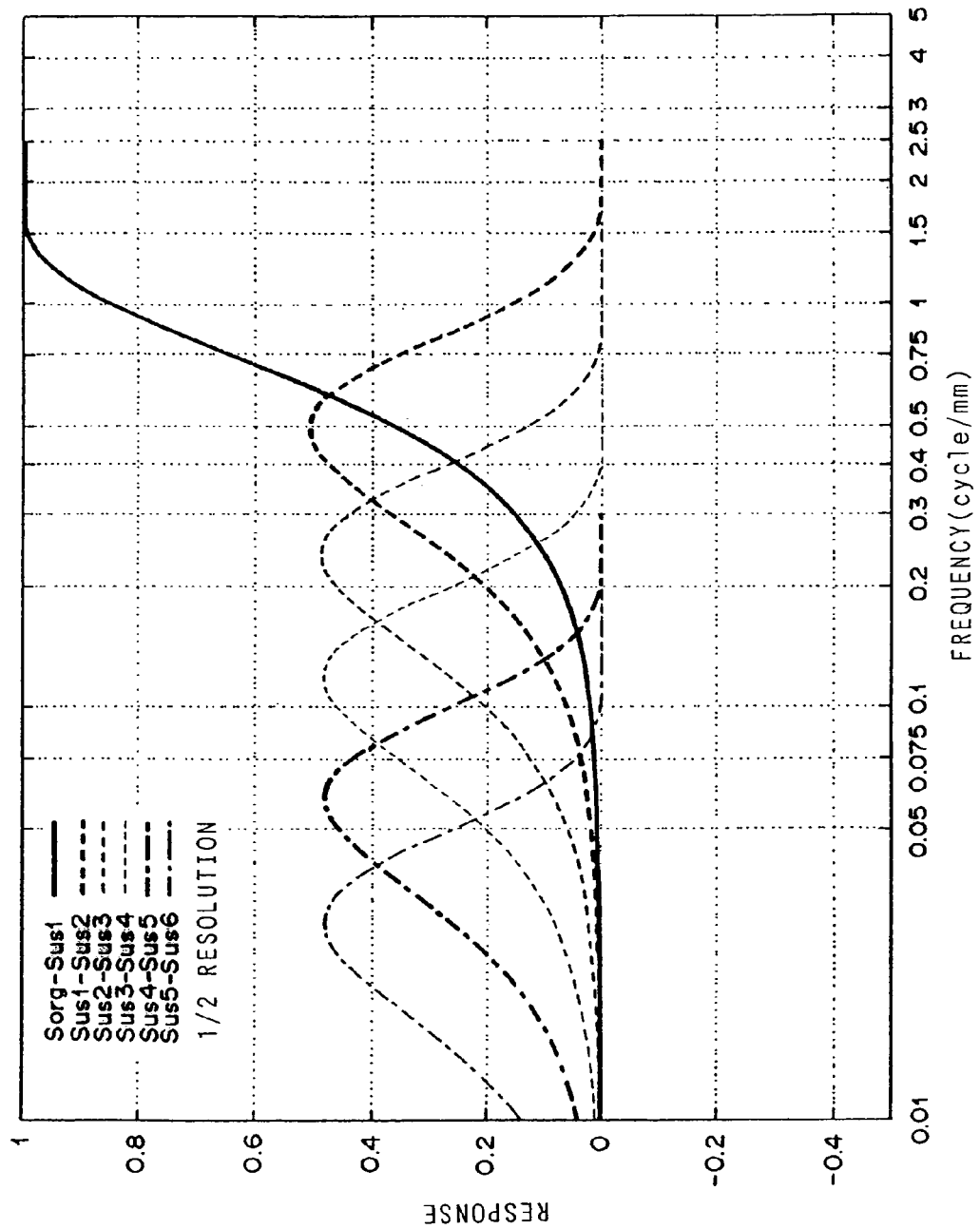
FIG. 48 shows the frequency response characteristics of band-limited signals obtained from low frequency original image signal having a resolution of ½ of that of the reference original image signal.
Figure 49:
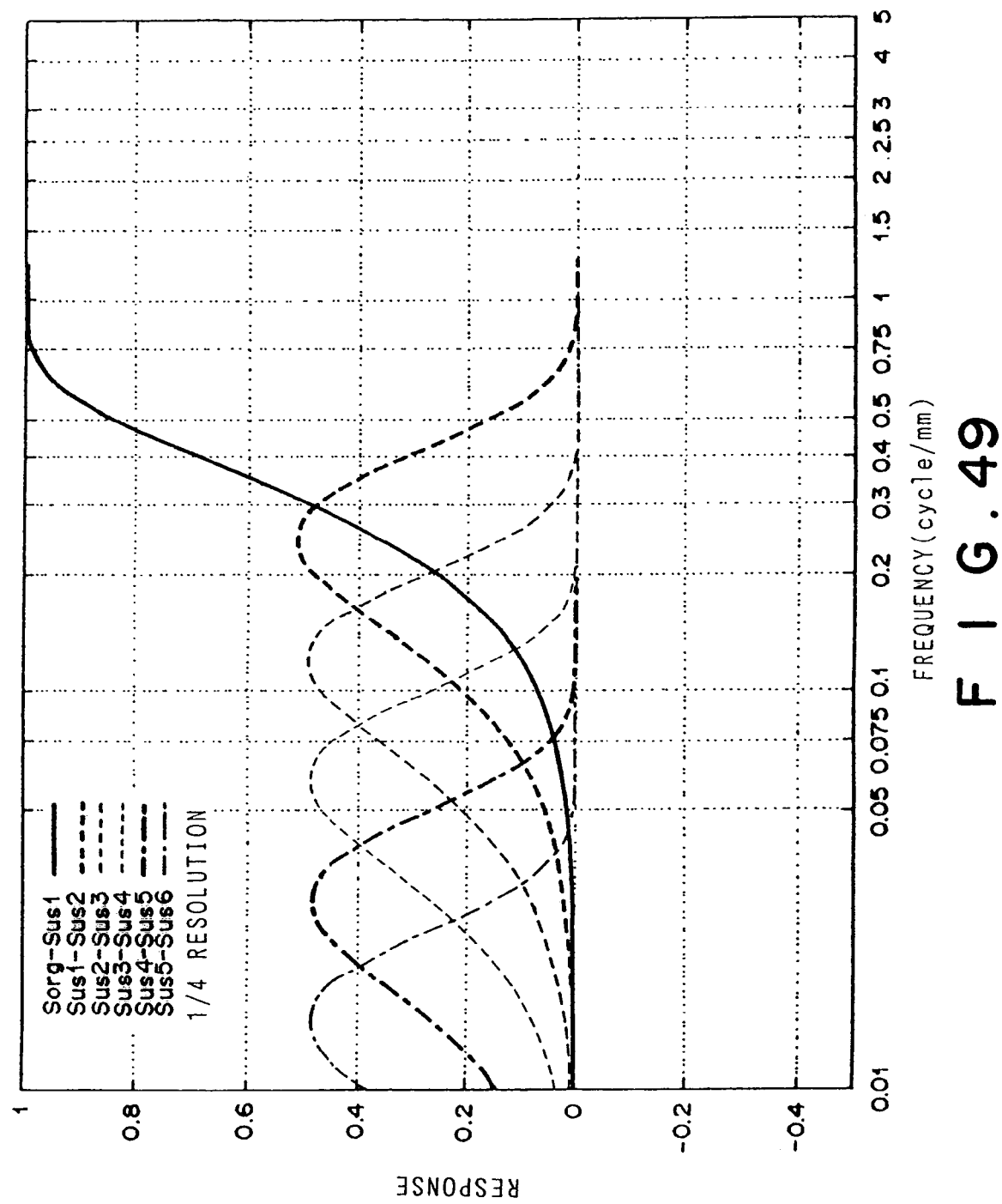
FIG. 49 shows the frequency response characteristics of band-limited signals obtained from low frequency original image signal having a resolution of ¼ of that of the reference original image signal.
Figure 50:
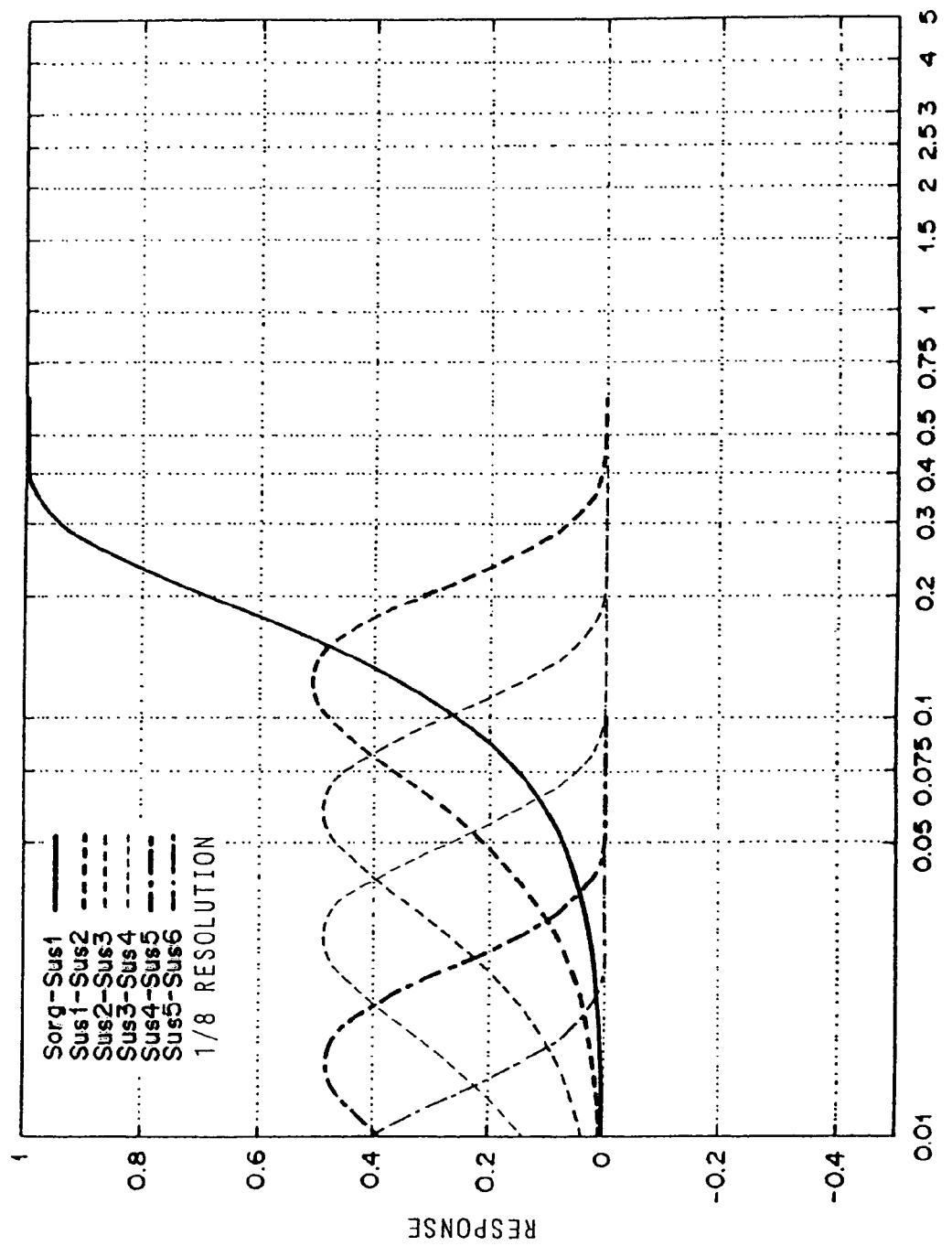
FIG. 50 shows the frequency response characteristics of band-limited signals obtained from low frequency original image signal having a resolution of ⅛ of that of the reference original image signal.
Figure 51:
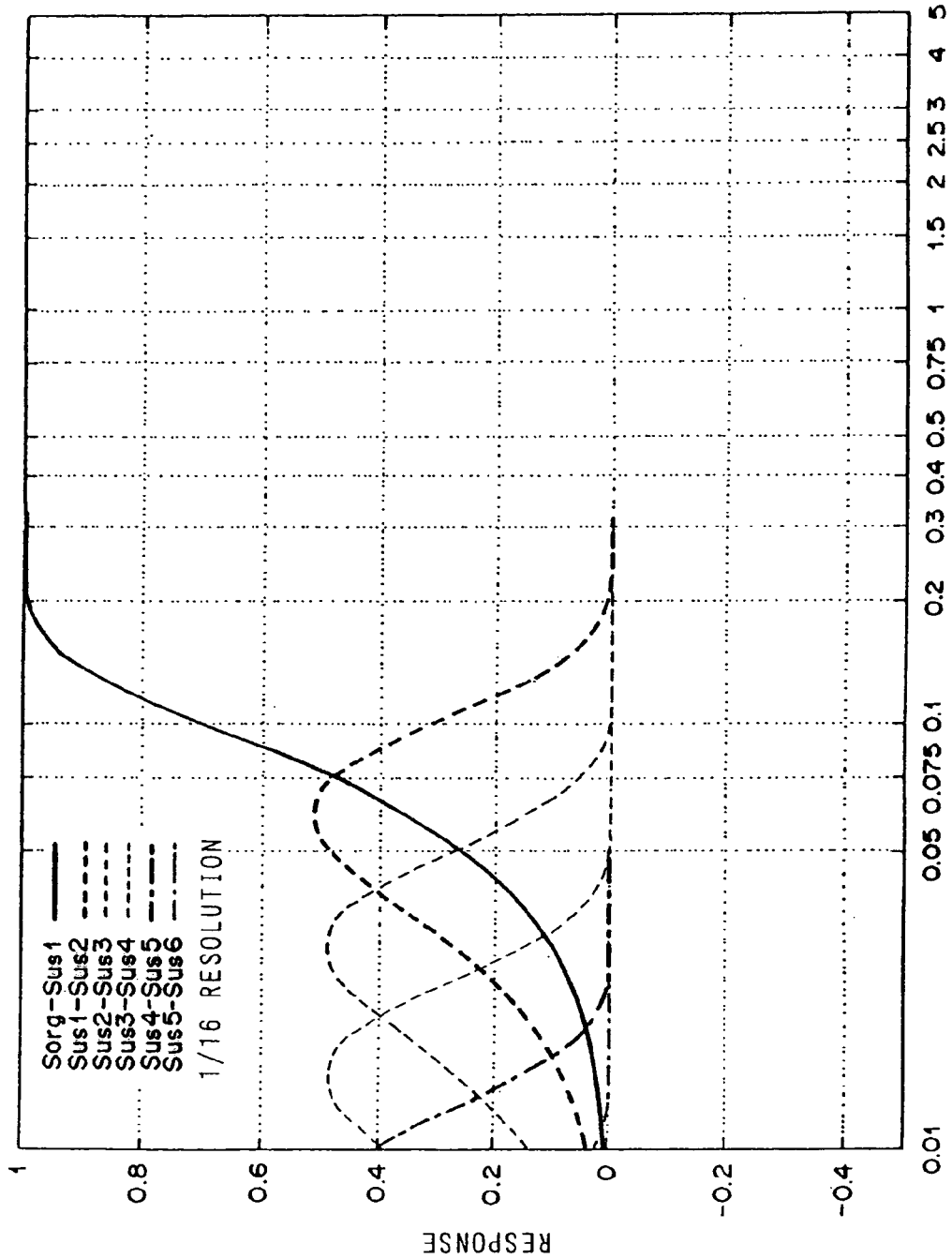
FIG. 51 shows the frequency response characteristics of band-limited signals obtained from low frequency original image signal having a resolution of 1/16 of that of the reference original image signal.

The intermediate processed image signal $S_{proc}'$ is thus made. The problem to be solved by this embodiment and the manner of solving the problem in this embodiment will be described through an example, hereinbelow. As described above, though an intermediate processed image signal $S_{proc}'$ representing an image equivalent to the original image signal in resolution (either may be the same image as the original image or an image different from the original image) can be obtained by carrying out frequency enhancement processing by use of transformation functions $f_k$ determined according to the frequency bands of the band-limited signals, an intermediate processed image signal $S_{proc}'$ representing an image lower than the original image signal in resolution (either may be the same image as the original image or an image different from the original image) must be obtained by carrying out frequency enhancement processing by use of transformation functions $f_k$ determined according to the resolution of the intermediate processed image signal $S_{proc}$ to be obtained. When such transformation functions are stored for the respective resolutions, the number of transformation functions to be stored becomes too large and management of the transformation functions becomes to troublesome. When the frequency enhancement processing is carried out on an original image signal $S_{org}$ with the original image signal $S_{org}$ divided into six frequency bands, the frequency characteristics of the band-limited signals have six peaks as shown in FIG. 47. The frequencies of the respective peaks are 5 cycles/mm, 1.0 cycle/mm, 0.5 cycles/mm, 0.25 cycles/mm, 0.12 cycles/mm and 0.06 cycles/mm. In an image signal representing an image whose resolution is ½ of that of the original image, the peak frequencies of the band-limited signals are 2.5 cycles/mm, 0.5 cycles/mm, 0.25 cycles/mm, 0.125 cycles/mm and 0.06 cycles/mm as shown in FIG. 48. Further as shown in FIGS. 49 to 51, in image signals representing image whose resolutions are respectively ¼, ⅛ and 1/16 of that of the original image, the peak frequencies of the band-limited signals are equal to each other except their respective highest frequency bands.

In this embodiment, when a processed image signal representing an image having a desired resolution lower than the resolution of the original image is to be obtained, one of the low resolution signals representing a low resolution image closest to the desired resolution is employed as a reference low resolution image signal, low resolution band-limited signals are obtained on the basis of the reference low resolution image signal, and the low resolution band-limited signals are transformed into transformed image signals on the basis of transformation functions corresponding to the frequency bands of the band-limited signals, whereby an intermediate processed image signal $S_{proc}'$ is obtained. Then the intermediate processed image signal $S_{proc}'$ is enlarged or contracted according to the scale information S and a processed image signal $S_{proc}$ representing an image having the desired resolution is obtained.

Figure 52:
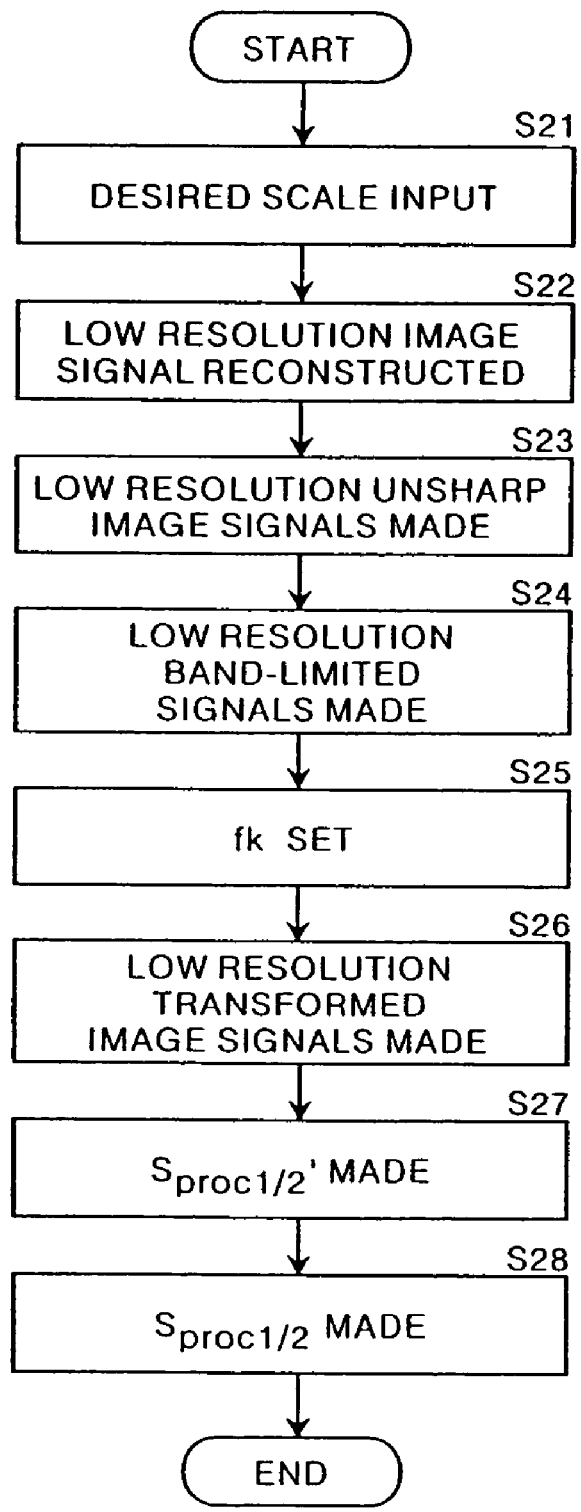
FIG. 52 is a flow chart showing operation of the image processing system in accordance a sixth embodiment of the present invention.

Operation of the image processing system 201 of this embodiment when a processed image signal $S_{proc}$ representing an image whose resolution is ½ of the original image signal is to be obtained will be described by way of example with reference to the flow chart shown in FIG. 52. It is assumed here that the band-limited signals obtained from the original image signal $S_{org}$ are in six frequency bands as shown in FIG. 47.

The user first inputs a desired scale through the scale input means 205. (step S21) Then the scale input means 205 inputs a scale information S into the unsharp image signal making means 202, the parameter setting means 204 and the enlarging/contracting means 206, and the unsharp image signal making means 202 reconstructs, on the basis of the scale information S, a low resolution image signal representing an image having a resolution closest to the desired scale in the low resolution image signals $B_k$ (step S22), and makes low resolution unsharp image signals $S_{us}k$ from the low resolution image signals (step S23). In this example, since the resolution of the image represented by the processed image signal $S_{proc}$ to be obtained (to be referred to as "the desired resolution", hereinbelow) is ½ of that of the image represented by the original image signal $S_{org}$, unsharp image signals $S_{us}1$ to $S_{us}5$ are made. The correspondence between the unsharp image signals obtained from the original image signal $S_{org}$ (including the original image signal $S_{org}$) and those obtained from a given low resolution image signal is as shown in FIG. 53. As can be seen from FIG. 53, in the case where the desired resolution is ½ of that of the original image, unsharp image signals $S_{us}k$ are made with the unsharp image signal $S_{us}1$ which is at the highest hierarchical level in the unsharp image signals obtained from the reference original image signal $S_{org}$ taken as an original image signal $S_{org1/2}$. Accordingly, in this case, the low resolution original image signal $S_{org1/2}$ corresponds to the unsharp image signal $S_{us}1$ obtained from the reference original image signal $S_{org}$, the unsharp image signals $S_{us}1_{1/2}$ corresponds to the unsharp image signals $S_{us}2$ obtained from the reference original image signal $S_{org}$, the unsharp image signals $S_{us}2_{1/2}$ corresponds to the unsharp image signals $S_{us}3$ obtained from the reference original image signal $S_{org}$, and so on. Then low resolution band-limited signals are made on the basis of the original image signal $S_{org1/2}$ and the low resolution unsharp image signals $S_{us}1_{1/2}$ to $S_{us}5_{1/2}$. (step S24) The correspondence between the band-limited signals obtained from the reference original image signal $S_{org}$ and those obtained from a given low resolution image signal is as shown in FIG. 54. Since even if the band-limited signals not higher than 0.06 cycles/mm are processed, the processed image signal $S_{proc}$ is not substantially improved in quality, the low frequency band-limited signals not higher than 0.06 cycles/mm are not processed.

Figures 55, 56:
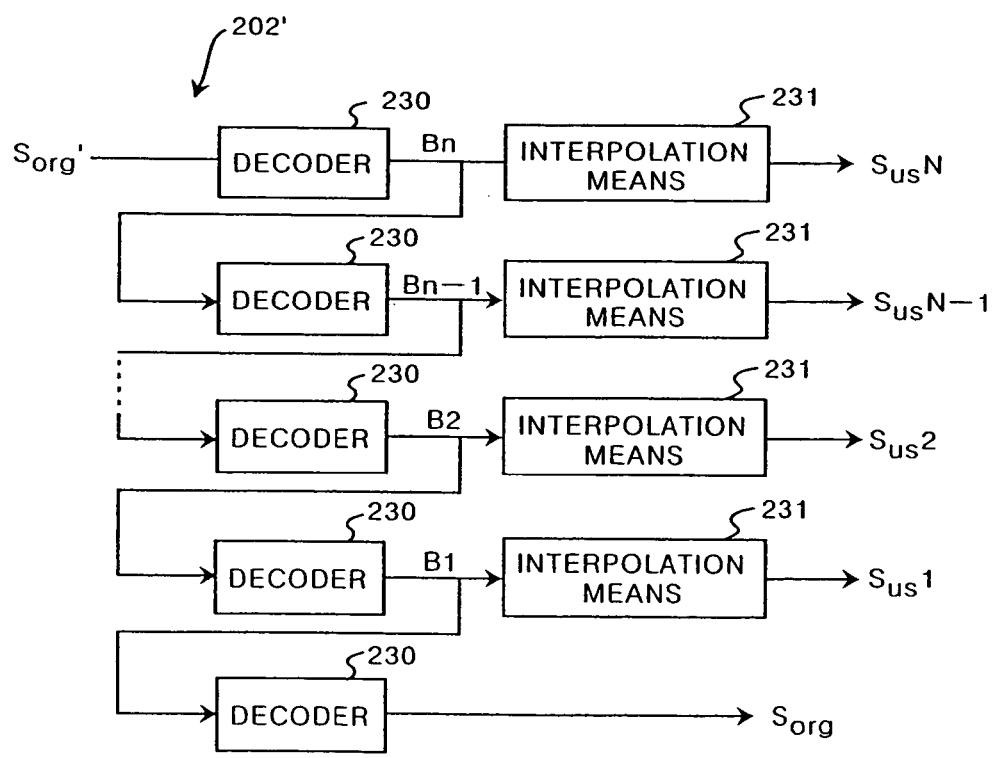
FIG. 55 is a view showing correspondence between the transformation functions for the band-limited signals obtained from the reference original image signal $S_{org}$ and those for the band-limited signals obtained from an object low resolution image signal.
FIG. 56 is a block diagram showing a unsharp image signal making means in the image processing system in accordance with a seventh embodiment of the present invention.

The parameter setting means 204 sets the transformation functions $f_k$ for transforming the low resolution band-limited signals. (step S25) Since the peak frequencies of the low resolution band-limited signals are equal to the band-limited signals obtained from the reference original image signal $S_{org}$ except their respective highest frequency bands as shown in FIGS. 47 and 48, transformation functions $f_2$ to $f_6$ are employed. The correspondence between the transformation functions for the band-limited signals obtained from the reference original image signal $S_{org}$ and those for the band-limited signals obtained from a given low resolution image signal is as shown in FIG. 55. When the desired resolution is $\frac{1}{2}^n$ of the resolution of the reference original image signal, the transformation functions on the line lower than the transformation functions for the reference original image signal $S_{org}$ by n lines in FIG. 55 are employed. The following formula (14) represents Fusm in the aforesaid formulae (2') in carrying out frequency enhancement processing on the reference original image signal $S_{org}$ and the following formula (15) represents Fusm in the aforesaid formulae (2') in carrying out frequency enhancement processing on the original image signal $S_{org1/2}$ at a resolution of $\frac{1}{2}$ of that of the reference original image signal $S_{org}$.

$$F_{usm}(S_{org}, S_{us}1, S_{us}2, \ldots S_{us}6) = f_1(S_{org} - S_{us}1) + f_2(S_{us}1 - S_{us}2) + \ldots + f_5(S_{us}4 - S_{us}5) + f_6(S_{us}5 - S_{us}6) \quad (14)$$

$$F_{usm}(S_{org1/2}, S_{us}1_{1/2}, S_{us}2_{1/2}, \ldots S_{us}5_{1/2}) = f_1(S_{org1/2} - S_{us}1_{1/2}) + f_2(S_{us}1_{1/2} - S_{us}2_{1/2}) + \ldots + f_4(S_{us}3 - S_{us}4) + f_5(S_{us}4 - S_{us}5) \quad (15)$$

Then low resolution transformed image signals are made from the low resolution band-limited signals (step S26), and a low resolution add signal is obtained. Then the low resolution add signal is multiplied by the coefficient of enhancement $\beta(S_{org1/2})$ and the product is added to the low resolution original image signal $S_{org1/2}$, whereby a low resolution intermediate processed image signal $S_{pro1/2}'$ is obtained. The coefficient of enhancement $\beta(S_{org1/2})$ is set according to the low resolution original image signal $S_{org1/2}$.

The low resolution intermediate processed image signal $S_{proc1/2}'$ thus obtained is input into the enlarging/contracting means 206, and the enlarging/contracting means 206 enlarges or contracts the low resolution intermediate processed image signal $S_{proc1/2}'$ on the basis of the scale information S input from the scale input means 205 so that a low resolution image can be reproduced at the desired scale, thereby obtaining a final low resolution processed image signal $S_{proc1/2}$. In this particular example, since the desired resolution is $\frac{1}{2}$, the enlarging/contracting means 206 need not enlarge or contract the low resolution intermediate processed image signal $S_{proc1/2}'$.

As can be understood from the description above, since, in this embodiment, the low resolution band-limited signals obtained from the low resolution original image signal are transformed on the basis of a part of the transformation functions for transforming the band-limited signals obtained from the reference original image signal which correspond to the low resolution band-limited signals in frequency bands, the image reproduced on the basis of the low resolution processed image signal $S_{proc1/2}$ substantially conforms in frequency response characteristic to the image reproduced on the basis of the processed image signal $S_{proc}$ obtained from the reference original image signal, whereby a processed image signal which can reproduce an image which is substantially constant in frequency response characteristic irrespective of resolution can be obtained.

Further since a part of the transformation functions which are employed for frequency enhancement processing of the reference original image signal are employed, transformation functions need not be prepared for each resolution, which simplifies the arrangement of the image processing system and saves trouble to manage a large number of transformation functions.

When an image signal at a desired resolution is obtained by contracting a processed image signal $S_{proc}$ obtained from the reference original image signal $S_{org}$, making unsharp image signals, making band-limited signals and transformation of the band-limited signals must be carried out using all the low resolution image signals. To the contrast, in this embodiment, since only the low resolution image signals up to that representing an image having a resolution closest to the desired resolution have to be reconstructed, operation time required for the processing can be shortened.

Further, though, in the sixth embodiment described above, the unsharp image signals are obtained from the original image signal (the reference original image signal or the low resolution original image signal) by filtering and interpolation/enlargement and the band-limited signals are obtained from the original image signal and the unsharp image signals, the band-limited signals may be made, for instance, by transforming the original image signal to multiple resolution image signals by a wavelet transformation or a Laplacian pyramid, making the unsharp image signals from the image signals at the respective resolutions and making the band-limited signals from the unsharp image signals.

Though, in the sixth embodiment described above, frequency enhancement processing is carried out on the encoded multiple resolution image signals $S_{org}'$, the frequency enhancement processing may be carried out on an original image signal $S_{org}$ which is not encoded.

An image processing system in accordance with a seventh embodiment of the present invention will be described, hereinbelow. In the sixth embodiment, low resolution image signals up to the resolution closest to a desired resolution are reconstructed from an encoded multiple resolution image signals $S_{org}'$ and unsharp image signals are made on the basis of there constructed low resolution image signals. To the contrast, in the seventh embodiment, unsharp image signals are made on the basis of low resolution image signals from the lowest resolution to a resolution closest to the resolution corresponding to a desired scale. The seventh embodiment differs from the sixth embodiment only in the processing executed by the unsharp image signal making means, and accordingly the processing executed by the unsharp image signal making means in this embodiment will be mainly described, hereinbelow.

FIG. 56 shows a unsharp image signal making means 202' in the image processing system of the seventh embodiment. As shown in FIG. 56, the unsharp image signal making means 202' comprises a plurality of encoders 230 and a plurality of interpolation means 231. That is, a low resolution image signal $B_n$ representing an image at a resolution of $\frac{1}{2}^n$ of that of the original image represented by the reference original image signal $S_{org}$ is first made by decoding an image signal representing an image which the lowest in resolution in the images represented by the multiple resolution image signals $S_{org}'$ and carrying out an inverse wavelet transformation on the decoded image signal. Then a low resolution image signal $B_{n-1}$ representing an image at a resolution of $\frac{1}{2}^{n-1}$ of that of the original image is made on the basis of the low resolution image signal $B_n$. In this manner, low resolution image signals $B_k$ whose resolution are $\frac{1}{2}^k$ (k=1 to n) of that of the original image signal $S_{org}$ are made as well as the original image signal $S_{org}$. The low resolution signals $B_k$ correspond to data LLk obtained by carrying out a wavelet transformation on the original image signal $S_{org}$. Then the interpolation means 231 carries out an interpolation/enlargement processing on each of the low resolution image signal $B_k$ and a plurality of unsharp image signals $S_{us}k$ (k=1 to N) which are different in sharpness are made.

Then band-limited signals are obtained from the unsharp image signals $S_{us}k$ and an intermediate processed image signal $S_{proc}'$ is obtained according to the aforesaid formulae (2').

Operation of the image processing system of this embodiment when a processed image signal $S_{proc}$ representing an image whose resolution is ½ of the original image signal is to be obtained will be described by way of example. It is assumed here that the band-limited signals obtained from the original image signal $S_{org}$ are in six frequency bands.

The user first inputs a desired scale through the scale input means 205. Then the scale input means 205 inputs a scale information S into the unsharp image signal making means 202', the parameter setting means 204 and the enlarging/contracting means 206, and the unsharp image signal making means 202' reconstructs, on the basis of the scale information S, low resolution image signals $B_k$ from the lowest resolution to a resolution closest to the resolution corresponding to the desired scale and makes low resolution unsharp image signals $S_{us}k$. In this example, since the resolution of the image represented by the processed image signal $S_{proc}$ to be obtained (to be referred to as "the desired resolution", hereinbelow) is ½ of that of the image represented by the original image signal $S_{org}$, unsharp image signals $S_{us}1$ to $S_{us}5$ are made. The correspondence between the unsharp image signals obtained from the original image signal $S_{org}$ (including the original image signal $S_{org}$) and those obtained from the low resolution image signals $B_k$ from the lowest resolution to a resolution closest to the resolution corresponding to the desired scale is as shown in FIG. 53. The correspondence between the band-limited signals obtained from the reference original image signal $S_{org}$ and those obtained from the low resolution image signals $B_k$ from the lowest resolution to a resolution closest to the resolution corresponding to the desired scale is as shown in FIG. 54.

The parameter setting means 204 sets the transformation functions $f_k$ for transforming the low resolution band-limited signals in the same manner as in the sixth embodiment. When the desired resolution is ½$^n$ of the resolution of the reference original image signal, the transformation functions on the line lower than the transformation functions for the reference original image signal $S_{org}$ by n lines in FIG. 55 are employed.

Then low resolution transformed image signals are made from the low resolution band-limited signals, and a low resolution add signal is obtained. Then the low resolution add signal is multiplied by the coefficient of enhancement $\beta(S_{org1/2})$ and the product is added to the low resolution original image signal $S_{org1/2}$, whereby a low resolution intermediate processed image signal $S_{proc1/2}'$ is obtained.

The low resolution intermediate processed image signal $S_{proc1/2}'$ thus obtained is input into the enlarging/contracting means 206, and the enlarging/contracting means 206 enlarges or contracts the low resolution intermediate processed image signal $S_{proc1/2}'$ on the basis of the scale information S input from the scale input means 205 so that a low resolution image can be reproduced at the desired scale, thereby obtaining a final low resolution processed image signal $S_{proc1/2}$. In this particular example, since the desired resolution is ½, the enlarging/contracting means 206 need not enlarge up or contract the low resolution intermediate processed image signal $S_{proc1/2}'$.

As can be understood from the description above, since, also in this embodiment, the low resolution band-limited signals obtained from the low resolution original image signal are transformed on the basis of a part of the transformation functions for transforming the band-limited signals obtained from the reference original image signal which correspond to the low resolution band-limited signals in frequency bands, the image reproduced on the basis of the low resolution processed image signal $S_{proc1/2}$ substantially conforms in frequency response characteristic to the image reproduced on the basis of the processed image signal $S_{proc}$ obtained from the reference original image signal, whereby a processed image signal which can reproduce an image which is substantially constant in frequency response characteristic irrespective of resolution can be obtained.

Though, the above description has been made by way of example on the case where the desired resolution is ½ of that of the reference original image signal, in the case where the desired resolution is, for instance, ⅓ of that of the reference original image signal, the unsharp image signal making means 202 and the frequency enhancement processing means 203 carry out the frequency enhancement processing on the low resolution image signal $B_2$ representing an image whose resolution (¼ of the original image signal) is closest to ⅓, thereby making an intermediate processed image signal $S_{proc1/4}'$. Then a final processed image signal $S_{proc1/4}$ is obtained by enlarging the intermediate processed image signal $S_{proc1/4}'$ 4/3 times by the enlarging/contracting means 206. When the desired resolution is ½$^n$ of that of the original image, the enlarging/contracting means 206 may be eliminated, whereby the system can be simplified.

Though, in the sixth and seventh embodiments, the transformed image signals are made by transforming the band-limited signals on the basis of the transformation functions $f_k$ according to the aforesaid formulae (2'), the transformed image signals may be obtained by enhancing the band-limited signals by use of coefficients of enhancement $\alpha_k$ (k stands for 1 to N) in place of the transformation functions $f_k$ as represented by the following formulae (16).

$$S_{proc}' = S_{org} + \beta(S_{org}) \times F_{usm}(S_{org}, S_{us}1, S_{us}2, \ldots S_{us}N)$$

$$F_{usm}(S_{org}, S_{us}1, S_{us}2, \ldots S_{us}N) = \alpha_1(S_{org}-S_{us}1) + \alpha_2(S_{us}1-S_{us}2) + \ldots + \alpha_k(S_{us}k-1-S_{us}k) + \ldots + \alpha_N(S_{us}N-1-S_{us}N) \quad (16)$$

When an original image signal to be processed is higher than the reference original image signal $S_{org}$ in resolution, the number of the band-limited signals and the number of the transformation functions for transforming the band-limited signals are larger than those for the reference original image signal $S_{org}$. FIG. 57 shows the correspondence between the band-limited signals obtained from the reference original image signal $S_{org}$ and those obtained from original image signals which are twice and four times the reference original image signal $S_{org}$ in resolution. When the object original image signal to be processed has a resolution twice that of the reference original image signal $S_{org}$ (this object original image signal is denoted by $S_{org2}$ in FIG. 57, and the unsharp image signals obtained from the object original image signal $S_{org2}$ are denoted by $S_{us2}k$ (k stands for an integer larger than 0)), there is no band-limited signal, in the band-limited signals obtained from the reference original image signal $S_{org}$, corresponding to band-limited signal $S_{org2}-S_{us2}1$ in the highest frequency band in the band-limited signals obtained from the object original image signal $S_{org2}$, and accordingly there is no transformation function for transforming the band-limited signal $S_{org2}-S_{us2}1$ in the reference transformation functions for transforming the band-limited signals obtained from the reference original image signal $S_{org}$. Similarly when the object original image signal to be processed has a resolution four times that of the reference original image signal $S_{org}$ (this object original image signal is denoted by $S_{org4}$ in FIG. 57, and the unsharp image signals obtained from the object original image signal $S_{org4}$ are denoted by $S_{us4}k$ (k stands for an integer larger than 0)), there is no band-limited signal, in the band-limited signals obtained from the reference original image signal $S_{org}$, corresponding to band-limited signals $S_{org4}-S_{us4}1$ and $S_{us4}1-S_{us4}2$ in the highest and second highest frequency bands in the band-limited signals obtained from the object original image signal $S_{org4}$, and accordingly there is no transformation function for transforming the band-limited signals $S_{org4}-S_{us4}1$ and $S_{us4}1-S_{us4}2$ in the reference transformation functions for transforming the band-limited signals obtained from the reference original image signal $S_{org}$. In such cases, the transformation function f1 for the band-limited signal $S_{org}-S_{us}1$ in the highest frequency band in the band-limited signals obtained from the reference original image signal $S_{org}$ is used as the transformation functions for transforming the band-limited signal(s) in the highest and second highest frequency bands obtained from the object original image signal as shown in FIG. 58.

When there are prepared a plurality of reference original image signals $S_{org}$, it is preferred that one of the reference original image signal $S_{org}$ closest to the object original image signal in resolution be taken as the reference original image signal $S_{org}$ in the manner described above in conjunction with the first and second embodiments. It is preferred that the transformation functions which are determined for the band-limited signals obtained from the object original image signal be related to the object original image signal and stored together with the resolution of the reference original image signal. With this arrangement, the image represented by the object original image signal can be constantly reproduced with the same characteristic.

An image processing system in accordance with a seventh embodiment of the present invention will be described, hereinbelow. The image processing system is for carrying out a frequency enhancement processing by use of unsharp image signals on an original image signal obtained by reading out a radiation image of a human body recorded on a stimulable phosphor sheet so that an image suitable for diagnosis can be obtained. An image reproduced on the basis of the processed image signal is mainly recorded on photographic film and used in diagnosis.

Figure 59:
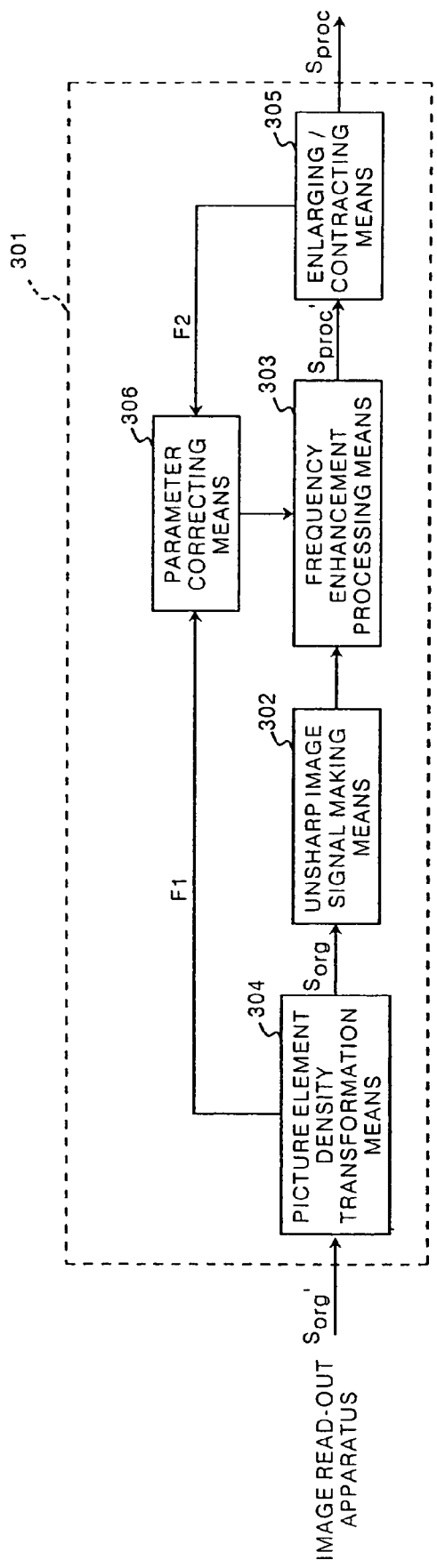
FIG. 59 is a schematic block diagram showing the arrangement of an image processing system in accordance with a seventh embodiment of the present invention.

In FIG. 59, an image processing system 301 in accordance with the seventh embodiment of the present invention comprises a picture element density transformation means 304, an unsharp image signal making means 302, a frequency enhancement processing means 303, an enlarging/contracting means 305 and a parameter correcting means 306. When frequency enhancement processing is to be carried out on an original image signal $S_{org}$ itself, the picture element density transformation means 304 passes the original image signal $S_{org}$ as it is to the unsharp image signal making means 302 which makes a plurality of unsharp image signals from the original image signal $S_{org}$. The unsharp image signal making means 302 inputs the unsharp image signals into the frequency enhancement processing means 303. The frequency enhancement processing means 303 carries out the frequency enhancement processing for enhancing a particular frequency to obtain an intermediate processed image signal $S_{proc}'$ and inputs the intermediate processed image signal $S_{proc}'$ into the enlarging/contracting means 305. In this case, the enlarging/contracting means 305 outputs the intermediate processed image signal $S_{proc}'$ as it is as a final processed image signal $S_{proc}$. To the contrast, when the frequency enhancement processing is to be carried out on an original image signal $S_{org}$ which is obtained by picture element density transformation of a base original image signal $S_{org}'$ which is read out by an image read-out apparatus or the like and has a reference predetermined picture element density (10 lines/mm in this particular embodiment), the picture element density transformation means 304 transforms the picture element density of the base original image signal $S_{org}'$ to a desired picture element density, e.g., 6.7 lines/mm or 5 lines/mm, thereby obtaining an original image signal $S_{org}$ at the desired picture element density. Then the picture element density transformation means 304 inputs the picture element density-transformed original image signal $S_{org}$ into the unsharp image signal making means 302. The unsharp image signal making means 302 makes a plurality of unsharp image signals from the original image signal $S_{org}$ and inputs the unsharp image signals into the frequency enhancement processing means 303. The frequency enhancement processing means 303 carries out the frequency enhancement processing for enhancing a particular frequency to obtain an intermediate processed image signal $S_{proc}'$ and inputs the intermediate processed image signal $S_{proc}'$ into the enlarging/contracting means 305. In this case, the enlarging/contracting means 305 enlarges the intermediate processed image signal $S_{proc}'$ by interpolation at a desired magnification and outputs the enlarged intermediate processed image signal $S_{proc}'$ as a final processed image signal $S_{proc}$. In this specification, the term "magnification" should be broadly interpreted to include a magnification smaller than 1. The desired picture element density may be input through a keyboard or the like as a value or may be selected from a plurality of picture element densities displayed on a control screen. Similarly the desired magnification may be input through a keyboard or the like as a value or may be selected from a plurality of magnifications displayed on a control screen.

The picture element density transformation processing will be described, hereinbelow. In the aforesaid radiation image read-out system using a stimulable phosphor sheet, the read density or the picture element density differs depending on the size of the stimulable phosphor sheet and may be freely changed as required by the user. In this embodiment, a base original image signal $S_{org}'$ read at 10 lines/mm is transformed to an original image signal $S_{org}$ at 6.7 lines/mm or 5 lines/mm by carrying out a filtering processing on the base original image signal $S_{org}'$ by the picture element density transformation means 304. In this specification, the original image signal $S_{org}$ obtained by carrying out the picture element density transformation on the base original image signal $S_{org}'$ will be referred to as "the picture element density-transformed original image signal $S_{org}$", hereinbelow, in order to clearly distinguish the former from the latter.

The unsharp image signal making means 302 makes unsharp image signals $S_{us}k$ in the same manner as described above and the frequency enhancement processing means 303 carries out the frequency enhancement processing by use of the unsharp image signals $S_{us}k$ in the same manner as described, whereby the intermediate processed image signal $S_{proc}'$ is obtained.

The enlarging/contracting means 305 enlarges the intermediate processed image signal $S_{proc}'$ by interpolation using an interpolation filter at a desired magnification, thereby obtaining a final processed image signal $S_{proc}$.

Desired frequency components of the original image signal $S_{org}$ can be enhanced by thus carrying out on the original image signal $S_{org}$ a frequency enhancement processing by use of transformation functions $f_k$ which are set for the respective frequency bands of the band-limited signals. However, when the frequency enhancement processing is carried out on the picture element density-transformed original image signal $S_{org}$ by use of the same transformation functions $f_k$ as those used for carrying out the frequency enhancement processing on the base original image signal $S_{org}'$, the image reproduced on the basis of the processed image signal $S_{proc}$ obtained from the picture element density-transformed original image signal $S_{org}$ becomes different in frequency response characteristic from that reproduced on the basis of the processed image signal $S_{proc}$ obtained from the base original image signal $S_{org}'$ and the former image becomes less sharp than the latter image though the images are the same in size. This is due to the picture element density transformation which is carried out when the picture element density-transformed original image signal $S_{org}$ is obtained and the interpolation processing carried out to enlarge the intermediate processed image signal $S_{proc}'$.

Accordingly, in this embodiment, the transformation functions $f_k$ for transforming the band-limited signals obtained from the picture element density-transformed original image signal $S_{org}$ are obtained by correcting the parameters of the transformation functions $f_k$ for transforming the band-limited signals obtained from the base original image signal $S_{org}'$ according to the filtering characteristic F1 of the picture element density transformation filter which is employed to carry out the picture element density transformation processing by the picture element density transformation means 304 and the filtering characteristic F2 of an interpolation filter which is employed to carry out the interpolation by the enlarging/contracting means 305 so that the frequency response characteristic of the image reproduced on the basis of the processed image signal $S_{proc}$ obtained from the picture element density-transformed original image signal $S_{org}$ becomes equal to that reproduced on the basis of the processed image signal $S_{proc}$ obtained from the base original image signal $S_{org}'$.

Figure 60:
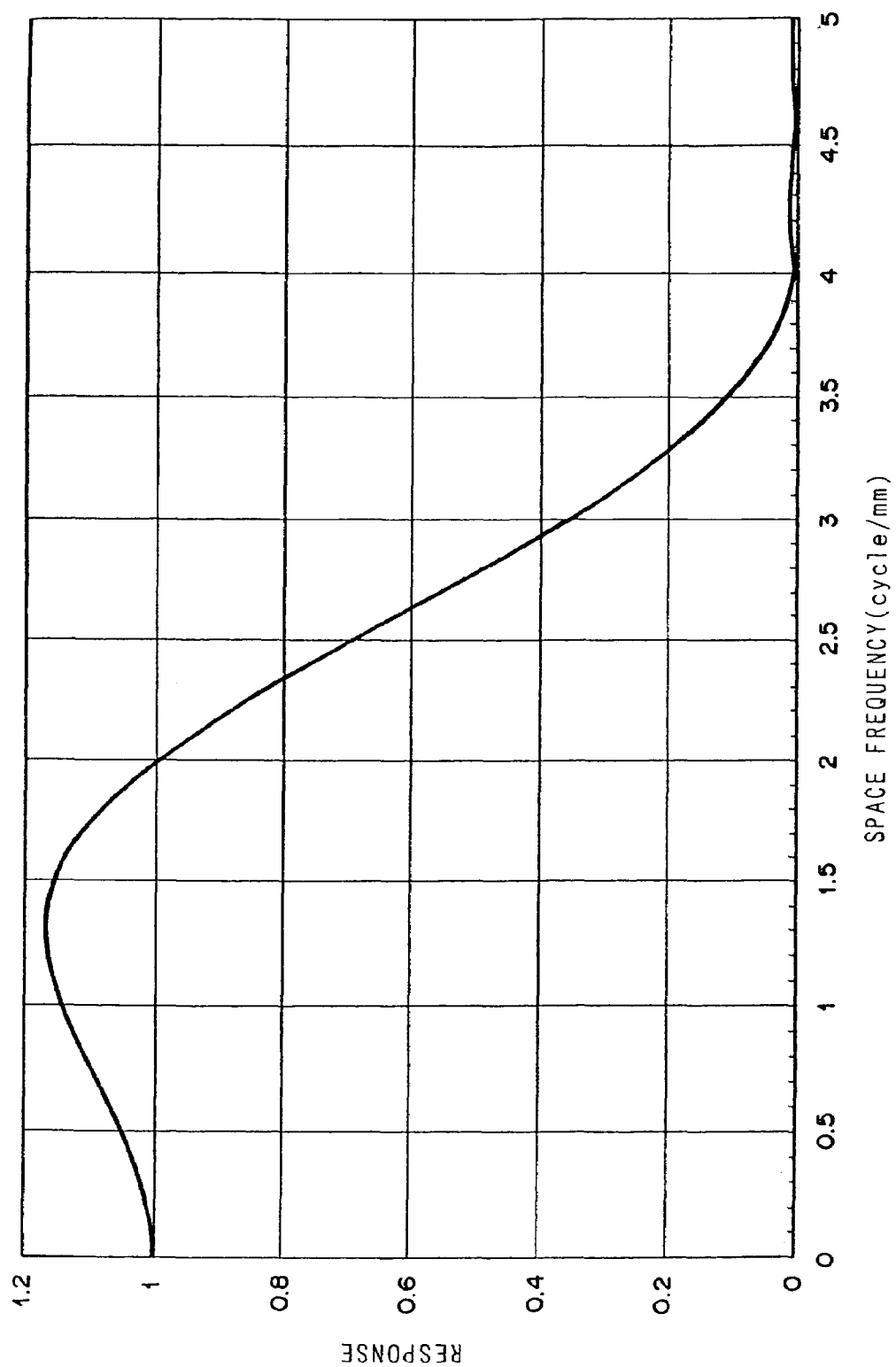
FIG. 60 is a view showing the frequency response characteristic of the picture element density transformation filter.
Figure 62:
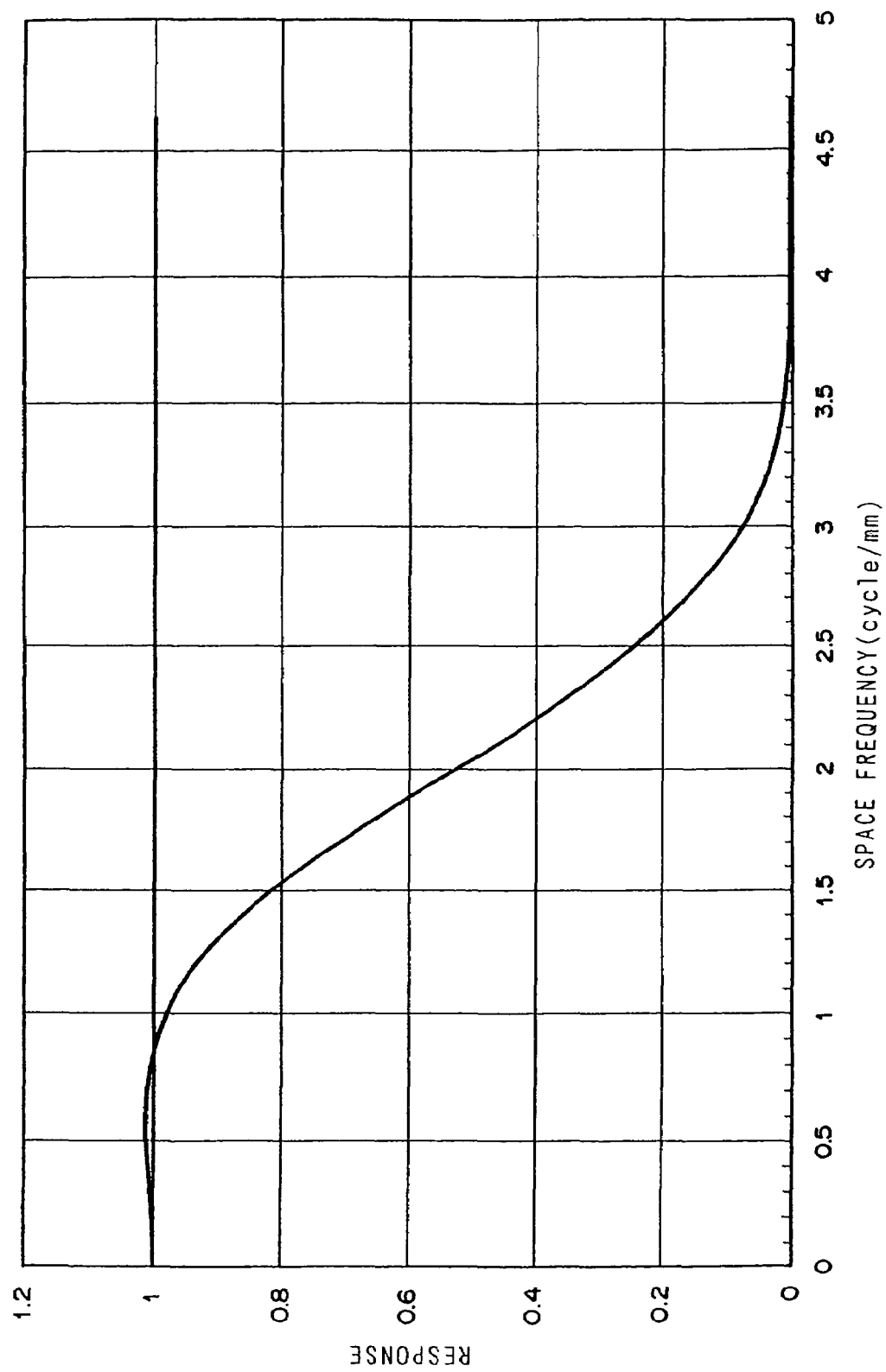
FIG. 62 is a view showing the frequency response characteristic of the processed image signal $S_{proc}$ obtained by carrying out the frequency enhancement processing by use of the transformation functions $f_k$ set for the frequency enhancement processing of the base original image signal $S_{org}'$ on the 5-line transformed original image signal $S_{org}5$ and by doubling the obtained intermediate processed image signal $S_{proc}'$ by use of the interpolation filter whose filtering characteristic is F2.

Correction of the parameters of the transformation functions by the parameter correcting means 306 will be described, hereinbelow. In the description below, FIG. 60 shows the filtering characteristic F1 of the picture element density transformation filter which is employed by the picture element density transformation means 304 to transform the base original image signal $S_{org}'$ having a picture element density of 10 lines/mm to an picture element density-transformed original image signal $S_{org}$ having a picture element density of 5 lines/mm, and FIG. 61 shows the filtering characteristic F2 of the interpolation filter which is employed by the enlarging/contracting means 305 to double the picture element density-transformed original image signal $S_{org}$. The picture element density-transformed original image signal $S_{org}$ obtained by transforming, by use of the picture element density transformation filter whose filtering characteristic is F1, the base original image signal $S_{org}'$ having a picture element density of 10 lines/mm to an picture element density-transformed original image signal $S_{org}$ having a picture element density of 5 lines/mm will be referred to as "the 5-line transformed original image signal $S_{org}5$" hereinbelow. FIG. 62 shows the frequency response characteristic of the processed image signal $S_{proc}$ obtained by carrying out the frequency enhancement processing by use of the transformation functions $f_k$ set for the frequency enhancement processing of the base original image signal $S_{org}'$ (these transformation functions will be referred to as "the base transformation functions $f_{kb}$" hereinbelow) on the 5-line transformed original image signal $S_{org}5$ and by doubling the obtained intermediate processed image signal $S_{proc}'$ by use of the interpolation filter whose filtering characteristic is F2. The processed image signal $S_{proc}$ thus obtained from the 5-line transformed original image signal $S_{org}5$ will be referred to as "the 5-line processed image signal $S_{proc}5$" hereinbelow. Further the processed image signal $S_{proc}$ obtained by frequency-enhancing the base original image signal $S_{org}'$ by use of the base transformation functions $f_{kb}$ will be referred to as the "the base processed image signal $S_{proc}B$", hereinbelow. In FIG. 62, the frequency response characteristic of the 5-line processed image signal $S_{proc}5$ is shown with the frequency response characteristic of the base processed image signal $S_{proc}B$ taken as 1. As can be seen from FIG. 62, the frequency response characteristic of the 5-line processed image signal $S_{proc}5$ can be easily calculated on the basis of the filtering characteristic F1 of the picture element density-transformation filter and the filtering characteristic F2 of the interpolation filter. Further, the difference in frequency response characteristic between the base processed image signal $S_{proc}B$ and the 5-line processed image signal $S_{proc}5$ can be easily obtained from FIG. 62.

Figure 63:
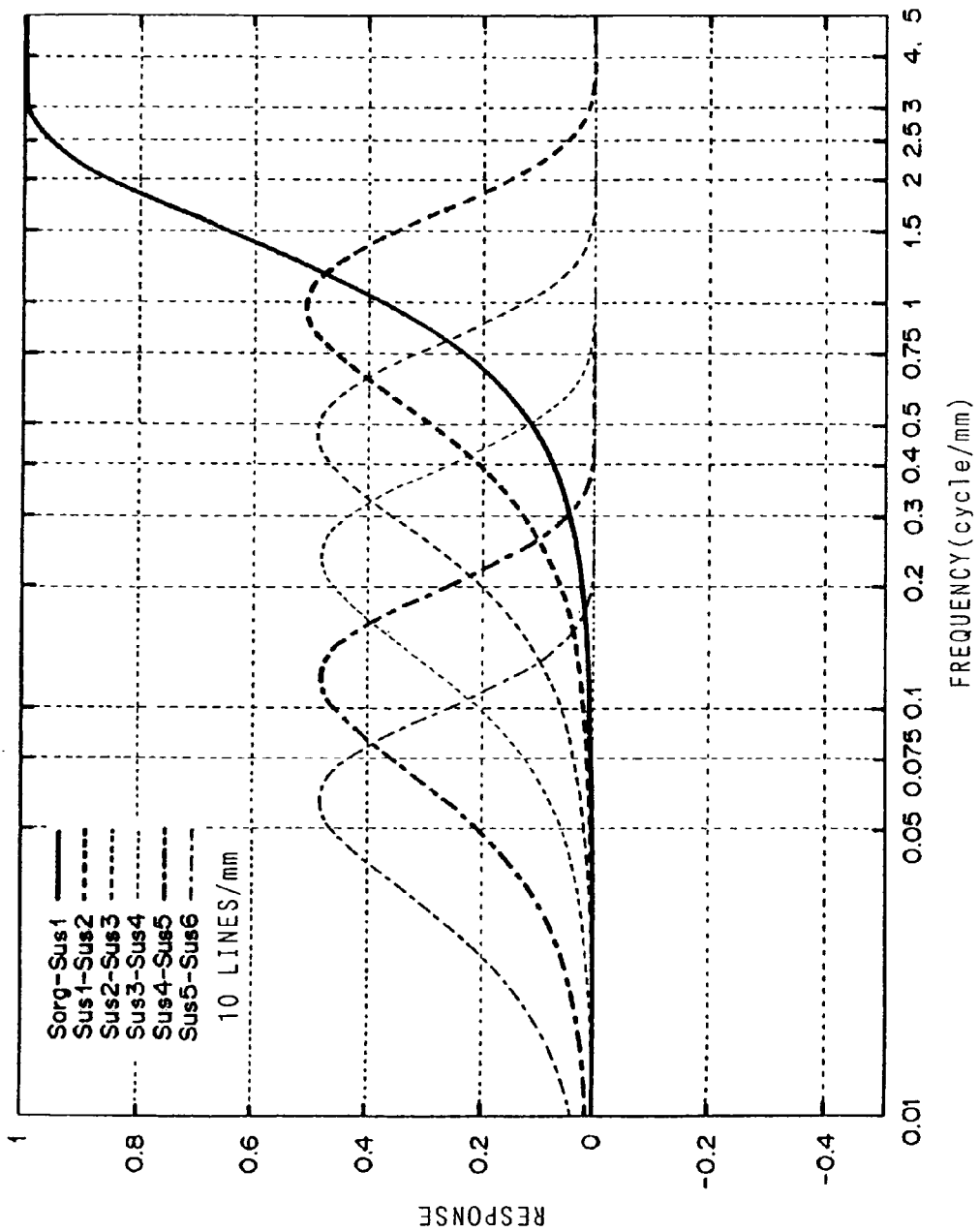
FIG. 63 is a view showing the frequency response characteristics of the band-limited signals obtained from the base original image signal $S_{org}'$.

For example, in order to equalize aspect of the image reproduced on the basis of the 5-line processed image signal $S_{proc}5$ to that of the image reproduced on the basis of the base processed image signal $S_{proc}B$ at 2 cycles/mm, it is necessary to double the frequency response at 2 cycles/mm of the 5-line processed image signal $S_{proc}5$. Accordingly, in this embodiment, the transformation function for the band-limited signal in the frequency band corresponding to 2 cycles/mm is set by correcting the parameters for the base transformation function $f_{kb}$ for the band-limited signal in the frequency band corresponding to 2 cycles/mm so that the degree of enhancement is doubled. As shown in FIG. 63, the band-limited signal in the frequency band corresponding to 2 cycles/mm is in the highest frequency band, and accordingly the parameter of the transformation function $f_1$ for the band-limited signal in the highest frequency band is corrected so that the degree of enhancement is doubled. More specifically, when the transformation function is a function having an inclination, the inclination is doubled, and when the transformation function is a constant, the value of the constant is doubled. The frequency component at which aspect of the image reproduced on the basis of the 5-line processed image signal $S_{proc}5$ is to be equalized to that of the image reproduced on the basis of the base processed image signal $S_{proc}B$ may be any frequency and may be two or more frequencies. Further the frequency component may be input by the user through an input means not shown.

Figure 64:
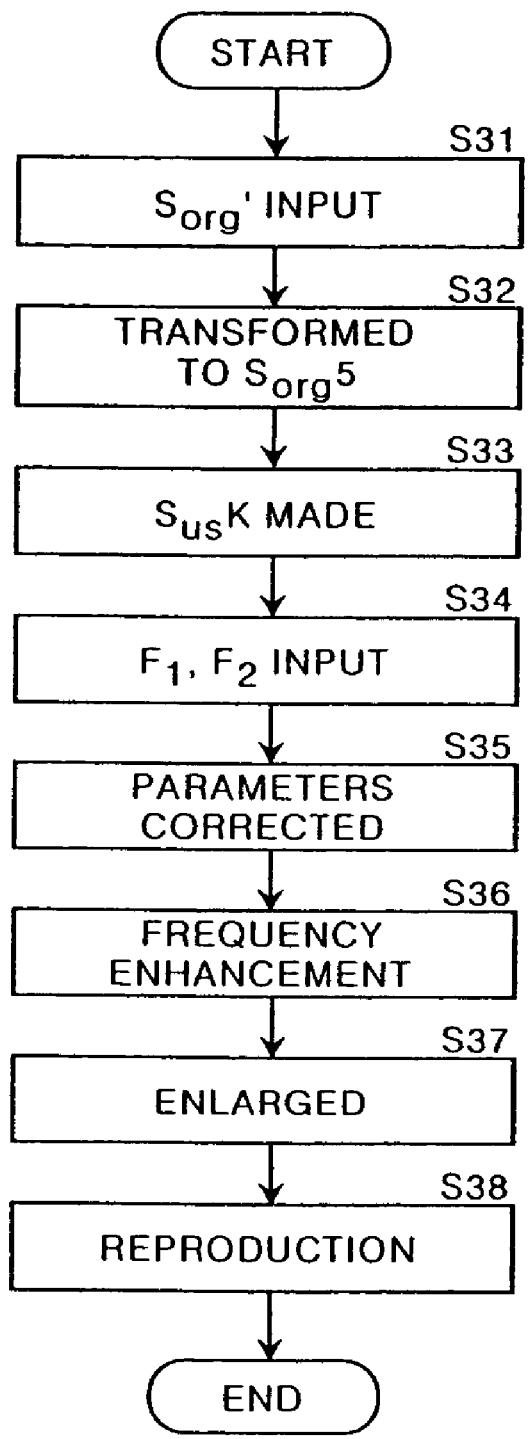
FIG. 64 is a flow chart showing operation of the image processing system in accordance the seventh embodiment of the present invention.

Operation of the image processing of this embodiment will be described with reference to the flow chart shown in FIG. 64, hereinbelow. It is assumed that a 5-line processed image signal $S_{proc}5$ is obtained by transforming a base original image signal $S_{org}'$ having a picture element density of 10 lines/mm to a 5-line transformed original image signal $S_{org}5$ having a picture element density of 5 lines/mm, carrying out the frequency enhancement processing on the 5-line transformed original image signal $S_{org}5$, thereby obtaining an intermediate processed image signal $S_{proc}'$, and doubling the intermediate processed image signal $S_{proc}'$. The base original image signal $S_{org}'$ is first input into the image processing system 301. (step S31) Then the picture element density transformation means 304 transforms the base original image signal $S_{org}'$ to the 5-line transformed original image signal $S_{org}5$. (step S32) The 5-line transformed original image signal $S_{org}5$ is input into the unsharp image signal making means 302 and the unsharp image signal making means 302 makes unsharp image signals $S_{us}k$ from the 5-line transformed original image signal $S_{org}5$. (step S33) The filtering characteristics F1 and F2 are input into the parameter correcting means 306. Further information on the frequency component at which aspect of the image reproduced on the basis of the 5-line processed image signal $S_{proc}5$ is to be equalized to that of the image reproduced on the basis of the base processed image signal $S_{proc}B$ is input into the parameter correcting means 306 (the frequency component will be referred to as "the target frequency component", hereinbelow). (step S34) The parameter correcting means 306 corrects the parameters of the base transformation functions $f_{kb}$ on the basis of the filtering characteristics F1 and F2 and the information on the target frequency component. (step S35) Steps S4 and S5 may be executed before steps S2 and S3 or in parallel thereto.

Then the frequency enhancement processing means 303 makes band-limited signals on the basis of the unsharp image signals $S_{us}k$ and carries out the frequency enhancement processing on the unsharp image signals $S_{us}k$ by use of the transformation functions defined by the corrected parameters, thereby obtaining the intermediate processed image signal $S_{proc}'$. (step S36) Then the enlarging/contracting means 305 enlarges the intermediate processed image signal $S_{proc}'$, thereby obtaining the final 5-line processed image signal $S_{proc}5$. (step S37) Finally, an image is reproduced by a printer or the like on the basis of the 5-line processed image signal $S_{proc}5$. (step S38) Thus, in this embodiment, the parameters of the transformation functions for carrying out the frequency enhancement processing on the picture element density-transformed original image signal $S_{org}$ are determined by correcting the parameters of the base transformation functions $f_{kb}$ (the transformation functions for carrying out the frequency enhancement processing on the base original image signal $S_{org}'$) on the basis of the filtering characteristics F1 and F2 so that the frequency response characteristic of the processed image signal $S_{proc}$ becomes substantially equal to that of the base processed image signal $S_{proc}B$, and accordingly the image reproduced on the basis of the processed image signal $S_{proc}$ obtained from the picture element density-transformed original image signal $S_{org}$ can be equivalent in sharpness to the image reproduced on the basis of the base processed image signal $S_{proc}B$ obtained from the base original image signal $S_{org}'$. Further since the frequency response characteristic is corrected simultaneously with the frequency enhancement processing, the operation time can be saved as compared with when correction of the frequency response characteristic is carried out on the processed image signal $S_{proc}$ which has been subjected to the frequency enhancement processing.

Though, in the seventh embodiment, the parameters of the base transformation functions $f_{kb}$ are corrected according to the filtering characteristic F1 of the picture element density-transformation filer and the filtering characteristic F2 of the interpolation filter, it is possible to prepare in advance a table in which the kind of the picture element density transformation to be carried out by the picture element density transformation means 304 and the kind of the interpolation filter to be used by the enlarging/contracting means 305 are related to the degree of correction of the parameters and to correct the parameters with reference to the table on the basis of the picture element density, the magnification and the target frequency component input from the input means.

Further though, in the seventh embodiment, the frequency response characteristic of the 5-line processed image signal $S_{proc}5$ is obtained on the basis of the filtering characteristics F1 and F2 shown in FIGS. 58 and 59 and the parameters of the transformation function for transforming the band-limited signal corresponding to the target frequency component are corrected so that frequency response of the processed image signal $S_{proc}$ obtained from the 5-line transformed original image signal $S_{org}5$ becomes equal to that of the base processed image signal $S_{proc}B$, when the filtering characteristics F1 and F2 are represented by formulae, the frequency response characteristic of the 5-line processed image signal $S_{proc}5$ may be obtained on the basis of the formulae.

Further, though, in the seventh embodiment, the base original image signal $S_{org}'$ is transformed to the picture element density-transformed original image signal $S_{org}$ by filtering the base original image signal $S_{org}'$ by use of a picture element density-transformation filter, the base original image signal $S_{org}'$ may be transformed to the picture element density-transformed original image signal $S_{org}$ by other various methods. For example, linear interpolation or spline interpolation or thinning of picture elements after filtering may be employed. In such a case, the frequency response characteristic of the picture element density-transformed original image signal $S_{org}$ is calculated on the basis of the coefficient of contraction by the interpolation, or by Fourier transformation of the picture element density-transformed original image signal $S_{org}$, and the parameters of the base transformation functions $f_{kb}$ are corrected on the basis of the frequency response characteristic.

Also when a processed image signal $S_{proc}$ is obtained by enlarging an intermediate processed image signal $S_{proc}'$ obtained from the base original image signal $S_{org}'$ as it is by the enlarging/contracting means 305, or when a processed image signal $S_{proc}$ is obtained from a picture element density-transformed original image signal $S_{org}$ without enlarging the intermediate processed image signal $S_{proc}'$, the processed image signal $S_{proc}$ can differ in frequency response characteristic from the base processed image signal $S_{proc}B$. In such a case, the base transformation functions $f_{kb}$ may be corrected on the basis of one of the filtering characteristics F1 and F2.

Further, though, in the seventh embodiment described above, the unsharp image signals are obtained from the original image signal by filtering and interpolation/enlargement and the band-limited signals are obtained from the original image signal and the unsharp image signals, the band-limited signals may be made, for instance, by transforming the original image signal to multiple resolution image signals by a wavelet transformation or a Laplacian pyramid, and the image signals at the respective resolutions may be taken as the band-limited signals.

An image processing system 331 in accordance with an eighth embodiment of the present invention will be described, hereinbelow.

In FIG. 65, the image processing system 331 in accordance with the eighth embodiment of the present invention comprises an unsharp image signal making means 332 which makes a plurality of unsharp image signals from multiple resolution image signals $S_{org}''$ which are obtained from a base original image signal $S_{org}'$ by transforming the base original image signal $S_{org}'$ to multiple resolution space and encoding the transformed image signals, and a frequency enhancement processing means 333 which carries out a frequency enhancement processing for enhancing a particular frequency and obtains an intermediate processed image signal $S_{proc}'$. The image processing system 331 further comprises an enlarging/contracting means 335 which enlarges the intermediate processed image signal $S_{proc}'$, and a parameter correcting means 336. The processing performed by the unsharp image signal making means 332, the frequency enhancement processing means 333 and the enlarging/contracting means 335 is the same as that in the seventh embodiment, and accordingly will not be described here. In this embodiment, the parameter correcting means 336 corrects the parameters of the base transformation functions $f_{kb}$ according to the characteristics of the wavelet transformation functions which are employed when transforming the original image signal $S_{org}$ to multiple resolution space.

The base original image signal $S_{org}'$ is transformed into multiple resolution space and the transformed image signals are encoded in the following manner. That is, as shown in FIG. 66A, the base original image signal $S_{org}'$ is subjected to wavelet transformation and is decomposed into four pieces of data LL1, HL0, LH0 and HH0 by resolution. The data LL1 represents an image obtained by reducing the original image to ½ in both longitudinal and lateral directions. The data HL0, LH0 and HH0 represents a longitudinal edge, a lateral edge and an oblique edge. When the four pieces of data LL1, HL0, LH0 and HH0 are subjected to inverse wavelet transformation, the original image signal $S_{org}$ is obtained. Then the data LL1 is further subjected to wavelet transformation and decomposed into four pieces of data LL2, HL1, LH1 and HH1 as shown in FIG. 66B. The data LL2 represents an image obtained by reducing data LL1 to ½ in both longitudinal and lateral directions. The data HL1, LH1 and HH1 represents a longitudinal edge component, a lateral edge component and an oblique edge component of the data LL1. When the four pieces of data LL2, HL1, LH1 and HH1 are subjected to inverse wavelet transformation, a low resolution image signal having a resolution equal to ½ of that of the original image signal is obtained. Further wavelet transformation is repeated a desired number of times on data LL obtained each time the wavelet transformation is carried out, thereby obtaining a plurality of pieces of data which are different in resolution. Thereafter, data at each resolution is encoded as shown in FIG. 66C and the multiple resolution image signals $S_{org}''$ is obtained.

By decoding only image signals up to a desired resolution in the multiple resolution image signals $S_{org}''$ and carrying out inverse wavelet transformation on the image signals, a low resolution image signal representing an image at a resolution of $½^k$ (k being the desired resolution) of that of the original image can be obtained.

Figure 67:
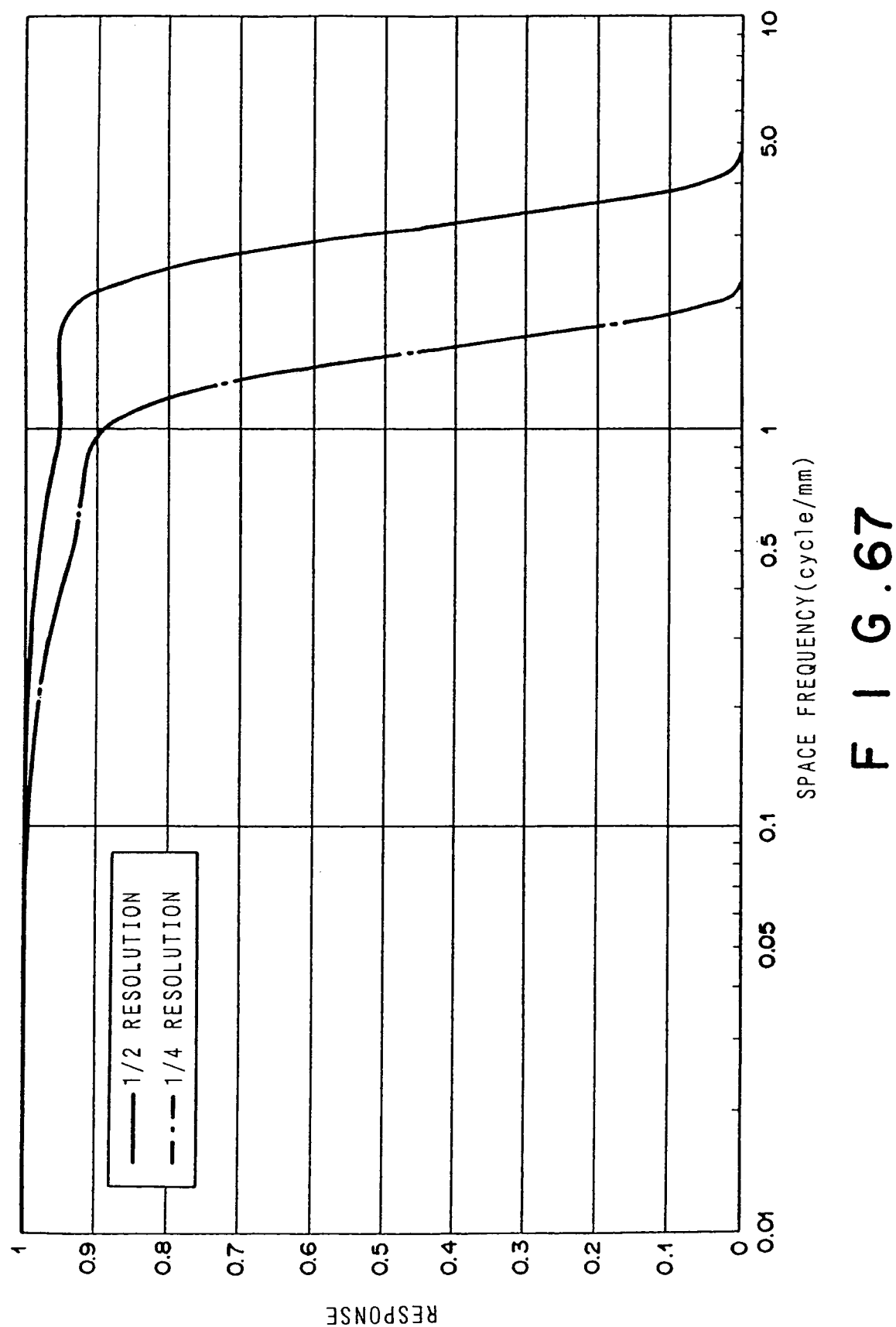
FIG. 67 is a view showing frequency response characteristics of the low resolution image signals which are restored up to a resolution equal to ½ of that of the base original image signal $S_{org}'$ and up to a resolution equal to ¼ of that of the base original image signal $S_{org}'$ when the base original image signal $S_{org}'$ has been decomposed by use of wavelet transformation functions having first coefficients of filter.
Figure 68:
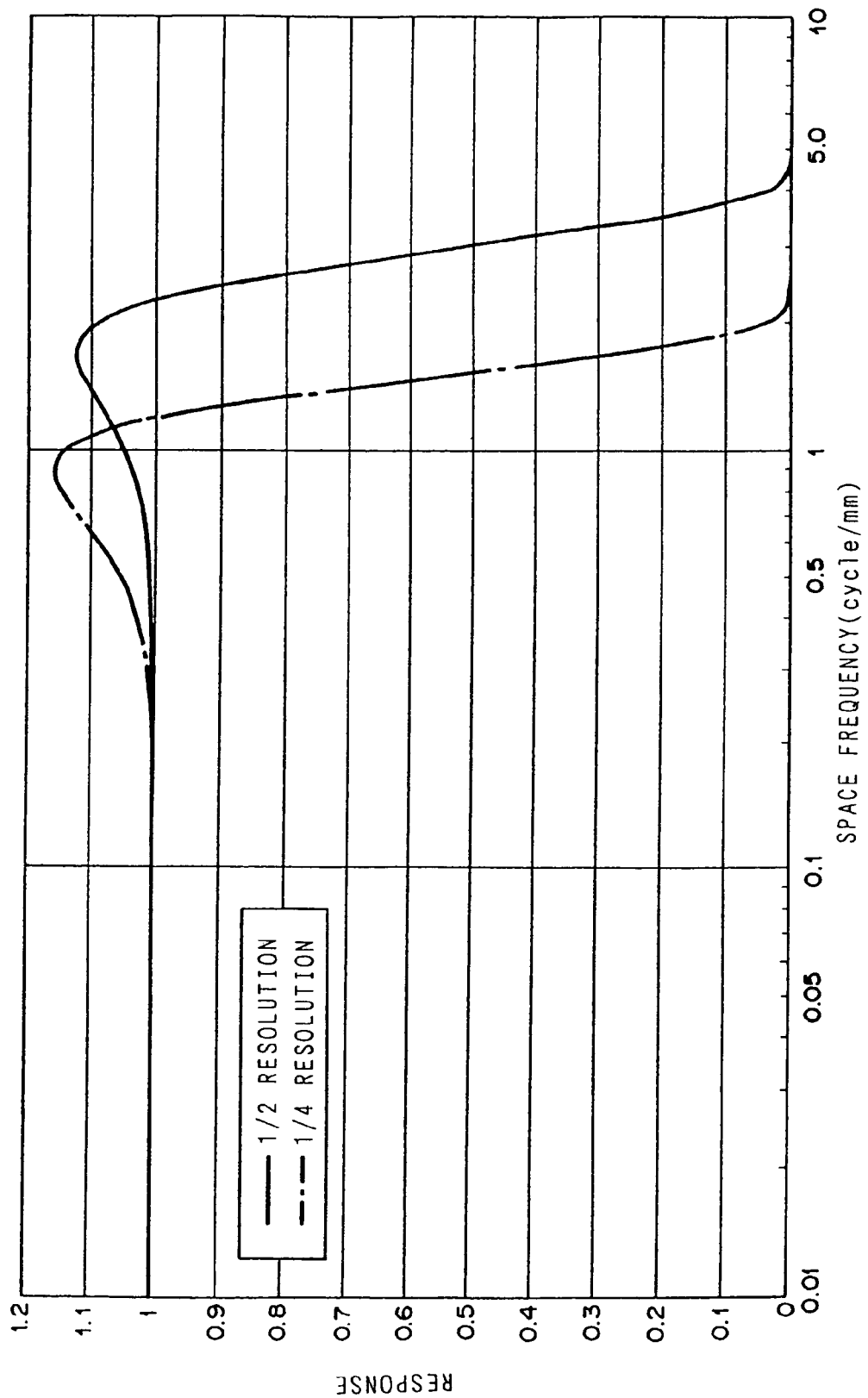
FIG. 68 shows the same when the base original image signal $S_{org}'$ has been decomposed by use of wavelet transformation functions having second coefficients of filter.

As described above, by restoring low resolution image signals up to a desired resolution in the multiple resolution image signals $S_{org}''$, a low resolution image signal representing an image at a resolution of $½^k$ (k being the desired resolution) of that of the original image can be obtained. However, the image reproduced on the basis of the low resolution image signal becomes unsharp depending on wavelet transformation functions used in the wavelet transformation. FIG. 67 shows frequency response characteristics of the low resolution image signals which are restored up to a resolution equal to ½ of that of the base original image signal $S_{org}'$ and up to a resolution equal to ¼ of that of the base original image signal $S_{org}'$ when the base original image signal $S_{org}'$ has been decomposed by use of wavelet transformation functions having first coefficients of filter, and FIG. 68 shows the same when the base original image signal $S_{org}'$ has been decomposed by use of wavelet transformation functions having second coefficients of filter. As can be seen from FIGS. 65 and 66, as the response deteriorates, high frequency components deteriorate and the image becomes less sharp. In FIGS. 65 and 66, the frequency response of the base original image signal $S_{org}'$ is 1 over the entire frequency bands.

The multiple resolution image signals $S_{org}''$ obtained by decomposing a base original image signal $S_{org}'$ by wavelet transformation are attached with information on the size of the wavelet transformation functions and/or the coefficients of filter thereof since the wavelet transformation functions to be employed in the wavelet transformation should be in one to one correspondence to the wavelet transformation functions to be employed in the inverse wave let transformation. Accordingly, in the eighth embodiment, when a low resolution image signal at a desired resolution restored from multiple resolution image signals $S_{org}''$ obtained by decomposing a base original image signal $S_{org}'$ is taken as an object original image signal $S_{org}$, the difference in response at a target frequency component between the processed image signal $S_{proc}$ which is obtained by carrying out the frequency enhancement processing on the object original image signal $S_{org}$ by use of the base transformation functions $f_{kb}$ and the base processed image signal $S_{proc}B$ obtained by carrying out the frequency enhancement processing on the base original image signal $S_{org}'$ by use of the base transformation functions $f_{kb}$ is obtained on the basis of the information on the wavelet transformation functions attached to the multiple resolution image signals $S_{org}''$ and the parameters of the transformation functions for transforming the object original image signal $S_{org}$ are corrected by the parameter correcting means 336 so that the difference is compensated for. When information on the wavelet transformation functions is not attached to the multiple resolution image signals $S_{org}''$, the information is manually input into the image processing system 331.

For example, when a low resolution image signal restored up to a resolution equal to ¼ of that of a base original image signal $S_{org}$ from multiple resolution image signals $S_{org}''$ obtained by decomposing the base original image signal $S_{org}'$ is taken as an object original image signal $S_{org}$, aspect of the image reproduced on the basis of the ¼ resolution image signal at a frequency of 1 cycle/mm is equalized to that of the image reproduced on the basis of the base original image signal $S_{org}'$ in the following manner. The frequency at which aspect of the image reproduced on the basis of the ¼ resolution image signal is to be equalized to that of the image reproduced on the basis of the base original image signal $S_{org}'$ is input in advance through an input means by the user. Since the response of the image reproduced on the basis of the ¼ resolution image signal at 1 cycle/mm is 0.9 whereas the response of the image reproduced on the basis of the base original image signal $S_{org}'$ at 1 cycle/mm is 1, it is necessary to multiply the frequency response at 1 cycle/mm of the ¼ resolution image signal by 1/0.9 in order to equalize aspect of the image reproduced on the basis of the ¼ resolution image signal to that of the image reproduced on the basis of the base original image signal $S_{org}'$ at 1 cycle/mm. Accordingly, in this embodiment, the transformation function for the band-limited signal in the frequency band corresponding to 1 cycle/mm is set by correcting the parameters for the base transformation function $f_{kb}$ for the band-limited signal in the frequency band corresponding to 1 cycle/mm so that the degree of enhancement becomes 1/0.9 times. More specifically, when the transformation function is a function having an inclination, the inclination is multiplied by 1/0.9, and when the transformation function is a constant, the value of the constant is multiplied by 1/0.9. The frequency component at which aspect of the image reproduced on the basis of the ¼ resolution image signal is to be equalized to that of the image reproduced on the basis of the base original image signal $S_{org}'$ may be any frequency and may be two or more frequencies. Further the frequency component may be input by the user through an input means not shown.

Thus in this embodiment, when frequency enhancement processing is to be carried out on an image signal which is lower in resolution than a base original image signal $S_{org}'$ and is obtained from multiple resolution image signals $S_{org}''$ obtained by wavelet transformation of the base original image signal $S_{org}'$, the transformation functions for transforming the band-limited signals obtained from the low resolution image signal are corrected on the basis of the wavelet transformation functions employed in the wavelet transformation of the base original image signal $S_{org}$ so that the image reproduced on the basis of the processed image signal obtained from the low resolution image signal becomes substantially equal to the image reproduced on the basis of the processed image signal obtained from the base original image signal in frequency response characteristic at a desired frequency. Accordingly, a processed image signal which is substantially equal in frequency response characteristic to a processed image signal obtained from the base original image signal can be constantly obtained irrespective of the resolution of the low resolution image signal. Further since the frequency response characteristic is corrected simultaneously with the frequency enhancement processing, the operation time can be saved as compared with when correction of the frequency response characteristic is carried out on the processed image signal $S_{proc}$ which has been subjected to the frequency enhancement processing.

In the case where the processed image signal $S_{proc}$ is to be enlarged by the enlarging/contracting means 335 in the eighth embodiment, the parameters of the base transformation functions $f_{kb}$ are corrected on the basis of the filtering characteristic of the filter employed by the enlarging/contracting means 335 in addition to the characteristics of the wavelet transformation functions.

In the seventh and eighth embodiments described above, it is preferred that the object original image signal $S_{org}$ and the parameters for the object original image signal $S_{org}$ obtained by correcting the base transformation functions according to the characteristic of enlargement or the characteristic of contraction be stored correlated to each other. With this arrangement, when an image is output (output as a hard copy on photographic film or displayed on a CRT or the like) again on the basis of the object original image signal $S_{org}$, an image at a quality equivalent to that of a previously output image can be obtained.

Further, it is preferred that the base original image signal $S_{org}'$ from which the object original image signal $S_{org}$ is obtained, the characteristic of enlargement or the characteristic of contraction with which the base original image signal $S_{org}'$ is enlarged or contracted to the object original image signal $S_{org}$ and the parameters of the reference transformation functions be stored correlated to each other. With this arrangement, enlarged or contracted images can be repeatedly reproduced on the basis of the base original image signal $S_{org}'$ at the same image quality.

The characteristic of enlargement or the characteristic of contraction may be represented by a space frequency characteristic and may be stored as table data such as shown in FIG. 69. Otherwise the space frequency characteristic representing the characteristic of enlargement or the characteristic of contraction may be approximated by a function and parameters of the function may be stored as the characteristic of enlargement or the characteristic of contraction. As such a function, a Gaussian function such as shown below may be employed.

$$Res=\exp(-a^2/\sigma^2)$$

wherein a=0 when Fq-m<0 and otherwise a=Fq-m, Res represents the response and Fq represents the space frequency. In this case, $\sigma$ and m may be employed as the parameters representing the space frequency characteristic which in turn represents the characteristic of enlargement or the characteristic of contraction as shown in FIGS. 70A and 70B.

What is claimed is:

1. An image processing method for obtaining a processed image signal from an original image signal representing an original image having a certain resolution, in which a plurality of intermediate image signals which are different in frequency band are made on the basis of the original image signal, a plurality of transformed image signals are obtained by carrying out a transformation processing on the respective intermediate image signals on the basis of transformation functions which are set according to the frequency bands of the respective intermediate image signals, and a processed image signal is obtained from the transformed image signals, wherein the improvement comprises the steps of preparing reference transformation functions for transforming the intermediate image signals obtained from a reference original image signal representing a reference original image having a reference resolution which are set according to the frequency bands of the respective intermediate image signals, and, when an object original image signal to be processed represents an original image having a resolution lower than the reference resolution, setting the transformation functions for transforming the intermediate image signals obtained from the object original image signal to be equal to the respective reference transformation functions for the intermediate image signals in the frequency bands not higher than the frequency band corresponding to the resolution of the original image represented by the object original image signal.

2. An image processing method as defined in claim 1 in which said plurality of intermediate image signals are band-limited signals which are made by making, on the basis of the original image signal, a plurality of unsharp image signals which are different in frequency response characteristic, and making a plurality of band-limited signals representing the signals in the respective frequency bands of the original image signal on the basis of the unsharp image signals and the original image signal.

3. An image processing method as defined in claim 1 in which information on the resolution of the object original image signal is obtained and the step of setting the transformation functions for transforming the intermediate image signals obtained from the object original image signal is executed on the basis of the information on the resolution of the object original image signal.

4. The method of claim 1, wherein the transformation processing on the respective intermediate image signals are different between frequency bands based on the applied reference transformation function in each frequency band.

5. The method of claim 1, wherein an original image signal has a resolution n, and the object original image comprises a resolution reducing n by ½ or more, and a number of wavebands corresponding to resolution n is N, and wherein a number of transformed wavebands of the intermediate signals aggregated to obtain the object image is less than N, such that N is reduced by 1 for each ½ level of resolution reduction of the original image signal.

6. An image processing system for obtaining a processed image signal from an original image signal representing an original image having a certain resolution comprising an intermediate signal making means which makes a plurality of intermediate image signals which are different in frequency band on the basis of the original image signal, and a transformation processing means which makes a plurality of transformed image signals by carrying out a transformation processing on the respective intermediate image signals on the basis of transformation functions which are set according to the frequency bands of the respective intermediate image signals and obtains a processed image signal from the transformed image signals, wherein the improvement comprises that the transformation processing means prepares reference transformation functions for transforming the intermediate image signals obtained from a reference original image signal representing a reference original image having a reference resolution which are set according to the frequency bands of the respective intermediate image signals, and, when the object original image signal to be processed represents an original image having a resolution lower than the reference resolution, sets the transformation functions for transforming the intermediate image signals obtained from the object original image signal to be equal to the respective reference transformation functions for the intermediate image signals in the frequency bands not higher than the frequency band corresponding to the resolution of the original image represented by the object original image signal.

7. An image processing system as defined in claim 6 in which the intermediate image signal making means comprises an unsharp image signal making means which makes a plurality of unsharp image signals which are different in frequency response characteristic on the basis of the original image, and a band-limited signal making means which makes, as the intermediates image signals, a plurality of band-limited signals representing the signals in the respective frequency bands of the original image signal on the basis of the unsharp image signals and the original image signal.

8. An image processing system as defined in claim 6 in which a resolution information obtaining means for obtaining information on the resolution of the original image represented by the object original image signal is provided and the transformation processing means sets the transformation functions for transforming the intermediate image signals obtained from the object original image signal on the basis of the information on the resolution of the original image.

9. A computer-readable recording medium loaded with program for causing a computer to perform an image processing method for obtaining a processed image signal from an original image signal representing an original image having a certain resolution, in which a plurality of intermediate image signals which are different in frequency band are made on the basis of the original image signal, a plurality of transformed image signals are obtained by carrying out a transformation processing on the respective intermediate image signals on the basis of transformation functions which are set according to the frequency bands of the respective intermediate image signals, and a processed image signal is obtained from the transformed image signals, wherein the improvement comprises that the program includes the steps of preparing reference transformation functions for transforming the intermediate image signals obtained from a reference original image signal representing a reference original image having a reference resolution which are set according to the frequency bands of the respective intermediate image signals, and, when the object original image signal to be processed represents an original image having a resolution lower than the reference resolution, setting the transformation functions for transforming the intermediate image signals obtained from the object original image signal to be equal to the respective reference transformation functions for the intermediate image signals in the frequency bands not higher than the frequency band corresponding to the resolution of the original image represented by the object original image signal.

10. A computer-readable recording medium as defined in claim 9 in which said plurality of intermediate image signals are band-limited signals which are made by making, on the basis of the original image signal, a plurality of unsharp image signals which are different in frequency response characteristic, and making a plurality of band-limited signals representing the signals in the respective frequency bands of the original image signal on the basis of the unsharp image signals and the original image signal.

11. A computer-readable recording medium as defined in claim 9 in which information on the resolution of the object original image signal is obtained and the step of setting the transformation functions for transforming the intermediate image signals obtained from the object original image signal is executed on the basis of the information on the resolution of the object original image.

* * * * *